United States Patent
Comeau et al.

(10) Patent No.: US 6,244,361 B1
(45) Date of Patent: Jun. 12, 2001

(54) STEERABLE ROTARY DRILLING DEVICE AND DIRECTIONAL DRILLING METHOD

(75) Inventors: Laurier E. Comeau, Leduc; Elis Vandenberg; Edward James Cargill, both of Sherwood Park, all of (CA); John Ransford Hardin, Jr., Houston, TX (US); Terrance Dean Maxwell, Leduc; Bryan James Restau, Beaumont, both of (CA); Frank Seadio Ramirez, Humble, TX (US); Colin Walker, Conchez-de-Bearn (FR); Rick Hay, Nisku (CA)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 09/353,599

(22) Filed: Jul. 14, 1999

(Under 37 CFR 1.47)

(30) Foreign Application Priority Data

Jul. 12, 1999 (CA) .................................. 2277714

(51) Int. Cl.⁷ ...................................................... E21B 7/06
(52) U.S. Cl. .................................. 175/61; 175/73; 175/24
(58) Field of Search .................................. 175/24, 26, 27, 175/45, 55, 56, 61, 62, 76, 73, 74, 75, 106, 107, 256, 325.2, 325.3; 33/301, 304

(56) References Cited

U.S. PATENT DOCUMENTS

| | | |
|---|---|---|
| 3,823,787 | 7/1974 | Haworth et al. . |
| 5,034,929 | 7/1991 | Cobern et al. . |
| 5,139,094 | 8/1992 | Prevedel et al. . |

(List continued on next page.)

FOREIGN PATENT DOCUMENTS

| | | |
|---|---|---|
| 0718641 | 6/1996 | (EP) . |
| 2017191 | 10/1979 | (GB) . |
| 2172324 | 7/1988 | (GB) . |
| 2172325 | 7/1988 | (GB) . |
| 2177738 | 8/1988 | (GB) . |
| 2307537 | 5/1997 | (GB) . |
| WO90/07625 | 7/1990 | (WO) . |
| WO90/08245 | 7/1990 | (WO) . |
| WO99/24688 | 5/1999 | (WO) . |

OTHER PUBLICATIONS

Warren T: "Technology Gains Momentum", Oil and Gas Journal, US, Pennwell Publishing Co. Tulsa, vol. 96, No. 51, Dec. 21, 1998, pp. 101–105.

*Primary Examiner*—Robert E. Pezzuto
(74) *Attorney, Agent, or Firm*—Terrence N. Kuharchuk; William Shull; Michael D. McCully

(57) ABSTRACT

A drilling direction control device, improvements in drilling direction control devices, methods for orienting a rotary driling system, and methods for rotary drilling. The drilling direction control device includes a rotatable drilling shaft, a housing for rotatably supporting a length of the drilling shaft, and a deflection assembly contained within the housing for bending the drilling shaft between a first support location and a second support location. The deflection assembly includes an outer ring which is rotatably supported on a circular inner peripheral surface of the housing and which has a circular inner peripheral surface that is eccentric with respect to the housing. The deflection assembly also includes an inner ring which is rotatably supported on the circular inner peripheral surface of the outer ring and which has a circular inner peripheral surface which engages the drilling shaft and which is eccentric with respect to the circular inner peripheral surface of the outer ring. Methods for orienting a rotary drilling system involve communicating a desired orientation of the drilling string to a drilling direction control device and then actuating the drilling direction control device to deflect the drilling shaft to reflect the desired orientation of the drilling shaft. The desired orientation of the drilling shaft may be communicated directly to the drilling direction control device or to the drilling direction control device through a drilling string communication system.

70 Claims, 11 Drawing Sheets

U.S. PATENT DOCUMENTS

| | | |
|---|---|---|
| 5,307,885 | 5/1994 | Kuwana et al. . |
| 5,314,030 | 5/1994 | Peterson et al. . |
| 5,353,884 | 10/1994 | Misawa et al. . |
| 5,685,379 | 11/1997 | Barr et al. . |
| 5,706,905 | 1/1998 | Barr et al. . |
| 5,803,185 | 9/1998 | Barr et al. . |
| 5,875,859 | 3/1999 | Ikeda et al. . |
| 5,931,239 | 8/1999 | Schuh . |

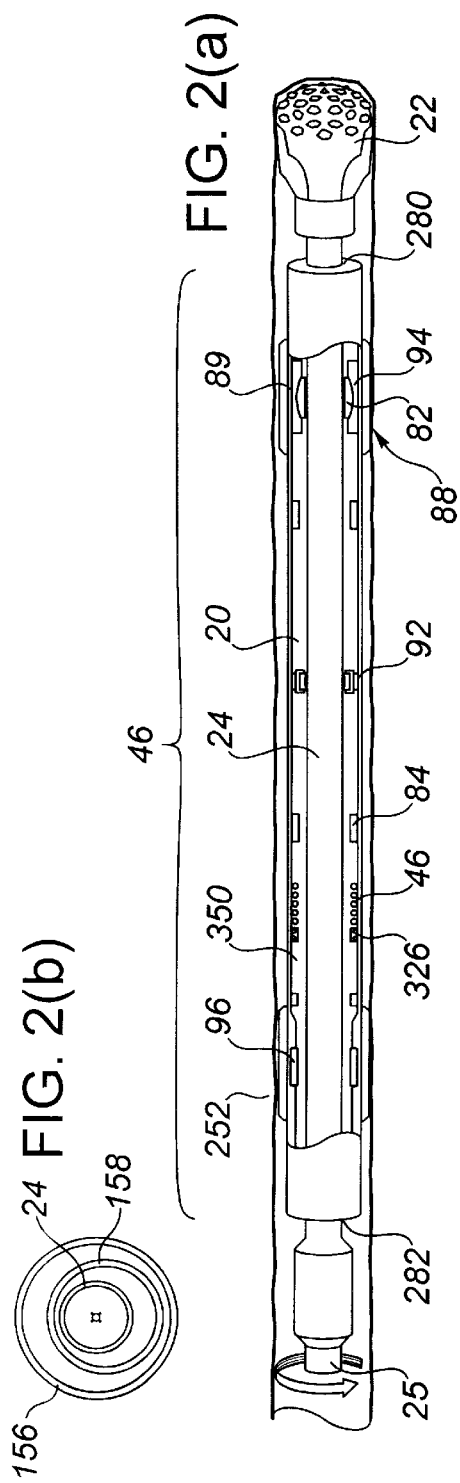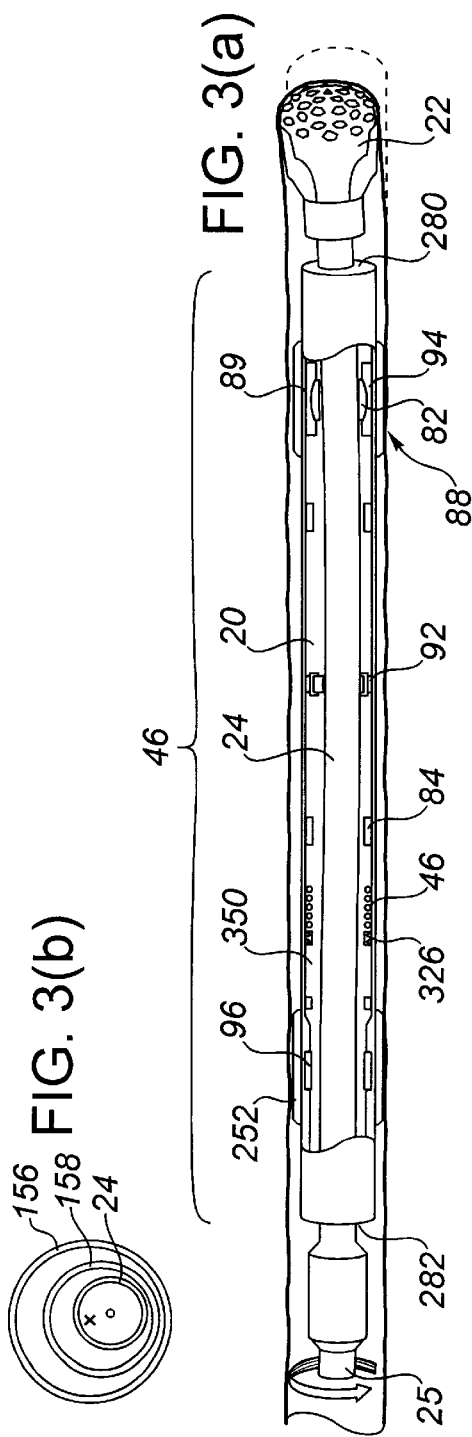

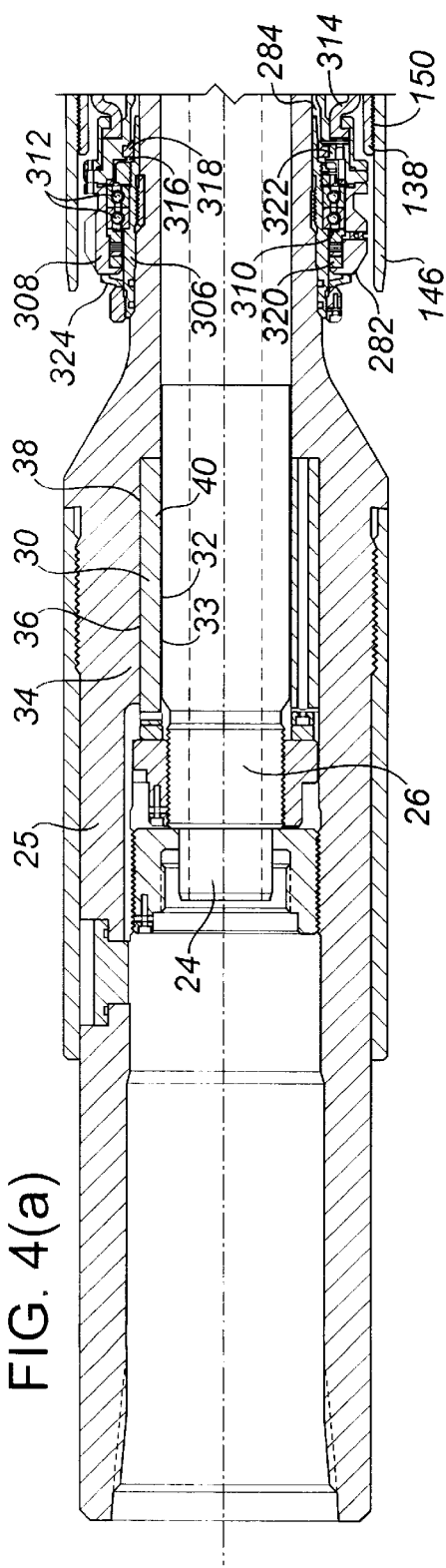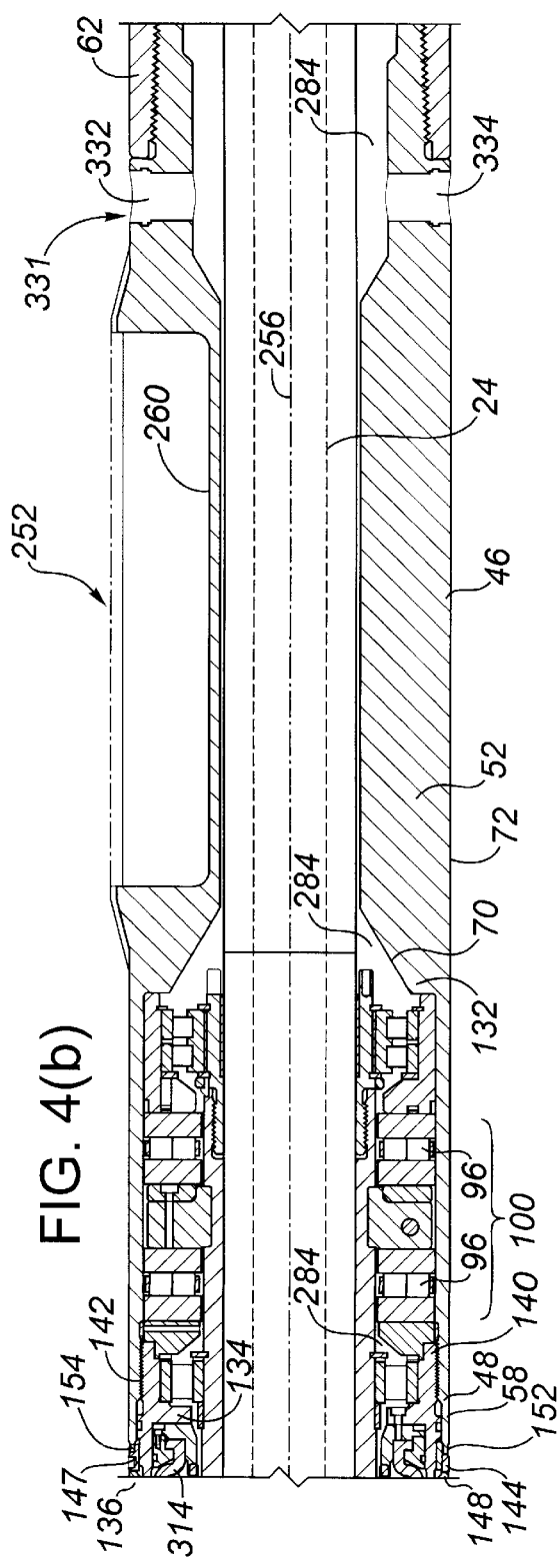

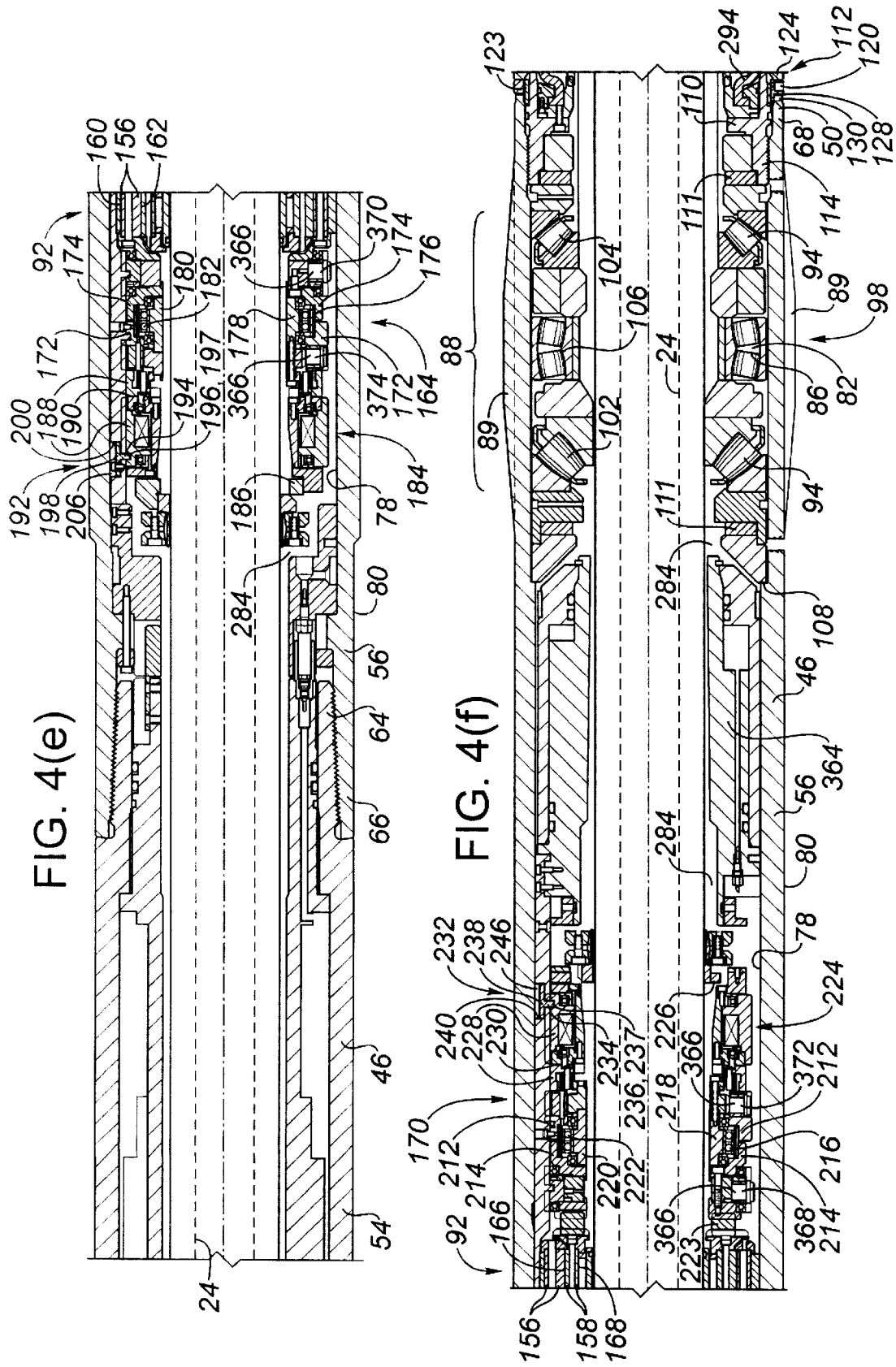

STEERABLE ROTARY DRILLING DEVICE AND DIRECTIONAL DRILLING METHOD

FIELD OF INVENTION

The present invention relates to a steerable rotary drilling device and a method for directional drilling using a rotary drilling string. Further, the present invention relates to a drilling direction control device and a method for controlling the direction of rotary drilling.

BACKGROUND OF INVENTION

Directional drilling involves varying or controlling the direction of a wellbore as it is being drilled. Usually the goal of directional drilling is to reach or maintain a position within a target subterranean destination or formation with the drilling string. For instance, the drilling direction may be controlled to direct the wellbore towards a desired target destination, to control the wellbore horizontally to maintain it within a desired payzone or to correct for unwanted or undesired deviations from a desired or predetermined path.

Thus, directional drilling may be defined as deflection of a wellbore along a predetermined or desired path in order to reach or intersect with, or to maintain a position within, a specific subterranean formation or target. The predetermined path typically includes a depth where initial deflection occurs and a schedule of desired deviation angles and directions over the remainder of the wellbore. Thus, deflection is a change in the direction of the wellbore from the current wellbore path.

It is often necessary to adjust the direction of the wellbore frequently while directional drilling, either to accommodate a planned change in direction or to compensate for unintended or unwanted deflection of the wellbore. Unwanted deflection may result from a variety of actors, including the characteristics of the formation being drilled, the makeup of the bottomhole drilling assembly and the manner in which the wellbore is being drilled.

Deflection is measured as an amount of deviation of the wellbore from the current wellbore path and is expressed as a deviation angle or hole angle. Commonly, the initial wellbore path is in a vertical direction. Thus, initial deflection often signifies a point at which the wellbore has deflected off vertical. As a result, deviation is commonly expressed as an angle in degrees from the vertical.

Various techniques may be used for directional drilling. First, the drilling bit may be rotated by a downhole motor which is powered by the circulation of fluid supplied from the surface. This technique, sometimes called "sliding drilling", is typically used in directional drilling to effect a change in direction of the a wellbore, such as the building of an angle of deflection. However, various problems are often encountered with sliding drilling.

For instance, sliding drilling typically involves the use of specialized equipment in addition to the downhole drilling motor, including bent subs or motor housings, steering tools and nonmagnetic drill string components. As well, the downhole motor tends to be subject to wear given the traditional, elastomer motor power section. Furthermore, since the drilling string is not rotated during sliding drilling, it is prone to sticking in the wellbore, particularly as the angle of deflection of the wellbore from the vertical increases, resulting in reduced rates of penetration of the drilling bit. Other traditional problems related to sliding drilling include stick-slip, whirling, differential sticking and drag problems. For these reasons, and due to the relatively high cost of sliding drilling, this technique is not typically used in directional drilling except where a change in direction is to be effected.

Second, directional drilling may be accomplished by rotating the entire drilling string from the surface, which in turn rotates a drilling bit connected to the end of the drilling string. More specifically, in rotary drilling, the bottomhole assembly, including the drilling bit, is connected to the drilling string which is rotatably driven from the surface. This technique is relatively inexpensive because the use of specialized equipment such as downhole drilling motors can usually be kept to a minimum. In addition, traditional problems related to sliding drilling, as discussed above, are often reduced. The rate of penetration of the drilling bit tends to be greater, while the wear of the drilling bit and casing are often reduced.

However, rotary drilling tends to provide relatively limited control over the direction or orientation of the resulting wellbore as compared to sliding drilling, particularly in extended-reach wells. Thus rotary drilling has tended to be largely used for non-directional drilling or directional drilling where no change in direction is required or intended.

Third, a combination of rotary and sliding drilling may be performed. Rotary drilling will typically be performed until such time that a variation or change in the direction of the wellbore is desired. The rotation of the drilling string is typically stopped and sliding drilling, through use of the downhole motor, is commenced. Although the use of a combination of sliding and rotary drilling may permit satisfactory control over the direction of the wellbore, the problems and disadvantages associated with sliding drilling are still encountered.

Some attempts have been made in the prior art to address these problems. Specifically, attempts have been made to provide a steerable rotary drilling apparatus or system for use in directional drilling. However, none of these attempts have provided a fully satisfactory solution.

United Kingdom Patent No. GB 2,172,324 issued Jul. 20, 1988 to Cambridge Radiation Technology Limited ("Cambridge") utilizes a control module comprising a casing having a bearing at each end thereof for supporting the drive shaft as it passes through the casing. Further, the control module is comprised of four flexible enclosures in the form of bags located in the annular space between the drilling string and the casing to serve as an actuator. The bags actuate or control the direction of drilling by applying a radial force to the drive shaft within the casing such that the drive shaft is displaced laterally between the bearings to provide a desired curvature of the drive shaft. Specifically, hydraulic fluid is selectively conducted to the bags by a pump to apply the desired radial force to the drilling string.

Thus, the direction of the radial force applied by the bags to deflect the drive shaft is controlled by controlling the application of the hydraulic pressure from the pump to the bags. Specifically, one or two adjacent bags are individually fully pressurized and the two remaining bags are depressurized. As a result, the drive shaft is deflected and produces a curvature between the bearings at the opposing ends of the casing of the control module. This controlled curvature controls the drilling direction.

United Kingdom Patent No. GB 2,172,325 issued Jul. 20, 1988 to Cambridge and United Kingdom Patent No. GB 2,177,738 issued Aug. 3, 1988 to Cambridge describe the use of flexible enclosures in the form of bags in a similar manner to accomplish the same purpose. Specifically, the drilling string is supported between a near bit stabilizer and a far bit stabilizer. A control stabilizer is located between the near and far bit stabilizers for applying a radial force to the drilling string within the control stabilizer such that a bend or curvature of the drilling string is produced between the near bit stabilizer and the far bit stabilizer. The control stabilizer is comprised of four bags located in the annular space between a housing of the control stabilizer and the drilling string for applying the radial force to the drilling string within the control stabilizer.

United Kingdom Patent Application No. GB 2,307,537 published May 28, 1997 by Astec Developments Limited describes a shaft alignment system for controlling the direction of rotary drilling. Specifically, a shaft, such as a drilling string, passes through a first shaft support means having a first longitudinal axis and a second shaft support means having a second longitudinal axis. The first and second shaft support means are rotatably coupled by bearing means having a bearing rotation axis aligned at a first non-zero angle with respect to the first longitudinal axis and aligned at a second non-zero angle with respect to the second longitudinal axis. As a result, relative rotation of the first and second shaft support means about their respective longitudinal axes varies the relative angular alignment of the first and second longitudinal axes.

The shaft passing through the shaft alignment system is thus caused to bend or curve in accordance with the relative angular alignment of the first and second longitudinal axes of the first and second shaft support means. The shaft may be formed as a unitary item with a flexible central section able to accommodate the desired curvature or it may be comprised of a coupling, such as a universal joint, to accommodate the desired curvature.

U.S. Pat. No. 5,685,379 issued Nov. 11, 1997 to Barr et. al., U.S. Pat. No. 5,706,905 issued Jan. 13, 1998 to Barr et. al. and U.S. Pat. No. 5,803,185 issued Sep. 8, 1998 to Barr et. al. describe a steerable rotary drilling system including a modulated bias unit, associated with the drilling bit, for applying a lateral bias to the drilling bit in a desired direction to control the direction of drilling. The bias unit is comprised of three equally spaced hydraulic actuators, each having a movable thrust member which is displaceable outwardly for engagement with the wellbore. The hydraulic actuators are operated in succession as the bias unit rotates during rotary drilling, each in the same rotational position, so as to displace the bias unit laterally in a selected direction.

PCT International Application No. PCT/US98/24012 published May 20, 1999 as No. WO 99/24688 by Telejet Technologies Inc. describes the use of a stabilizer assembly for directional drilling. More particularly, a stabilizer sub is connected with the rotary drilling string such that the stabilizer sub remains substantially stationary relative to the wellbore as the drilling string rotates. The stabilizer sub includes a fixed upper stabilizer and an adjustable lower stabilizer. The lower adjustable stabilizer carries at least four stabilizer blades which are independently radially extendable from the body of the stabilizer sub for engagement with the wellbore.

Each stabilizer blade is actuated by a motor associated with each blade. Because each stabilizer blade is provided with its own motor, the stabilizer blades are independently extendable and retractable with respect to the body of the stabilizer sub. Accordingly, each blade may be selectively extended or retracted to provide for the desired drilling direction.

U.S. Pat. No. 5,307,885 issued May 3, 1994 to Kuwana et. al., U.S. Pat. No. 5,353,884 issued Oct. 11, 1994 to Misawa et. al. and U.S. Pat. No. 5,875,859 issued Mar. 2, 1999 to Ikeda et. al. all utilize harmonic drive mechanisms to drive rotational members supporting the drilling string eccentrically to deflect the drilling string and control the drilling direction.

More particularly, Kuwana et. al. describes a first rotational annular member connected with a first harmonic drive mechanism a spaced distance from a second rotational annular member connected with a second harmonic drive mechanism. Each rotational annular member has an eccentric hollow portion which rotates eccentrically around the rotational axis of the annular member. The drilling string is supported by the inner surfaces of the eccentric portions of the annular members. Upon rotation by the harmonic drive mechanisms, the eccentric hollow portions are rotated relative to each other in order to deflect the drilling string and change the orientation of the drilling string to the desired direction. Specifically, the orientation of the drilling string is defined by a straight line passing through the centres of the respective hollow portions of the annular members.

Misawa et. al. describes harmonic drive mechanisms for driving first and second rotatable annular members of a double eccentric mechanism. The first rotatable annular member defines a first eccentric inner circumferential surface. The second rotatable annular member, rotatably supported by the first eccentric inner circumferential surface of the first annular member, defines a second eccentric inner circumferential surface. The drilling string is supported by the second eccentric inner circumferential surface of the second annular member and uphole by a shaft retaining mechanism. Thus, upon actuation of the harmonic drive mechanisms, the first and second annular members are rotated resulting in the movement of the center of the second eccentric circumferential surface. Thus the drilling string is deflected from its rotational centre in order to orient it in the desired direction.

Upon deflection of the drilling string, the fulcrum point of the deflection of the drilling string tends to be located at the upper supporting mechanism, i.e. the upper shaft retaining mechanism. As a result, it has been found that the drilling string may be exposed to excessive bending stress.

Similarly, Ikeda et. al. describes harmonic drive mechanisms for driving first and second rotatable annular members of a double eccentric mechanism. However, Ikeda et. al. requires the use of a flexible joint, such as a universal joint, to be connected into the drilling string at the location at which the maximum bending stress on the drilling string takes place in order to prevent excessive bending stress on the drilling string. Thus, the flexible joint is located adjacent the upper supporting mechanism. Upon deflection of the drilling string by the double eccentric mechanism, the deflection is absorbed by the flexible joint and thus a bending force is not generated on the drilling string. Rather, the drilling string is caused to tilt downhole of the double eccentric mechanism. A fulcrum bearing downhole of the double eccentric mechanism functions as a thrust bearing and serves as a rotating centre for the lower portion of the drilling string to accommodate the tilting action.

However, it has been found that the use of a flexible or articulated shaft to avoid the generation of excessive bending force on the drilling string may not be preferred. Specifically, it has been found that the articulations of the flexible or articulated shaft may be prone to failure.

Thus, there remains a need in the industry for a steerable rotary drilling device or drilling direction control device for use with a rotary drilling string, and a method for use in rotary drilling for controlling the drilling direction, which provide relatively accurate control over the trajectory or orientation of the drilling bit during the drilling operation, while also avoiding the generation of excessive bending stress on the drilling string.

SUMMARY OF INVENTION

The present invention is directed at a drilling direction control device. The invention is also directed at methods of drilling utilizing a drilling direction control device and to methods for orienting a drilling system such as a rotary drilling system.

In an apparatus form of the invention the invention is comprised of a device which can be connected with a drilling string and which permits drilling to be conducted in a multitude of directions which deviate from the longitudinal axis of the drilling string, thus providing steering capability during drilling and control over the path of the resulting wellbore. Preferably, the device permits the amount of rate of change of the drilling direction to be infinitely variable between zero percent and 100 percent of the capacity of the device.

The device is comprised of a drilling shaft which is connectable with the drilling string and which is deflectable by bending to alter the direction of its longitudinal axis relative to the longitudinal axis of the drilling string and thus alter the direction of a drilling bit attached thereto. Preferably, the orientation of the deflection of the drilling shaft may be altered to alter the orientation of the drilling bit with respect to both the tool face and the magnitude of the deflection of the drilling bit or the bit tilt.

Preferably, the drilling shaft is deflectable between two radial supports. Preferably a length of the drilling shaft which is to be deflected is contained within a housing, which housing also encloses the radial supports.

The device is especially suited for use as part of a steerable rotary drilling system in which the drilling string and the drilling shaft are both rotated.

In one apparatus aspect of the invention, the invention is comprised of a drilling direction control device comprising:

(a) a rotatable drilling shaft;

(b) a housing for rotatably supporting a length of the drilling shaft for rotation therein; and (c) a drilling shaft deflection assembly contained within the housing and axially located between a first support location and a second support location, for bending the drilling shaft between the first support location and the second support location, wherein the deflection assembly is comprised of:

(i) an outer ring which is rotatably supported on a circular inner peripheral surface of the housing and which has a circular inner peripheral surface that is eccentric with respect to the housing; and (ii) an inner ring which is rotatably supported on the circular inner peripheral surface of the outer ring and which has a circular inner peripheral surface which engages the drilling shaft and which is eccentric with respect to the circular inner peripheral surface of the outer ring.

In other apparatus aspects of the invention, the invention is comprised of improvements in features of drilling direction control devices generally. These improvements may be used in conjunction with the drilling direction control device described above or may be used in conjunction with other drilling direction control devices.

The first support location and the second support location may be comprised of any structure which facilitates the bending of the drilling shaft therebetween and which permits rotation of the drilling shaft. Preferably the device is further comprised of a first radial bearing located at the first support location and a second radial bearing located at the second support location. Preferably the first radial bearing is comprised of a distal radial bearing, the first support location is comprised of a distal radial bearing location, the second radial bearing is comprised of a proximal radial bearing, and the second bearing location is comprised of a proximal radial bearing location.

The distal radial bearing may be comprised of any bearing, bushing or similar device which is capable of radially and rotatably supporting the drilling shaft while transmitting the effects of deflection of the drilling shaft past the distal radial bearing. For example, the distal radial bearing may allow for radial displacement of the drilling shaft. Preferably, however, the distal radial bearing is comprised of a fulcrum bearing which facilitates pivoting of the drilling shaft at the distal radial bearing location.

The proximal radial bearing may be comprised of any bearing, bushing or similar device which is capable of radially and rotatably supporting the drilling shaft. Preferably, the proximal radial bearing does not significantly transmit the effects of deflection of the drilling shaft past the proximal radial bearing so that the effects of deflection of the drilling shaft are confined to that portion of the device which is toward the distal end of the device from the proximal radial bearing. In the preferred embodiment, the proximal radial bearing is comprised of a cantilever bearing which restrains pivoting of the drilling shaft at the proximal radial bearing location.

The device preferably is further comprised of a distal seal at a distal end of the housing and a proximal seal at a proximal end of the housing, both of which are positioned radially between the housing and the drilling shaft to isolate and protect the radial bearings and the deflection assembly from debris. The seals are preferably positioned axially so that the deflection assembly is axially located between the distal and proximal ends of the housing, the distal radial bearing location is axially located between the distal end of the housing and the deflection assembly, and the proximal radial bearing location is axially located between the proximal end of the housing and the deflection assembly.

The seals may be comprised of any type of seal which is capable of withstanding relative movement between the housing and the drilling shaft as well as the high temperatures and pressures that are likely to be encountered during drilling. Preferably the seals are rotary seals to accommodate rotation of the drilling shaft relative to the housing. In the preferred embodiment, the seals are comprised of rotary seals which also accommodate lateral movement of the drilling shaft, are comprised of an internal wiper seal and an external barrier seal, and are lubricated with filtered lubricating fluid from within the housing.

The interior of the housing preferably defines a fluid chamber between the distal end and the proximal end, which fluid chamber is preferably filled with a lubricating fluid. The device preferably is further comprised of a pressure compensation system for balancing the pressure of the lubricating fluid contained in the fluid chamber with the ambient pressure outside of the housing.

The pressure compensation system may be comprised of any system which will achieve the desired balance of pressures, such as any system which allows communication between the ambient pressure outside of the housing and the lubricating fluid contained in the fluid chamber. In the preferred embodiment, the pressure compensation system is comprised of a pressure port on the housing.

The pressure compensation system is also preferably comprised of a supplementary pressure source for exerting pressure on the lubricating fluid so that the pressure of the lubricating fluid is maintained higher than the ambient pressure. Any mechanism which provides this supplementary pressure source may be used in the invention, which mechanism may be actuated hydraulically, pneumatically, mechanically or in any other manner.

In the preferred embodiment, the pressure compensation system includes the supplementary pressure source and is comprised of a balancing piston assembly, wherein the balancing piston assembly is comprised of a piston chamber defined by the interior of the housing and a movable piston contained within the piston chamber which separates the piston chamber into a fluid chamber side and a balancing side, wherein the fluid chamber side is connected with the fluid chamber, wherein the pressure port communicates with the balancing side of the piston chamber, and wherein the supplementary pressure source acts on the balancing side of the piston chamber. In the preferred embodiment, the supplementary pressure source is comprised of a biasing device which exerts a supplementary pressure on the piston, and the biasing device is comprised of a spring which is contained in the balancing side of the piston chamber.

The pressure compensation system is also preferably comprised of a lubricating fluid regulating system which facilitates charging of the fluid chamber with lubricating fluid and which provides adjustment during operation of the device of the amount of lubricating fluid contained in the fluid chamber in response to increased temperatures and pressures experienced by the lubricating fluid.

The lubricating fluid regulating system is preferably comprised of a relief valve which communicates with the fluid chamber and which permits efflux of lubricating fluid from the fluid chamber when the difference between the pressure of the lubricating fluid in the fluid chamber and the ambient pressure outside of the fluid chamber exceeds a predetermined relief valve pressure. This predetermined relief valve pressure is preferably equal to or slightly greater than the supplementary pressure exerted by the supplementary pressure source. In the preferred embodiment, where the supplementary pressure source is a spring, the predetermined relief valve pressure is set at slightly higher than the desired maximum amount of supplementary pressure to be exerted by the spring during operation of the device.

The distal seal and the proximal seal are both preferably lubricated with lubricating fluid from the fluid chamber. In order to reduce the risk of damage to the seals due to debris contained in the lubricating fluid, the seals are preferably each comprised of an internal wiper seal or internal isolation seal and a filtering mechanism for filtering the lubricating fluid from the fluid chamber before it encounters the seals so that the seals are isolated from the main volume of lubricating fluid contained within the fluid chamber and are lubricated with filtered lubricating fluid. Any type of filter capable of isolating the seals from debris having particles of the size likely to be encountered inside the fluid chamber may be used in the filtering mechanism.

The device is preferably further comprised of a device associated with the housing for restraining rotation of the housing. The rotation restraining device may be comprised of any apparatus which is capable of providing a restraining or anti-rotation function between the housing and a borehole wall during operation of the drilling direction control device.

The rotation restraining device or anti-rotation may be comprised of a single member extending from the housing. Preferably, the rotation restraining device is comprised of a plurality of members arranged about a circumference of the housing, each of which members are capable of protruding radially from the housing and are capable of engaging the borehole wall to perform the restraining or anti-rotation function.

In one preferred embodiment of the invention, the rotation restraining device is comprised of at least one roller on the housing, the roller having an axis of rotation substantially perpendicular to a longitudinal axis of the housing and being oriented such that it is capable of rolling about its axis of rotation in response to a force exerted on the roller substantially in the direction of the longitudinal axis of the housing.

Preferably the roller is comprised of a peripheral surface about its circumference and preferably the peripheral surface is comprised of an engagement surface for engaging a borehole wall. The engagement surface may be comprised of the peripheral surface of the roller being tapered.

The roller may be positioned on the housing at a fixed radial position extending from the housing, but preferably the roller is capable of movement between a retracted position and an extended position in which it extends from the housing. The rotation restraining device may be further comprised of a biasing device for biasing the roller toward the extended position, which biasing device may be comprised of any apparatus which can perform the biasing function. Preferably the biasing device is comprised of at least one spring which acts between the housing and the roller. Alternatively, the rotation restraining device may be comprised of an actuator for moving the roller between the retracted and extended positions.

Preferably the first preferred embodiment of rotation restraining device is comprised of a plurality of rollers spaced about a circumference of the housing. The plurality of rollers may be spaced about the circumference of the housing in any configuration. In the preferred embodiment of rotation restraining device comprising rollers, the rotation restraining device is comprised of three rotation restraining carriage assemblies spaced substantially evenly about the circumference of the housing, wherein each rotation restraining carriage assembly is comprised of three sets of rollers spaced axially along the housing, and wherein each set of rollers is comprised of four coaxial rollers spaced side to side.

In a second preferred embodiment of the invention, the rotation restraining device is comprised of at least one piston on the housing. The piston may be a fixed member which does not move radially relative to the housing. Preferably, the piston is capable of movement between a retracted position and an extended position in which it extends radially from the housing, in which case the rotation restraining device is preferably further comprised of an actuator device for moving the piston between the retracted and extended positions. The actuator device may be comprised of any apparatus which is capable of moving the piston radially relative to the housing. In the preferred embodiment, the actuator device is comprised of a hydraulic pump. Alternatively, the rotation restraining device may be comprised of a biasing device for biasing the piston toward the extended position.

Preferably the second preferred embodiment of rotation restraining device is comprised of a plurality of pistons spaced about a circumference of the housing. The plurality of pistons may be spaced about the circumference of the housing in any configuration. In the preferred embodiment of rotation restraining device comprising pistons, the rotation restraining device is comprised of three rotation restraining carriage assemblies spaced substantially evenly about the circumference of the housing, wherein each rotation restraining carriage assembly is comprised of a plurality of pistons spaced axially along the housing.

The device is preferably further comprised of a distal thrust bearing contained within the housing for rotatably supporting the drilling shaft axially at a distal thrust bearing location and a proximal thrust bearing contained within the housing for rotatably supporting the drilling shaft axially at a proximal thrust bearing location. The thrust bearings may be comprised of any bearing, bushing or similar device which is capable of axially and rotatably supporting the drilling shaft.

The thrust bearings may be located at any axial positions on the device in order to distribute axial loads exerted on the device between the drilling shaft and the housing. Preferably the thrust bearings also isolate the deflection assembly from axial loads exerted through the device. As a result, the distal thrust bearing location is preferably located axially between the distal end of the housing and the deflection assembly, and the proximal thrust bearing location is preferably located axially between the proximal end of the housing and the deflection assembly. This configuration permits the thrust bearings to be lubricated with lubricating fluid from the fluid chamber.

Preferably the proximal thrust bearing location is located axially between the proximal end of the housing and the proximal radial bearing location. This configuration simplifies the design of the proximal thrust bearing location, particularly where the proximal radial bearing is comprised of a cantilever bearing and the proximal thrust bearing is thus isolated from the effects of deflection of the drilling shaft. The proximal thrust bearing may also be located at the proximal radial bearing location so that the proximal radial bearing is comprised of the proximal thrust bearing.

Preferably, the distal thrust bearing is comprised of the fulcrum bearing so that the distal thrust bearing location is at the distal radial bearing location. The fulcrum bearing may in such circumstances be comprised of any configuration of bearings, bushings or similar devices which enables the fulcrum bearing to function as both a radial bearing and a thrust bearing while continuing to permit the effects of deflection of the drilling shaft to be transmitted past the fulcrum bearing.

In the preferred embodiment, the fulcrum bearing is preferably comprised of a fulcrum bearing assembly, wherein the fulcrum bearing assembly is preferably comprised of at least one row of spherical thrust bearings positioned at first axial position, at least one row of spherical thrust bearings positioned at a second axial position and at least one row of spherical radial bearings positioned at a third axial position, wherein the third axial position is located between the first and second axial positions. Preferably the spherical thrust bearings and the spherical radial bearings are arranged substantially about a common center of rotation.

The thrust bearings are preferably maintained in a preloaded condition in order to minimize the likelihood of relative axial movement during operation of the device between the drilling shaft and the housing. The radial bearings may also be preloaded to minimize the likelihood of relative radial movement during operation of the device between the drilling shaft and the housing. In the preferred embodiment, the proximal thrust bearing and the fulcrum bearing are both preloaded.

The thrust bearings may be preloaded in any manner. Preferably the apparatus for preloading the bearings provides for adjustment of the amount of preloading to accommodate different operating conditions for the device.

In the preferred embodiment, the thrust bearings are preloaded. As a result, in the preferred embodiment the device is further comprised of a distal thrust bearing preload assembly and a proximal thrust bearing preload assembly. In the preferred embodiment, each thrust bearing preload assembly is comprised of a thrust bearing shoulder and a thrust bearing collar, between which a thrust bearing is axially maintained. The thrust bearing collar is axially adjustable to preload the thrust bearing and to adjust the amount of preloading. In the preferred embodiment, the thrust bearing collar is threaded onto the housing and is axially adjustable by rotation relative to the housing.

In order to reduce the likelihood of a thrust bearing collar becoming loosened by axial movement during operation of the device, the device is preferably further comprised of a distal thrust bearing retainer for retaining the distal thrust bearing in position without increasing the preloading on the distal thrust bearing, and is further comprised of a proximal thrust bearing retainer for retaining the proximal thrust bearing in position without increasing the preloading on the proximal thrust bearing.

The thrust bearing retainers may be comprised of any apparatus which functions to maintain the desired axial position of the thrust bearing collars without applying an additional compressive load to the thrust bearings. Preferably this result is achieved by retaining the thrust bearing collars against axial movement with a compressive force which is not applied to the thrust bearings.

In the preferred embodiment, each thrust bearing retainer is comprised of a locking ring slidably mounted on the thrust bearing collar to a position in which it abuts the housing and a locking ring collar which can be tightened against the locking ring to hold the locking ring in position between the housing and the locking ring collar. Alternatively, the locking ring may be adapted to abut some component of the device other than the housing as long as the force exerted by the tightening of the locking ring collar is not borne by the thrust bearing.

In the preferred embodiment, the thrust bearing collar is threaded for adjustment by rotation and the locking ring is mounted on the thrust bearing collar such that the locking ring does not rotate relative to the thrust bearing collar. Preferably, the apparatus for mounting the locking ring on the thrust bearing collar is comprised of a key on one and an axially oriented slot on the other of the locking ring and the thrust bearing collar. Any other suitable mounting apparatus may, however, be used.

The locking ring may be held abutted against the housing or other component of the device by the frictional forces resulting from the tightening of the locking ring collar. In the preferred embodiment, the locking ring is comprised of a housing abutment surface, the housing is comprised of a complementary locking ring abutment surface, and engagement of the housing abutment surface and the locking ring abutment surface prevents rotation of the locking ring relative to the housing. In the preferred embodiment, the abutment surfaces are comprised of complementary teeth.

In operation of the thrust bearing preload assembly and the thrust bearing retainer, the amount of thrust bearing preload is established by rotating the thrust bearing collar to establish a suitable axial load representing the desired amount of preloading on the thrust bearing. The locking ring is then slid over the thrust bearing collar until it abuts the housing and the complementary abutment surfaces are engaged and the locking ring collar is then tightened against the locking ring to hold the locking ring in position between the housing and the locking ring collar at a desired torque load.

The deflection assembly may be actuated by any mechanism or mechanisms which are capable of independently rotating the outer ring and the inner ring. The actuating mechanism may be independently powered, but in the preferred embodiment the actuating mechanism utilizes rotation of the drilling shaft as a source of power to effect rotation of the outer ring and the inner ring.

Preferably, the deflection assembly is further comprised of an outer ring drive mechanism for rotating the outer ring using rotation of the drilling shaft and a substantially identical inner ring drive mechanism for rotating the inner ring using rotation of the drilling shaft. Preferably, the inner and outer rings are rotated in a direction opposite to the direction of rotation of the drilling string and thus opposite to a direction of rotation of slippage of the non-rotating portion of the device (20), being the housing (46).

In the preferred embodiment, each drive mechanism is comprised of a clutch for selectively engaging and disengaging the drilling shaft from the ring, wherein the dutch is comprised of a pair of clutch plates which are separated by a clutch gap when the clutch is disengaged. Preferably, each clutch may also function as a brake for the inner and outer rings when the dutch plates are disengaged.

Each clutch is further comprised of a clutch adjustment mechanism for adjusting the clutch gap. Any mechanism facilitating the adjustment of the dutch gap may be used for the clutch adjustment mechanism.

Preferably, each clutch adjustment mechanism is comprised of a clutch adjustment member associated with one of the pair of clutch plates such that movement of the clutch adjustment member will result in corresponding movement of the dutch plate, a first guide for guiding the clutch adjustment member for movement in a first direction, and a movable key associated with the dutch adjustment member, the key comprising a second guide for urging the clutch adjustment member in a second direction, which second direction has a component parallel to the first guide and has a component perpendicular to the first guide.

The first guide may be comprised of any structure which is capable of guiding the clutch adjustment member for movement in the first direction. Similarly, the second guide may be comprised of any structure which is capable of urging the clutch adjustment member in the second direction.

The clutch adjustment member, the key and the clutch plate are preferably associated with each other such that the key effects movement of the clutch adjustment member which in turn effects movement of the dutch plate to increase or decrease the clutch gap. The clutch adjustment member may therefore be rigidly attached to or integrally formed with one of the key or the dutch plate, but should be capable of some movement relative to the other of the key and the clutch plate.

The function of the first guide is to enable the key and the clutch plate to move relative to each other without imparting a significant force to the clutch plate tending to rotate the clutch plate. In other words, the movement of the key in the second direction is converted through the apparatus of the key, the clutch adjustment member, the first guide and the clutch plate into movement of the dutch plate in a direction necessary to increase or decrease the clutch gap.

In the preferred embodiment, the first guide is comprised of a first slot which extends circumferentially in the clutch plate and thus perpendicular to a direction of movement of the clutch plate necessary to increase or decrease the clutch gap, the clutch adjustment member is fixed to the key, and the clutch adjustment member engages the first slot. Preferably, the second guide is comprised of a surface which urges the key to move in the second direction in response to a force applied to the key. In the preferred embodiment, the surface is comprised in part of a key ramp surface which is oriented in the second direction.

In the preferred embodiment, the dutch adjustment mechanism is further comprised of a clutch adjustment control mechanism for controlling the movement of the key. This clutch adjustment control mechanism may be comprised of any apparatus, but in the preferred embodiment is comprised of an adjustment screw which is connected to the key and which can be rotated inside a threaded bore to finely control the movement of the key.

In the preferred embodiment, the clutch adjustment mechanism is further comprised of a clutch adjustment locking mechanism for fixing the position of the key so that the clutch gap can be maintained at a desired setting. This dutch adjustment locking mechanism may be comprised of any apparatus, but in the preferred embodiment is comprised of one or more set screws associated with the clutch adjustment member which can be tightened to fix the position of the key once the desired clutch gap setting is achieved.

Preferably the clutch adjustment control mechanism controls movement of the key in a direction that is substantially perpendicular to the longitudinal axis of the device. As a result, the second guide preferably converts movement of the key in a direction substantially perpendicular to the longitudinal axis of the device to movement of the key in the second direction.

In the preferred embodiment, the key is positioned in a cavity defined by the ring drive mechanism. In addition, in the preferred embodiment the key is comprised of a key ramp surface oriented in the second direction and the cavity defines a complementary cavity ramp surface, so that movement of the key by the clutch adjustment control mechanism in a direction that is substantially perpendicular to the longitudinal axis of the device results in the key moving along the cavity ramp surface in the second direction, which in turn causes the dutch adjustment member to move in the second direction.

The component of movement of the key along the cavity ramp surface which is parallel to the first slot results in the dutch adjustment member moving in the first slot without imparting a significant rotational force to the dutch plate. The component of movement of the key along the cavity ramp surface which is perpendicular to the first slot results in an increase or decrease in the clutch gap by engagement of the clutch adjustment member with the clutch plate.

Alternatively, the clutch adjustment member may be fixed to the clutch plate so that the clutch adjustment member does not move relative to the clutch plate. In this second embodiment of dutch adjustment mechanism, the first guide is preferably comprised of a first slot which is oriented in a direction that is parallel to a direction of movement necessary to increase or decrease the clutch gap and is positioned between the key and the clutch plate so that the clutch adjustment member moves in the first guide. The second guide in this embodiment is preferably comprised of a second slot in the key which crosses the first slot so that the clutch adjustment member simultaneously engages both the first slot and the second slot.

In the second embodiment of clutch adjustment mechanism, the key may not include the key ramp surface, in which case the second slot is preferably oriented in the second direction. Alternatively, the key may include the key ramp surface, in which case the second slot is preferably oriented in the second direction.

The device is preferably incorporated into a drilling string by connecting the drilling shaft with the drilling string. In order that rotation of the drilling string will result in rotation of the drilling shaft, the device is further comprised of a drive connection for connecting the drilling shaft with the drilling string.

The drive connection may be comprised of any apparatus which is capable of transmitting torque from the drilling string to the drilling shaft. Preferably, the drive connection is sufficiently tight between the drilling string and the drilling shaft so that the drive connection is substantially "backlash-free".

In the preferred embodiment, the drive connection is comprised of a tolerance assimilation sleeve which is interspersed between the drilling shaft and the drilling string. In the preferred embodiment, the drive connection is further comprised of a first drive profile on the drilling shaft and a complementary second drive profile on the drilling string and the tolerance assimilation sleeve is positioned between the first drive profile and the second drive profile in order to reduce the tolerance between the first drive profile and the second drive profile.

The first and second drive profiles may be comprised of any complementary configurations which facilitate the transmission of torque between the drilling string and the drilling shaft. In the preferred embodiment, the first and second drive profiles are comprised of octagonal profiles and the tolerance assimilation sleeve includes compatible octagonal profiles. The tolerance assimilation sleeve thus absorbs or assimilates some of the tolerance between the octagonal profile on the drilling shaft and the complementary octagonal profile on the drilling string in order to make the transmission of torque between the drilling string and the drilling shaft more smooth and substantially "backlash-free".

In the preferred embodiment, the effectiveness of the tolerance assimilation sleeve is further enhanced by the sleeve being comprised of a material having a thermal expansion rate higher than the thermal expansion rate of the drilling string, so that the tolerance assimilation sleeve will absorb or assimilate more tolerance between the drilling shaft and the drilling string as the device is exposed to increasing temperatures during its operation. In the preferred embodiment, the tolerance assimilation sleeve is comprised of a beryllium copper alloy.

The deflection assembly is preferably actuated to orient the outer ring and the inner ring relative to a reference orientation so that the device may be used to provide directional control during drilling operations.

Preferably, the deflection assembly is actuated with reference to the orientation of the housing, which is preferably restrained from rotating during operation of the device by the rotation restraining device. As a result, the device is preferably further comprised of a housing orientation sensor apparatus associated with the housing for sensing the orientation of the housing.

The housing orientation sensor apparatus preferably senses the orientation of the housing in three dimensions in space and may be comprised of any apparatus which is capable of providing this sensing function and the desired accuracy in sensing. Preferably the housing orientation sensor apparatus is comprised of one or more magnetometers, accelerometers or a combination of both types of sensing apparatus.

The housing orientation sensing apparatus is preferably located as dose as possible to the distal end of the housing so that the sensed orientation of the housing will be as close as possible to the distal end of the borehole during operation of the device. In the preferred embodiment, the housing orientation sensor apparatus is contained in an at-bit-inclination (ABI) insert which is located inside the housing axially between the distal radial bearing and the deflection assembly.

The device is also preferably further comprised of a deflection assembly orientation sensor apparatus associated with the deflection assembly for sensing the orientation of the deflection assembly.

The deflection assembly orientation sensor apparatus may provide for sensing of the orientation of the outer ring and the inner ring in three dimensions in space, in which case the deflection assembly orientation sensor apparatus may be comprised of an apparatus similar to that of the housing orientation sensor apparatus and may even eliminate the need for the housing orientation sensor apparatus.

Preferably, however the deflection assembly orientation sensor apparatus senses the orientation of both the outer ring and the inner ring of the deflection assembly relative to the housing and may be comprised of any apparatus which is capable of providing this sensing function and the desired accuracy in sensing. The deflection assembly orientation sensor apparatus may be comprised of one sensor which senses the resultant orientation of the inner peripheral surface of the inner ring relative to the housing.

In the preferred embodiment, the deflection assembly orientation sensor apparatus is comprised of separate sensor apparatus for sensing the orientation of each of the outer ring and the inner ring relative to the housing. In the preferred embodiment, these sensor apparatus are comprised of a plurality of magnets associated with each of the drive mechanisms which rotate with components of the drive mechanism. The magnetic fields generated by these magnets are then sensed by a stationary counter device associated with a non-rotating component of the drive mechanism to sense how far the rings rotate from a reference or home position.

The deflection assembly orientation sensor apparatus may be further comprised of one or more high speed position sensors associated with each drive mechanism, for sensing the rotation which is actually transmitted from the drilling shaft through the clutch to the drive mechanism. The high speed position sensors may be associated with an rpm sensor which in turn is associated with the drilling shaft for sensing the rotation of the drilling shaft. A comparison of the rotation sensed by the high speed position sensors and the rotation sensed by the rpm sensor may be used to determine slippage through the clutch and detect possible malfunctioning of the clutch.

The deflection assembly is preferably actuated with reference to the orientation of both the housing and the deflection assembly, since the housing orientation sensor apparatus preferably senses the orientation of the housing in space while the deflection assembly orientation sensor apparatus preferably senses the orientation of the outer ring and the inner ring relative to the housing.

The deflection assembly may be actuated by manipulating the deflection assembly using any device or apparatus which is capable of rotating the outer and inner rings. Preferably, however the device is further comprised of a controller for controlling the actuation of the deflection assembly. Preferably, the controller is operatively connected with both the housing orientation sensor apparatus and the deflection assembly orientation sensor apparatus so that the deflection assembly may be actuated by the controller with reference to the orientation of both the housing and the deflection assembly.

The controller may be positioned at any location at which it is capable of performing the controlling function. The controller may therefore be positioned between the proximal and distal ends of the housing, along the drilling string, or may even be located outside of the borehole. In the preferred embodiment, the controller is located in an electronics insert which is positioned axially between the proximal radial bearing and the deflection assembly.

One of the features of the preferred embodiment of the invention is that the device is preferably compatible with drilling string communication systems which facilitate the transmission of data from or to downhole locations. Such communication systems often include sensors for sensing parameters such as the orientation of the drilling string. Preferably the device is capable of processing data received from sensors associated with such drilling string communication systems in order to control the actuation of the deflection assembly.

Preferably the device is operated by connecting a drilling string communication system with the device so that a drilling string orientation sensor apparatus is operatively connected with the device and the deflection assembly may be actuated with reference to the orientation of the drilling string. By considering the orientation of the drilling string, the orientation of the housing and the orientation of the deflection assembly relative to the housing, and by establishing a relationship linking the three orientations, the deflection assembly may be actuated to reflect a desired orientation of the drilling string once data pertaining to the desired orientation of the drilling string has been processed by the device to provide instructions for actuation of the deflection assembly.

This relationship linking the three orientations may be established in any manner. In the preferred embodiment the relationship is established by providing reference positions for each of the housing orientation sensor apparatus, the deflection assembly orientation sensor apparatus and the drilling string orientation sensor apparatus which can be related to one another.

The deflection assembly may be actuated indirectly by the device converting data pertaining to the orientation of the drilling string or some other parameter or the deflection assembly may be actuated directly by the device receiving instructions specifically pertaining to the actuation of the deflection assembly. Preferably, however the controller is connectable with a drilling string orientation sensor apparatus so that the deflection assembly may be actuated indirectly by the device converting data pertaining to the orientation of the drilling string.

This configuration simplifies the operation of the device, since an operator of the device need only establish a desired orientation of the drilling string through communication with the drilling string communication system. The drilling string communication system can then provide instructions to the device in the form of data pertaining to the desired orientation of the drilling string which the device will then process having regard to the orientation of the housing and the orientation of the deflection assembly relative to the housing in order to actuate the deflection assembly to reflect the desired orientation of the drilling string. Preferably the data is processed by the controller of the device.

The device may be further comprised of a device memory for storing data downloaded to control the operation of the device, data generated by the housing orientation sensor apparatus, the deflection assembly orientation sensor apparatus, the drilling string orientation sensor apparatus, or data obtained from some other source such as, for example an operator of the device. The device memory is preferably associated with the controller, but may be positioned anywhere between the proximal and distal ends of the housing, along the drilling string, or may even be located outside of the borehole. During operation of the device, data may be retrieved from the device memory as needed in order to control the operation of the device, including the actuation of the deflection assembly.

In the preferred embodiment the housing orientation sensor apparatus, the deflection assembly orientation sensor apparatus, the drilling string orientation sensor apparatus and the controller all transmit electrical signals between various components of the device and the drilling string, including the deflection assembly, the controller and the drilling string communication system.

In order to transmit electrical signals from the housing to the drilling shaft, and thus the drilling string communication system, it is necessary in the preferred embodiment to transmit these signals between two components which are rotating relative to each other, which may render conventional electrical circuits impractical for this purpose.

These signals may be transmitted between the components by any direct or indirect coupling or communication method or any mechanism, structure or device for directly or indirectly coupling the components which are rotating relative to each other. For instance, the signals may be transmitted by a slip ring or a gamma-at-bit communication toroid coupler. However, in the preferred embodiment, the signals are transmitted by an electromagnetic coupling device.

As a result, in the preferred embodiment, the device is further comprised of an electromagnetic coupling device associated with the housing and the drilling shaft for electrically connecting the drilling shaft and the housing.

This electromagnetic coupling device is preferably comprised of a housing conductor positioned on the housing and a drilling shaft conductor positioned on the drilling shaft, wherein the housing conductor and the drilling shaft conductor are positioned sufficiently dose to each other so that electrical signals may be induced between them. The conductors may be single wires or coils and may either be wrapped or not wrapped around magnetically permeable cores.

The invention is also comprised of methods for orienting a drilling system, which methods are particularly suited for orienting a rotary drilling system. The methods may be performed manually or on a fully automated or semi-automated basis.

The methods may be performed manually by having an operator provide instructions to the drilling direction control device. The methods may be performed fully automatically or semi-automatically by having a drilling string communication system provide instructions to the drilling direction control device.

As described above with respect to the apparatus embodiments, one of the features of the preferred embodiment of the invention is that the invention may be used in conjunction with drilling string communication systems and is capable of interfacing with such systems.

For example, the invention may be used in conjunction with a measurement-while-drilling (MWD) apparatus which may be incorporated into a drilling string for insertion in a borehole as part of an MWD system. In an MWD system, sensors associated with the MWD apparatus provide data to the MWD apparatus for communication up the drilling string to an operator of the drilling system. These sensors typically provide directional information about the borehole being drilled by sensing the orientation of the drilling string so that the operator can monitor the orientation of the drilling string in response to data received from the MWD apparatus and adjust the orientation of the drilling string in response to such data. An MWD system also typically enables the communication of data from the operator of the system down the borehole to the MWD apparatus.

Preferably, the drilling direction control device of the invention is capable of communicating with the MWD system or other drilling string communication system so that data concerning the orientation of the drilling string can be received by the device. Preferably, the drilling direction control device is also capable of processing data received from the drilling string communication system pertaining to the orientation of the drilling string in order to generate instructions for actuation of the deflection assembly.

In other words, preferably the drilling direction control device communicates with the drilling string communication system and not directly with the operator of the drilling system. In addition, preferably the drilling direction control device is capable of interfacing with the drilling string communication system such that it can process data received from the communication system.

This will allow the operator of the drilling system to be concerned primarily with the orientation of the drilling string during drilling operations, since the drilling direction control device will interface with the drilling string communication system and adjust the deflection assembly with reference to the orientation of the drilling string. This is made possible by establishing a relationship amongst the orientation of the drilling string, the orientation of the housing and the orientation of the deflection assembly, thus simplifying drilling operations.

Establishing a communication link between the drilling direction control device and the drilling string communication system facilitates the operation of the drilling direction control device on a fully automated or semi-automated basis with reference to the orientation of the drilling string. The device may also be operated using a combination of manual, fully automated and semi-automated methods, and may be assisted by expert systems and artificial intelligence (AI) to address actual drilling conditions that are different from the expected drilling conditions.

Operation of the drilling direction control device on a fully automated basis involves preprogramming the device with a desired actuation of the device or with a series of desired actuations of the device. The device may then be operated in conjunction with the drilling string communication system to effect drilling for a preprogrammed duration at one desired orientation of the drilling string, followed by drilling for a preprogrammed duration at a second desired orientation of the drilling string, and so on. The device may be programmed indirectly with data pertaining to the desired orientation of the drilling string or programmed directly with specific instructions pertaining to the actuation of the device. Preferably the programming is performed indirectly and the device processes the data to generate instructions for actuating the device.

Operation of the drilling direction control device on a semi-automated basis involves establishing a desired actuation of the device before the commencement of drilling operations and actuating the deflection assembly to deflect the drilling shaft to reflect the desired actuation. This desired actuation is then maintained until a new desired actuation is established and will typically require temporary cessation of drilling to permit the deflection assembly to be actuated to reflect the new desired actuation of the device. The desired actuation of the device may be established indirectly by providing the device with data pertaining to the desired orientation of the drilling string or may be established directly by providing the device with specific instructions pertaining to actuation of the device. Preferably the desired actuation of the device is given indirectly and the device processes the data to generate instructions for actuating the device.

Operation of the drilling direction control device may also involve maintaining the deflection of the drilling shaft during drilling operations so that the deflection of the drilling shaft continues to reflect the desired actuation of the device. In the preferred embodiment, the maintaining step may be necessary where some rotation of the housing is experienced during drilling operations and may involve adjusting the actuation of the deflection assembly to account for rotational displacement of the housing, since the deflection assembly in the preferred embodiment is actuated relative to the housing. The actuation of the deflection assembly may also require adjusting to account for undesired slippage of the clutch or clutch/brake comprising the drive mechanisms of the inner and outer rings of the deflection assembly.

The maintaining step may be performed manually by an operator providing instructions to the device to adjust the deflection of the drilling shaft. Preferably, however, the maintaining step is automated so that the drilling string communication system provides instructions to the device to adjust the deflection of the drilling shaft. These instructions may be given indirectly by providing the device with data pertaining to the orientation of the drilling string or may be given directly by providing the device with specific instructions for actuating the device to adjust the deflection of the drilling shaft. Preferably the instructions are given indirectly and the device processes the data to generate instructions for actuating the device.

As a result, in one method aspect of the invention, the invention is comprised of a method for orienting a rotary drilling system, the rotary drilling system being comprised of a rotatable drilling string, a drilling string communication system and a drilling direction control device, the drilling direction control device comprising a deflectable drilling shaft connected with the drilling string, the method comprising the following steps:

(a) orienting the drilling string at a desired orientation;
(b) sensing the desired orientation of the drilling string with the drilling string communication system;
(c) communicating the desired orientation of the drilling string to the drilling direction control device; and
(d) actuating the drilling direction control device to deflect the drilling shaft to reflect the desired orientation.

Preferably the drilling direction control device is actuated to reflect the desired orientation by actuating the device to account for the relative positions of the drilling string and the actuating apparatus. In a preferred embodiment, the drilling direction control device is further comprised of a housing and a deflection assembly, and the drilling direction control device is actuated to reflect the desired orientation of the device by accounting for the relative positions of the drilling string, the housing and the deflection assembly.

The drilling direction control device may be actuated in any manner and may be powered separately from the rotary drilling system. In the preferred embodiment, the drilling direction control device is actuated by rotation of the drilling string and the actuating step is comprised of rotating the drilling string.

The orienting step may be comprised of communicating the desired orientation of the drilling string directly from the surface of the wellbore to the drilling direction control device either with or without manipulating the drilling string. Preferably, however, the orienting step is comprised of comparing a current orientation of the drilling string with the desired orientation of the drilling string and rotating the drilling string to eliminate any discrepancy between the current orientation and the desired orientation. Once the desired orientation of the drilling string is achieved by manipulation of the drilling string, the desired orientation may then be communicated to the drilling direction control device either directly from the surface of the wellbore or from a drilling string orientation sensor located somewhere on the drilling string.

The method may also be comprised of the further step of periodically communicating the current orientation of the drilling string to the drilling direction control device. Preferably, the current orientation of the drilling string is periodically communicated to the drilling direction control device after a predetermined delay.

The step of communicating the desired orientation of the drilling string to the drilling direction control device may be comprised of communicating the desired orientation of the drilling string from the drilling string communication system to the drilling direction control device and the step of periodically communicating the current orientation of the drilling string to the drilling direction control device may be comprised of periodically communicating the current orientation of the drilling string from the drilling string communication system to the drilling direction control device.

The actuating step may be comprised of waiting for a period of time equal to or greater than the predetermined delay once the drilling string is oriented at the desired orientation so that the desired orientation of the drilling string is communicated to the drilling direction control device and rotating the drilling string to actuate the drilling direction control device to reflect the desired orientation of the drilling string.

The drilling direction control device may be further comprised of a device memory, in which case the method may be further comprised of the step of storing the current orientation of the drilling string in the device memory when it is communicated to the drilling direction control device.

Where the drilling direction control device is further comprised of a device memory, the actuating step may be further comprised of the steps of retrieving from the device memory the desired orientation of the drilling string and rotating the drilling string to actuate the drilling direction control device to reflect the desired orientation of the drilling string.

The method may be further comprised of the step of maintaining the deflection of the drilling shaft to reflect the desired orientation of the drilling shaft during operation of the rotary drilling system. The orientation maintaining step may be comprised of the steps of communicating the current orientation of the drilling string from the drilling string communication system to the drilling direction control device and actuating the drilling direction control device to reflect the desired orientation of the drilling string and the current orientation of the drilling shaft.

In a second method aspect of the invention, the invention is comprised of a method for orienting a rotary drilling system, the rotary drilling system being comprised of a rotatable drilling string, a drilling string communication system and a drilling direction control device, the drilling direction control device comprising a deflectable drilling shaft connected with the drilling string, the method comprising the following steps:

(a) communicating a desired orientation of the drilling string to the drilling direction control device; and (b) actuating the drilling direction control device to deflect the drilling shaft to reflect the desired orientation.

Preferably the drilling direction control device is actuated to reflect the desired orientation by actuating the device to account for the relative positions of the drilling string and the actuating apparatus. In a preferred embodiment, the drilling direction control device is further comprised of a housing and a deflection assembly, and the drilling direction control device is actuated to reflect the desired orientation of the device by accounting for the relative positions of the drilling string, the housing and the deflection assembly.

The drilling direction control device may be actuated in any manner and may be powered separately from the rotary drilling system. In the preferred embodiment, the drilling direction control device is actuated by rotation of the drilling string and the actuating step is comprised of rotating the drilling string.

The method may also be comprised of the further step of periodically communicating the current orientation of the drilling string to the drilling direction control device. Preferably, the current orientation of the drilling string is periodically communicated to the drilling direction control device after a predetermined delay.

The step of communicating the desired orientation of the drilling string to the drilling direction control device may be comprised of communicating the desired orientation of the drilling string from the drilling string communication system to the drilling direction control device and the step of periodically communicating the current orientation of the drilling string to the drilling direction control device may be comprised of periodically communicating the current orientation of the drilling string from the drilling string communication system to the drilling direction control device.

The actuating step may be comprised of waiting for a period of time less than the predetermined delay so that the current orientation of the drilling string is not communicated to the drilling direction control device and rotating the drilling string to actuate the drilling direction control device to reflect the desired orientation of the drilling string.

The drilling direction control device may be further comprised of a device memory, in which case the method may be further comprised of the step of storing the desired orientation of the drilling string in the device memory when it is communicated to the drilling direction control device.

Where the drilling direction control device is further comprised of a device memory, the actuating step may be further comprised of the steps of retrieving from the device memory the desired orientation of the drilling string and rotating the drilling string to actuate the drilling direction control device to reflect the desired orientation of the drilling string.

The method may be further comprised of the step of maintaining the deflection of the drilling shaft to reflect the desired orientation of the drilling shaft during operation of the rotary drilling system. The orientation maintaining step may be comprised of the steps of communicating the current orientation of the drilling string from the drilling string communication system to the drilling direction control device and actuating the drilling direction control device to reflect the desired orientation of the drilling string and the current orientation of the drilling shaft.

In a third method aspect of the invention, the invention is comprised of a method for orienting a rotary drilling system, the rotary drilling system being comprised of a rotatable drilling string, a drilling string communication system, and a drilling direction control device, the drilling direction control device comprising a deflectable drilling shaft connected with the drilling string, the method comprising the following steps:

(a) determining a desired orientation of the rotary drilling system;

(b) communicating the desired orientation of the rotary drilling system from the drilling string communication system to the drilling direction control device; and (c) actuating the drilling direction control device to deflect the drilling shaft to reflect the desired orientation of the rotary drilling system.

The drilling direction control device may be further comprised of a device memory, in which case the method may be further comprised of the step of storing the desired orientation of the rotary drilling system in the device memory when it is communicated to the drilling direction control device.

Where the drilling direction control device is further comprised of a device memory, the actuating step may be further comprised of the steps of retrieving from the device memory the desired orientation of the rotary drilling system and rotating the drilling string to actuate the drilling direction control device to reflect the desired orientation of the rotary drilling system.

The method may be further comprised of the step of maintaining the desired orientation of the rotary drilling system during operation of the rotary drilling system. The orientation maintaining step may be comprised of the steps of communicating the current orientation of the rotary drilling system from the drilling string communication system to the drilling direction control device and actuating the drilling direction control device to reflect the desired orientation of the rotary drilling system and the current orientation of the drilling shaft.

In any of the method aspects of the invention, the drilling direction control device may be further comprised of a housing for rotatably supporting the drilling shaft and the orientation maintaining step may be comprised of adjusting the deflection of the drilling shaft to account for rotation of the housing during drilling operations.

In addition, the drilling direction control device is preferably equipped to respond to basic default instructions concerning the magnitude of deflection of the drilling shaft. For example, the device is preferably equipped to provide for a zero deflection mode where the inner and outer rings are oriented opposite to each other to provide for no deflection of the drilling shaft and a full deflection mode where the deflection of the drilling shaft is a maximum predetermined amount, which predetermined amount may be equal to or less than the maximum deflection permitted by the deflection assembly. The device may also be equipped to respond to a plurality of default instructions such as zero deflection, full deflection and numerous magnitudes of deflection in between.

Where the device is in zero deflection mode, drilling is performed without altering the drilling direction. In other words, drilling is permitted to proceed in a substantially straight direction. The zero deflection mode also permits the device to be run into and out of the wellbore.

BRIEF DESCRIPTION OF DRAWINGS

Embodiments of the invention will now be described with reference to the accompanying drawings, in which:

FIG. 2(a) is a pictorial side view, having a cut-away portion, of the drilling direction control device shown in FIG. 1 contained within a wellbore and comprising a drilling shaft, wherein the drilling shaft is in an undeflected condition;

FIG. 2(b) is a schematic cross-sectional view of a deflection assembly of the drilling direction control device shown in FIG. 2(a) in an undeflected condition;

FIG. 3(a) is a pictorial side view, having a cut-away portion, of the drilling direction control device shown in FIG. 1 contained within a wellbore, wherein the drilling shaft is in a deflected condition;

FIG. 3(b) is a schematic cross-sectional view of a deflection assembly of the drilling direction control device shown in FIG. 3(a) in a deflected condition;

FIGS. 4(a) through 4(g) are longitudinal sectional views of the drilling direction control device shown in FIGS. 2 and 3, wherein FIGS. 4(b) through 4(g) are lower continuations of FIGS. 4(a) through 4(f) respectively;

DETAILED DESCRIPTION

Figure 1:
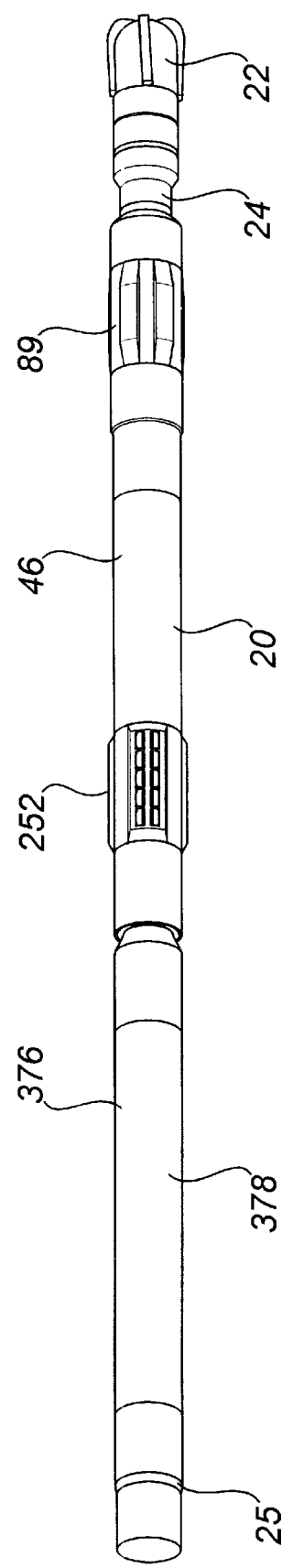
FIG. 1 is a pictorial side view of a preferred embodiment of a drilling direction control device comprising a rotary drilling system.
Figure 4C:
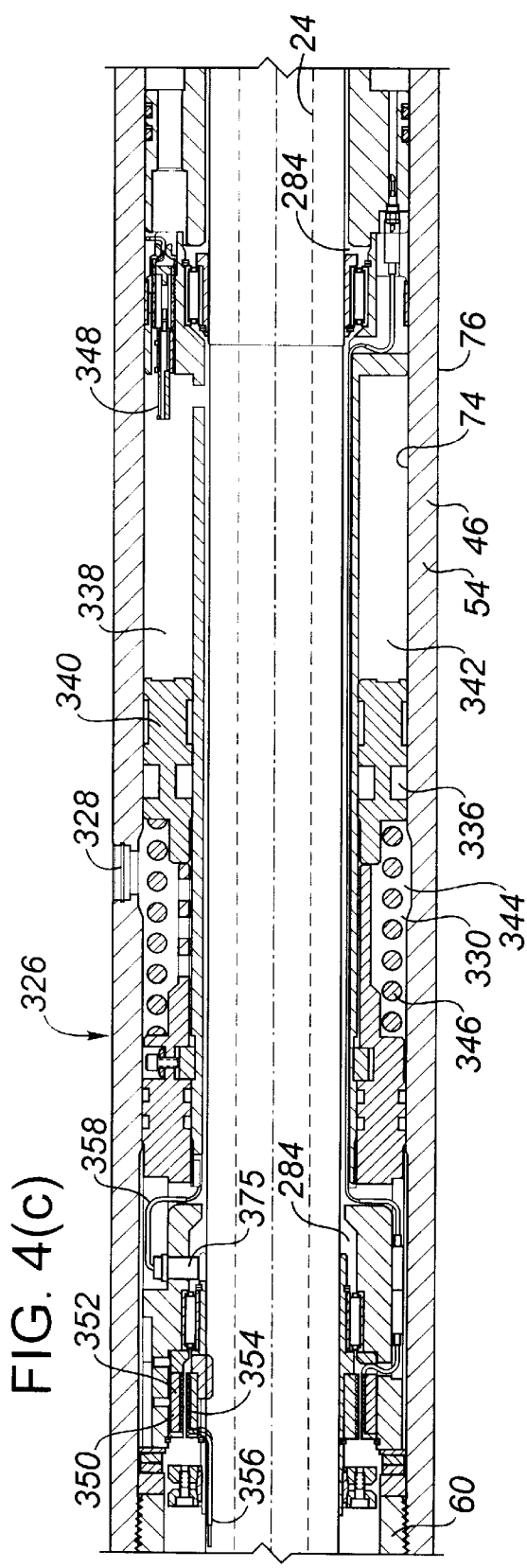
Figure 4D:
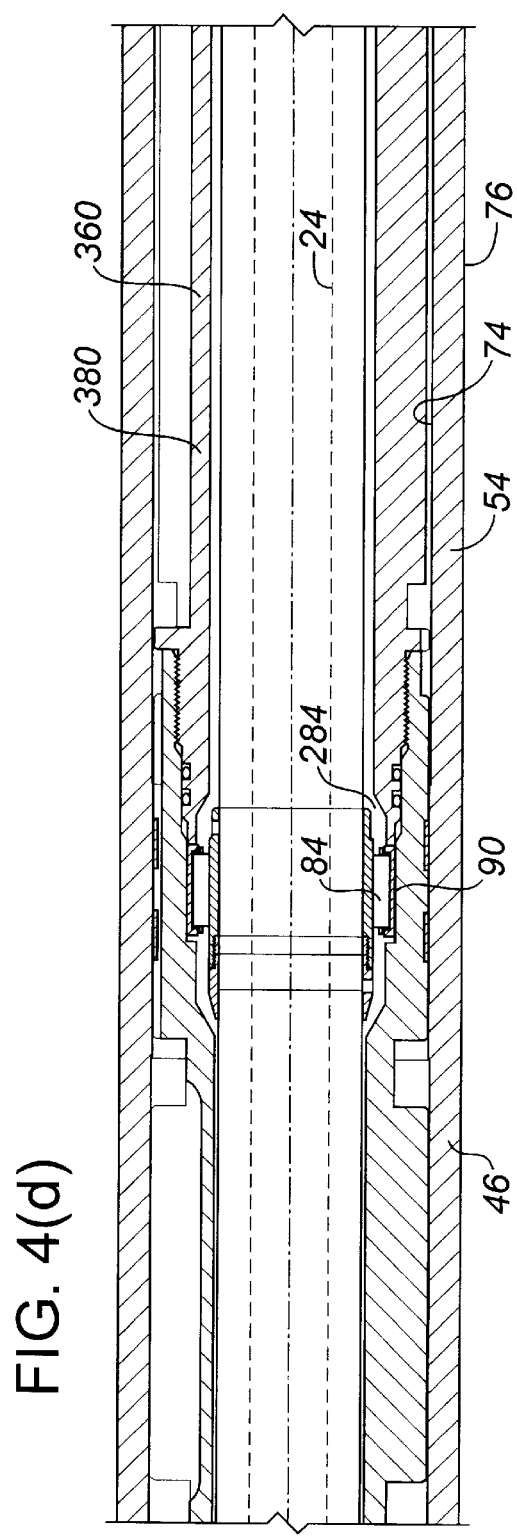
Figure 4G:
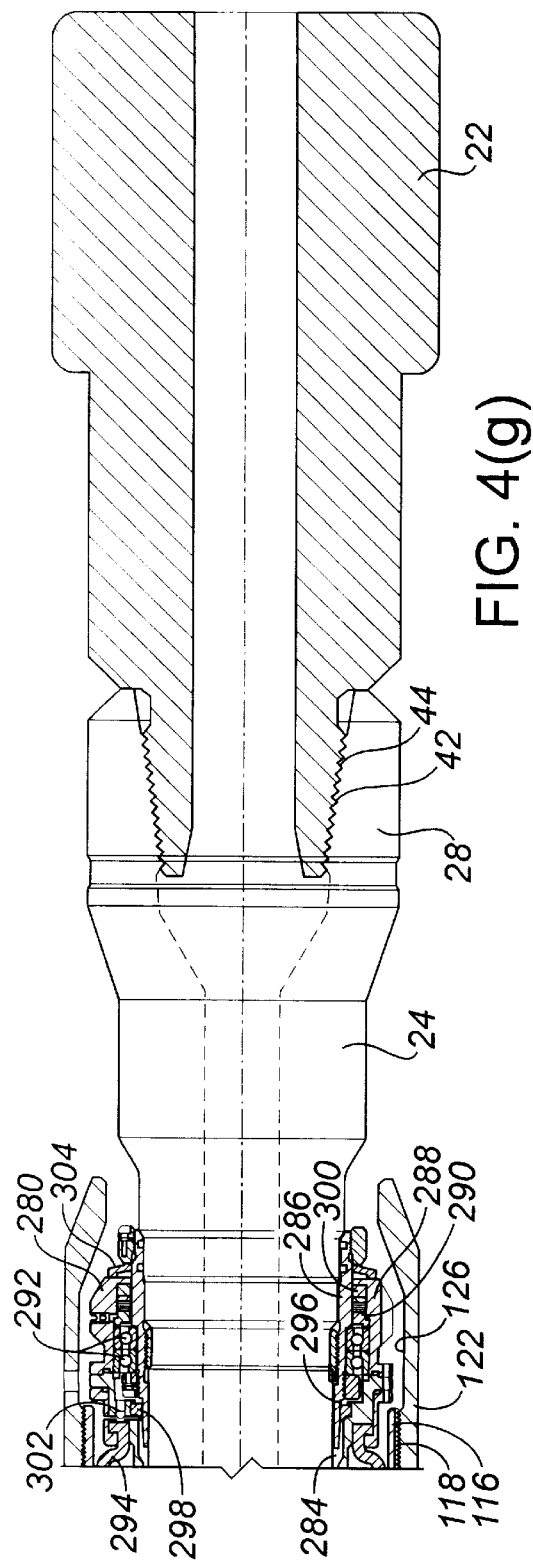
Figure 5:
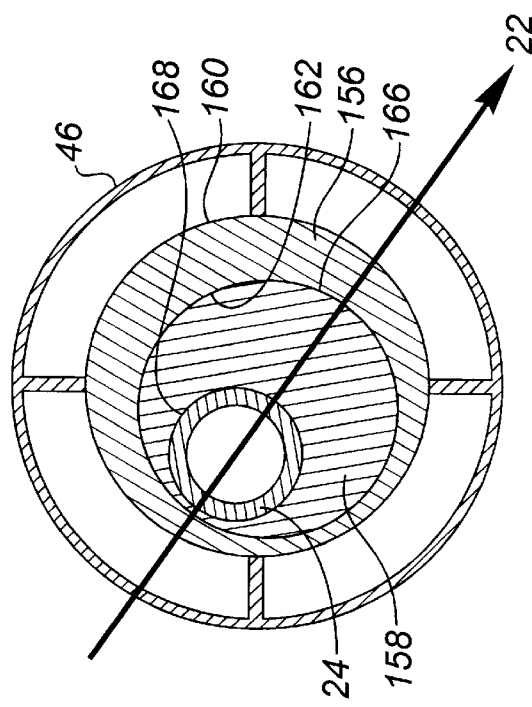
FIG. 5 is a more detailed schematic cross-sectional view of the deflection assembly of the drilling direction control device shown in FIGS. 2(b) and 3(b)
Figure 6:
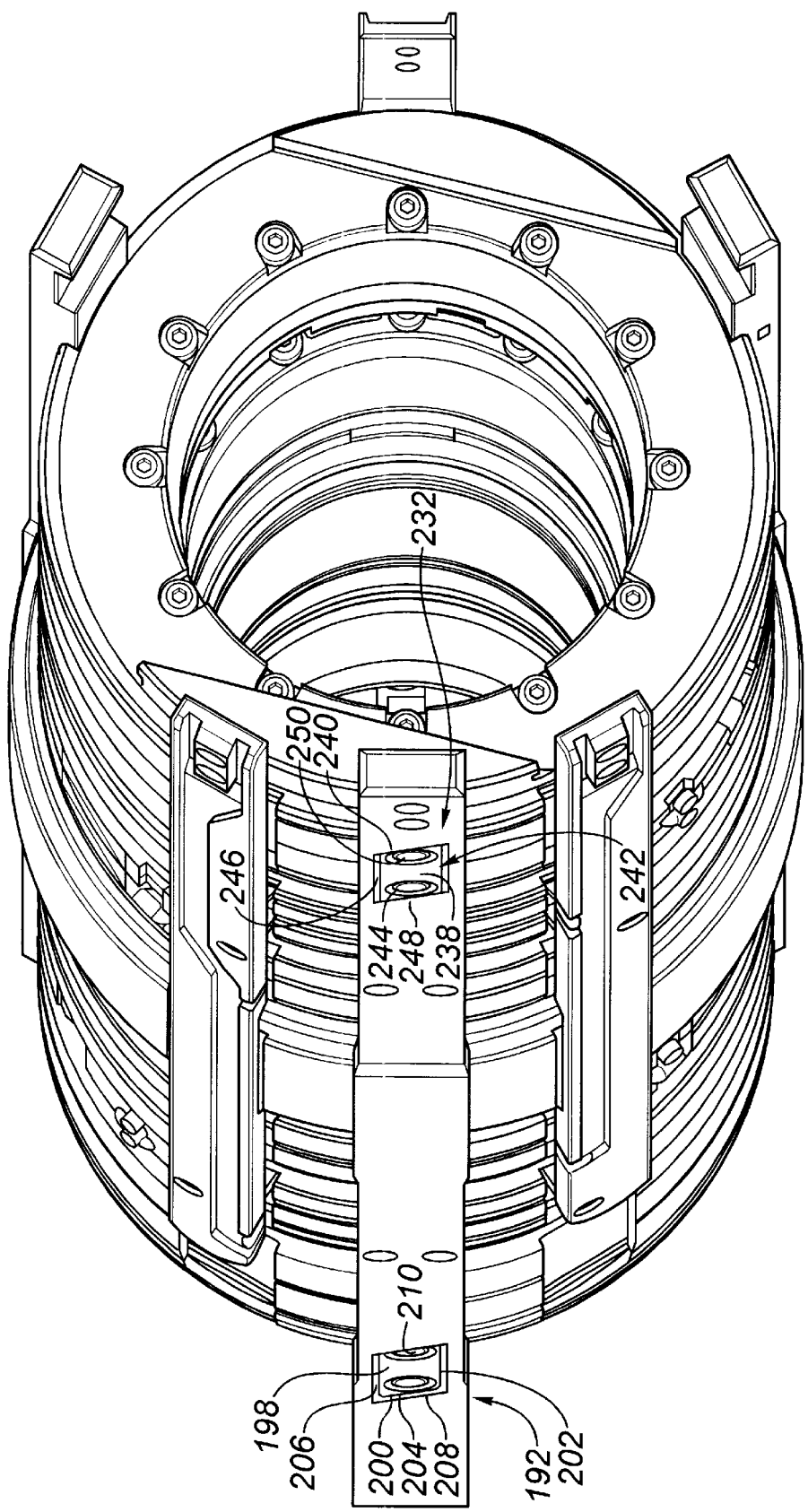
FIG. 6 is a pictorial view of a portion of the deflection assembly of the drilling direction control device shown in FIG. 1.
Figure 7:
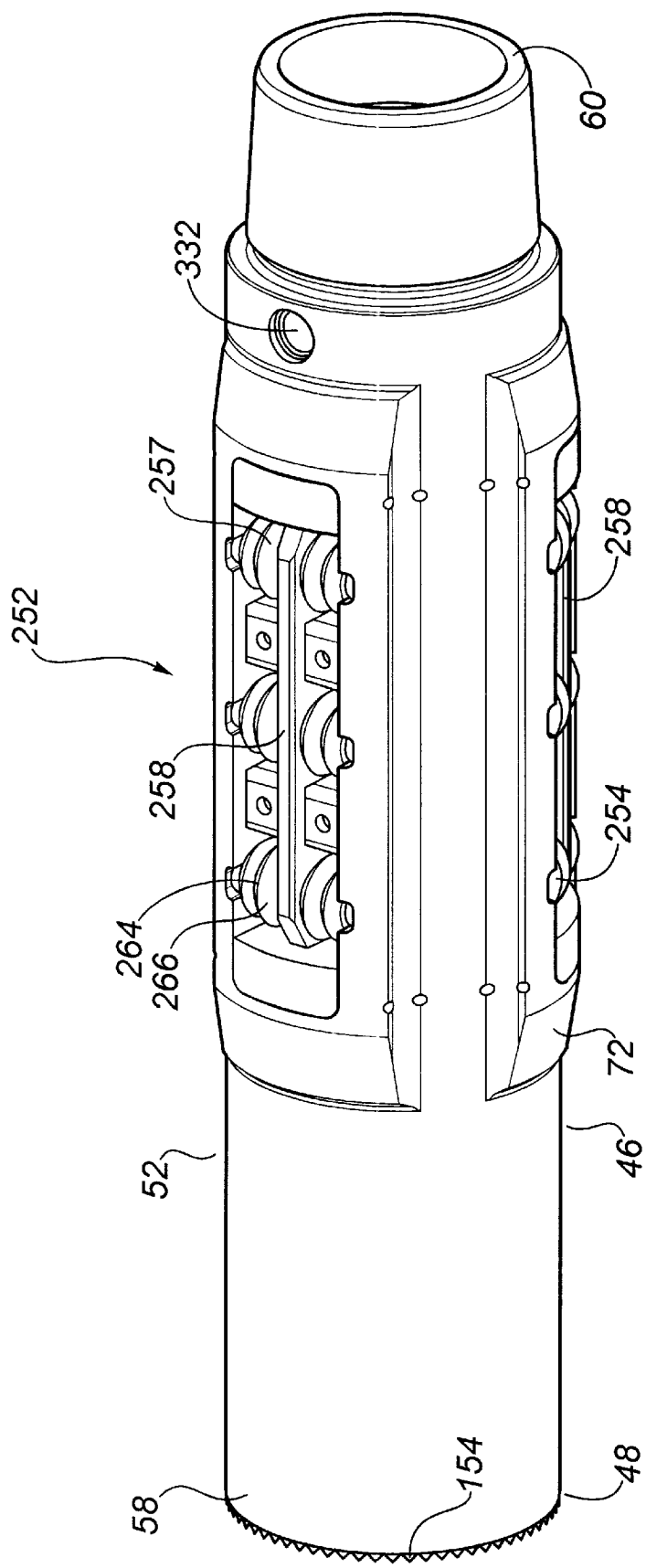
FIG. 7 is a pictorial side view of a preferred rotation restraining device comprising the drilling direction control device shown in FIG. 1.
Figure 8:
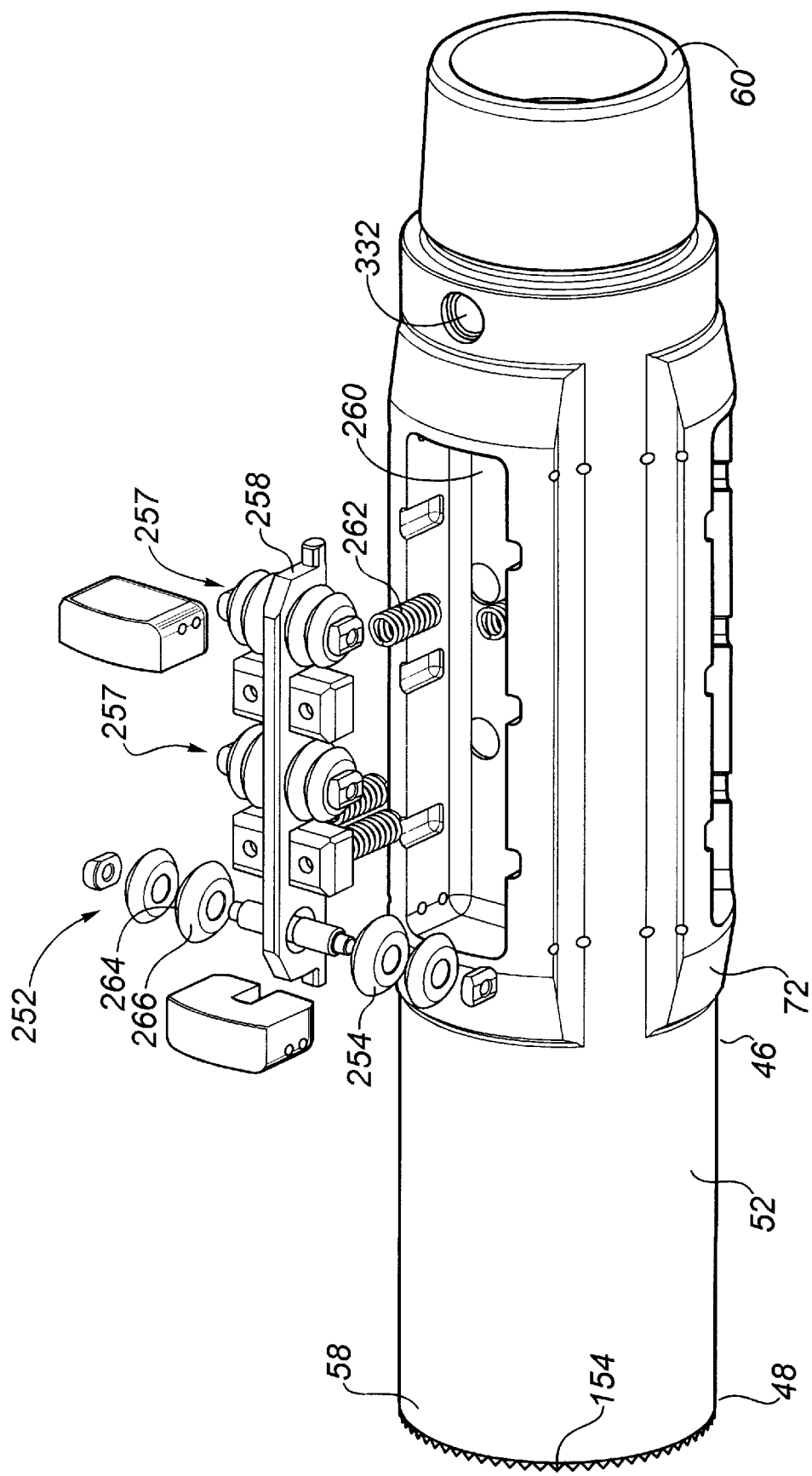
FIG. 8 is an exploded pictorial side view of the preferred rotation restraining device shown in FIG. 7.
Figure 9:
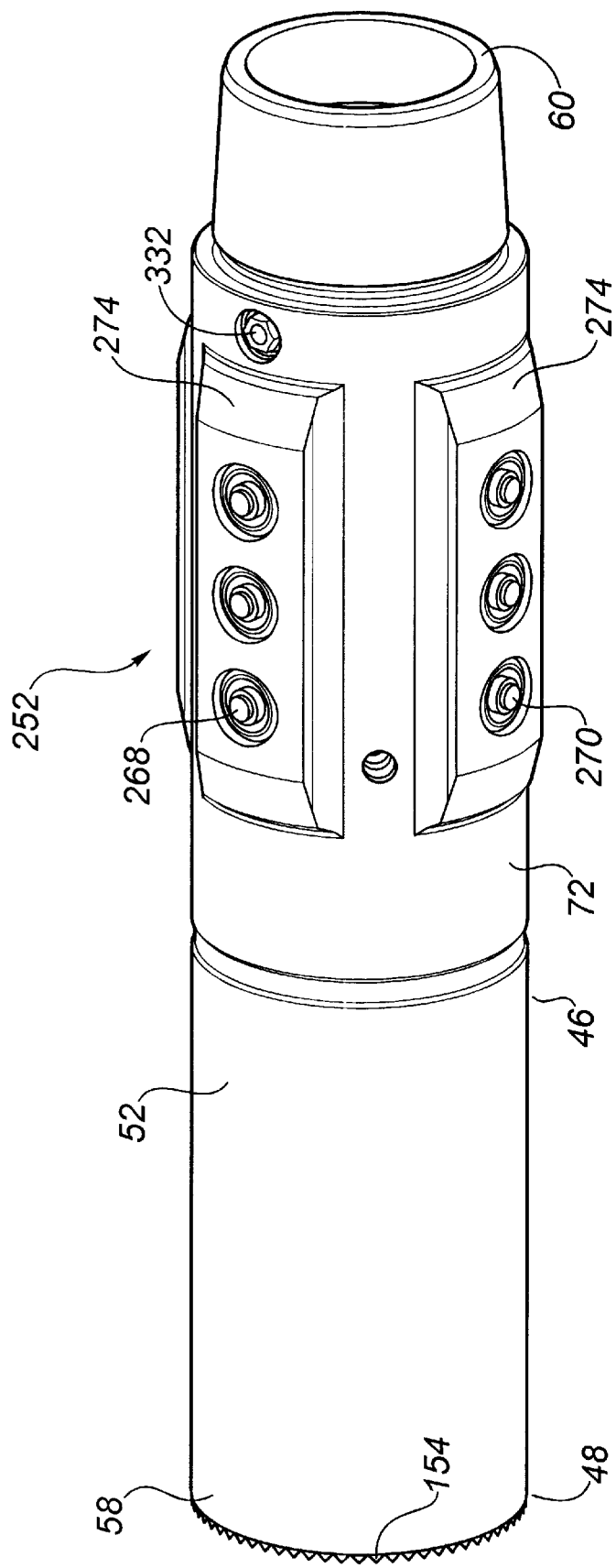
FIG. 9 is a pictorial side view of an alternate rotation restraining device comprising the drilling direction control device shown in FIG. 1.
Figure 10:
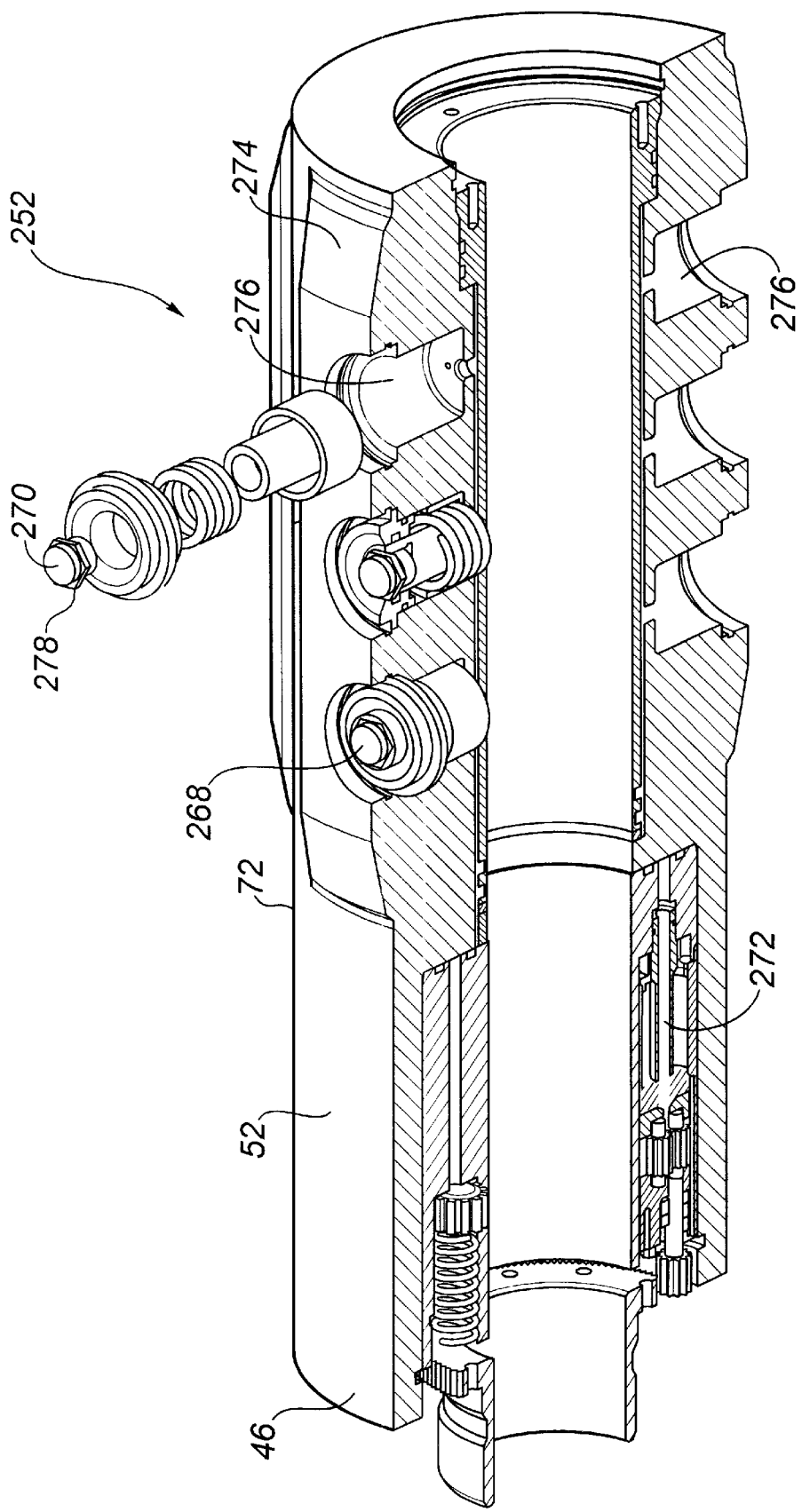
FIG. 10 is an exploded pictorial side view of the alternate rotation restraining device shown in FIG. 9.

The within invention is comprised of a drilling direction control device (20) and a method for using the device (20). The device (20) permits directional control over a drilling bit (22) connected with the device (20) during rotary drilling operations by controlling the orientation of the drilling bit (22). As a result, the direction of the resulting wellbore may be controlled. Specifically, in the preferred embodiment, the device (20) and method of the within invention maintain the desired orientation of the drilling bit (22) by maintaining the desired toolface of the drilling bit (22) and the desired bit tilt angle, while preferably enhancing the rotations per minute and rate of penetration.

The drilling direction control device (20) is comprised of a rotatable drilling shaft (24) which is connectable or attachable to a rotary drilling string (25) during the drilling operation. More particularly, the drilling shaft (24) has a proximal end (26) and a distal end (28). The proximal end (26) is drivingly connectable or attachable with the rotary drilling string (25) such that rotation of the drilling string (25) from the surface results in a corresponding rotation of the drilling shaft (24). The proximal end (26) of the drilling shaft (24) may be permanently or removably attached, connected or otherwise affixed with the drilling string (25) in any manner and by any structure, mechanism, device or method permitting the rotation of the drilling shaft (24) upon the rotation of the drilling string (25).

Preferably, the device (20) is further comprised of a drive connection for connecting the drilling shaft (24) with the drilling string (25). As indicated, the drive connection may be comprised of any structure, mechanism or device for drivingly connecting the drilling shaft (24) and the drilling string (25) so that rotation of the drilling string (25) results in a corresponding rotation of the drilling shaft (24). However, preferably, the drive connection is comprised of a tolerance assimilation sleeve (30). More particularly, the tolerance assimilation sleeve (30) is interspersed or positioned between the proximal end (26) of the drilling shaft (24) and the adjacent end of the drilling string (25).

Preferably, the drive connection is comprised of a first drive profile (32) on or defined by the drilling shaft (24), and particularly, on or defined by the proximal end (26) of the drilling shaft (24). The drive connection is further comprised of a second drive profile (34), complementary to the first drive profile (32), on or defined by the adjacent end of the drilling string (25) to be drivingly connected with the drilling shaft (24) of the device (20). The tolerance assimilation sleeve (30) is positioned or interspersed between the first drive profile (32) and the second drive profile (34) in order to reduce the tolerance between the first drive profile (32) and the second drive profile (34) and provide a backlash free drive. The first and second drive profiles (32, 34) are thus sized and configured to be complementary to and compatible with the tolerance assimilation sleeve (30) therebetween.

In the preferred embodiment, the first drive profile (32) is defined by an outer surface (33) of the proximal end (26) of the drilling shaft (24). Further, the second drive profile (34) is defined by an inner surface (36) of the adjacent end of the drilling string (25). Thus, the tolerance assimilation sleeve (30) is positioned between the outer surface (33) of the drilling shaft (24) and the inner surface (36) of the drilling string (25). More particularly, the tolerance assimilation sleeve (30) has an outer surface (38) for engaging the inner surface (36) of the drilling string (25) and an inner surface (40) for engaging the outer surface (33) of the drilling shaft (24).

As indicated, the adjacent outer surface (38) of the sleeve (30) and inner surface (36) of the drilling string (25) and adjacent inner surface (40) of the sleeve (30) and outer surface (33) of the drilling shaft (24) may have any shape or configuration compatible with providing a driving connection therebetween and capable of reducing the tolerance between the first drive profile (32) and the complementary second drive profile (34). However, in the preferred embodiment, the tolerance assimilation sleeve (30) has octagonal internal and external profiles. In other words, both the inner and outer surfaces (40, 38) of the sleeve (30) are octagonal on cross-section.

In addition, preferably, the drilling shaft (24), the drilling string (25) and the tolerance assimilation sleeve (30) therebetween are configured such that torque or radial loads only are transmitted between the drilling shaft (24) and the drilling string (25). In other words, preferably, no significant axial forces or loads are transmitted therebetween by the tolerance assimilation sleeve (30). Thus, although the tolerance assimilation sleeve (30) may be tied or anchored with one of the drilling shaft (24) and the drilling string (25), it is preferably not tied or anchored with both the drilling shaft (24) and the drilling string (25). In the preferred embodiment, the tolerance assimilation sleeve (30) is tied or anchored with neither the drilling shaft (24) nor the drilling string (25).

Further, the tolerance assimilation sleeve (30) may reduce the tolerance between the first and second drive profiles (32, 34) in any manner and by any mechanism of action. For instance, preferably, the tolerance assimilation sleeve is comprised of a material having a thermal expansion rate higher than the thermal expansion rate of the drilling string (25). In the preferred embodiment, the drilling shaft (24) has the highest thermal expansion rate and the drilling string (25) has the lowest thermal expansion rate. The thermal expansion rate of the tolerance assimilation sleeve (30) is preferably between that of the drilling shaft (24) and the drilling string (25).

Any material providing for this differential rate of thermal expansion and having a relatively high strength compatible with the drilling operation may be used. However, in the preferred embodiment, the tolerance assimilation sleeve (30) is a beryllium copper sleeve.

Similarly, the distal end (28) of the drilling shaft (24) is drivingly connectable or attachable with the rotary drilling bit (22) such that rotation of the drilling shaft (24) by the drilling string (25) results in a corresponding rotation of the drilling bit (22). The distal end (28) of the drilling shaft (24) may be permanently or removably attached, connected or otherwise affixed with the drilling bit (22) in any manner and by any structure, mechanism, device or method permitting the rotation of the drilling bit (22) upon the rotation of the drilling shaft (24). In the preferred embodiment, a threaded connection is provided therebetween. More particularly, an inner surface (42) of the distal end (28) of the drilling shaft (24) is threadably connected and drivingly engaged with an adjacent outer surface (44) of the drilling bit (22).

The device (20) of the within invention provides for the controlled deflection of the drilling shaft (24) resulting in a bend or curvature of the drilling shaft (24), as described further below, in order to provide the desired deflection of the attached drilling bit (22). Preferably, the orientation of the deflection of the drilling shaft (24) may be altered to alter the orientation of the drilling bit (22) or tool face, while the magnitude of the deflection of the drilling shaft (24) may be altered to vary the magnitude of the deflection of the drilling bit (22) or the bit tilt.

The drilling shaft (24) may be comprised of one or more elements or portions connected, attached or otherwise affixed together in any suitable manner providing a unitary drilling shaft (24) between the proximal and distal ends (26, 28). Preferably, any connections provided between the elements or portions of the drilling shaft (24) are relatively rigid such that the drilling shaft (24) does not include any flexible joints or articulations therein. In the preferred embodiment, the drilling shaft (24) is comprised of a single, unitary or integral element extending between the proximal and distal ends (26, 28). Further, the drilling shaft (24) is tubular or hollow to permit drilling fluid to flow therethrough in a relatively unrestricted or unimpeded manner.

Finally, the drilling shaft (24) may be comprised of any material suitable for and compatible with rotary drilling. In the preferred embodiment, the drilling shaft (24) is comprised of high strength stainless steel.

Further, the device (20) is comprised of a housing (46) for rotatably supporting a length of the drilling shaft (24) for rotation therein upon rotation of the attached drilling string (25). The housing (46) may support, and extend along, any length of the drilling shaft (24). However, preferably, the housing (46) supports substantially the entire length of the drilling shaft (24) and extends substantially between the proximal and distal ends (26, 28) of the drilling shaft (24).

In the preferred embodiment, the housing (46) has a proximal end (48) adjacent or in proximity to the proximal end (26) of the drilling shaft (24). Specifically, the proximal end (26) of the drilling shaft (24) extends from the proximal end (48) of the housing (46) for connection with the drilling string (25). However, in addition, a portion of the adjacent drilling string (25) may extend within the proximal end (48) of the housing (46). Similarly, in the preferred embodiment, the housing (46) has a distal end (50) adjacent or in proximity to the distal end (28) of the drilling shaft (24). Specifically, the distal end (28) of the drilling shaft (24) extends from the distal end (50) of the housing (46) for connection with the drilling bit (22).

The housing (46) may be comprised of one or more tubular or hollow elements, sections or components permanently or removably connected, attached or otherwise affixed together to provide a unitary or integral housing (46) permitting the drilling shaft (24) to extend therethrough. However, in the preferred embodiment, the housing (46) is comprised of three sections or portions connected together. Specifically, starting at the proximal end (48) and moving towards the distal end (50) of the housing (46), the housing (46) is comprised of a proximal housing section (52), a central housing section (54) and a distal housing section (56).

More particularly, the proximal end (48) of the housing (46) is defined by a proximal end (58) of the proximal housing section (52). A distal end (60) of the proximal housing section (52) is connected with a proximal end (62) of the central housing section (54). Similarly, a distal end (64) of the central housing section (54) is connected with a proximal end (66) of the distal housing section (56). The distal end (50) of the housing (46) is defined by a distal end (68) of the distal housing section (56).

As indicated, the distal end (60) of the proximal housing section (52) and the proximal end (62) of the central housing section (54), as well as the distal end (64) of the central housing section (54) and the proximal end (66) of the distal housing section (56), may each be permanently or removably attached, connected or otherwise affixed together in any manner and by any structure, mechanism, device or method permitting the formation of a unitary housing (46).

However, in the preferred embodiment, both of the connections are provided by a threaded connection between the adjacent ends. More particularly, the proximal housing section (52) has an inner surface (70) and an outer surface (72). Similarly, the central housing section (54) has an inner surface (74) and an outer surface (76) and the distal housing section (56) has an inner surface (78) and an outer surface (80). The outer surface (72) of the proximal housing section (52) at its distal end (60) is threadably connected with the inner surface (74) of the central housing section (54) at its proximal end (62). Similarly, the outer surface (76) of the central housing section (54) at its distal end (64) is threadably connected with the inner surface (78) of the distal housing section (56) at its proximal end (66).

The device (20) is further comprised of at least one distal radial bearing (82) and at least one proximal radial bearing (84). Each of the radial bearings (82, 84) is contained within the housing (46) for rotatably supporting the drilling shaft (24) radially at the location of that particular radial bearing (82, 84). The radial bearings (82, 84) may be positioned at any locations along the length of the drilling shaft (24) permitting the bearings (82, 84) to rotatably radially support the drilling shaft (24) within the housing (46). In addition, the radial bearings (82, 84) are positioned between the drilling shaft (24) and the housing (46).

In addition, one or more further radial bearings may be contained within the housing (46) to assist in supporting the drilling shaft (24). Where such further radial bearings are provided, these further radial bearings are located distally or downhole to the distal radial bearing (82) and proximally or uphole of the proximal radial bearing (84). In other words, preferably, the further radial bearings are not located between the distal and proximal radial bearings (82,84).

Preferably, at least one distal radial bearing (82) is contained within the housing (46) for rotatably supporting the drilling shaft (24) radially at a distal radial bearing location (86) defined thereby. In the preferred embodiment, the distal radial bearing (82) is contained within the distal housing section (56), positioned between the inner surface (78) of the distal housing section (56) and the drilling shaft (24), for rotatably supporting the drilling shaft (24) radially at the distal radial bearing location (86) defined thereby.

Although the distal radial bearing (82) may be comprised of any radial bearing able to rotatably support the drilling shaft (24) within the housing (46) at the distal radial bearing location (86), the distal radial bearing (82) is preferably comprised of a fulcrum bearing (88), also referred to as a focal bearing, as described in greater detail below. The fulcrum bearing (88) facilitates the pivoting of the drilling shaft (24) at the distal radial bearing location (86) upon the controlled deflection of the drilling shaft (24) by the device (20) to produce a bending or curvature of the drilling shaft (24) in order to orient or direct the drilling bit (22).

Preferably, the device (20) is further comprised of a near bit stabilizer (89), which in the preferred embodiment is located adjacent to the distal end (50) of the housing (46) and coincides with the distal radial bearing location (86). The near bit stabilizer (89) may be comprised of any type of stabilizer.

Further, preferably, at least one proximal radial bearing (84) is contained within the housing (46) for rotatably supporting the drilling shaft (24) radially at a proximal radial bearing location (90) defined thereby. In the preferred embodiment, the proximal radial bearing (84) is contained within the central housing section (54), positioned between the inner surface (74) of the central housing section (54) and the drilling shaft (24), for rotatably supporting the drilling shaft (24) radially at the proximal radial bearing location (90) defined thereby.

Although the proximal radial bearing (84) may be comprised of any radial bearing able to rotatably radially support the drilling shaft (24) within the housing (46) at the proximal radial bearing location (90), the proximal radial bearing (84) is preferably comprised of a cantilever bearing.

Upon the controlled deflection of the drilling shaft (24) by the device (20), as described further below, the curvature or bending of the drilling shaft (24) is produced downhole of the cantilever proximal radial bearing (84). In other words, the controlled deflection of the drilling shaft (24), and thus the curvature of the drilling shaft (24), occurs between the proximal radial bearing location (90) and the distal radial bearing location (86). The cantilever nature of the proximal radial bearing (84) inhibits the bending of the drilling shaft (24) uphole or above the proximal radial bearing (84). The fulcrum bearing comprising the distal radial bearing (82)

facilitates the pivoting of the drilling shaft (24) and permits the drilling bit (22) to tilt in any desired direction. Specifically, the drilling bit (22) is permitted to tilt in the opposite direction of the bending direction.

Further, the device (20) is comprised of a drilling shaft deflection assembly (92) contained within the housing (46) for bending the drilling shaft (24) therein. The deflection assembly (92) may be located axially at any location or position between the distal end (50) and the proximal end (48) of the housing (46). However, the distal radial bearing location (86) is preferably axially located between the distal end (50) of the housing (46) and the deflection assembly (92), while the proximal radial bearing location (90) is preferably axially located between the proximal end (48) of the housing (46) and the deflection assembly (92). In other words, the drilling shaft deflection assembly (92) is preferably located axially along the length of the drilling shaft (24) at a location or position between the distal radial bearing location (86) and the proximal radial bearing location (90). As described previously, in the preferred embodiment, the deflection assembly (92) is provided for bending the drilling shaft (24) between the distal radial bearing location (86) and the proximal radial bearing location (90).

In the preferred embodiment, the deflection assembly (92) is contained within the distal housing section (56) between the inner surface (78) of the distal housing section (56) and the drilling string (24). The distal radial bearing location (86) is axially located between the distal end (68) of the distal housing section (56) and the deflection assembly (92), while the proximal radial bearing location (90) is axially located between the deflection assembly (92) and the proximal end (48) of the housing (46).

In addition to the radial bearings (82, 84) for rotatably supporting the drilling shaft (24) radially, the device (20) further preferably includes one or more thrust bearings for rotatably supporting the drilling shaft (24) axially. Preferably, the device (20) is comprised of at least one distal thrust bearing (94) and at least one proximal thrust bearing (96). As indicated, each of the thrust bearings (94, 96) is contained within the housing (46) for rotatably supporting the drilling shaft (24) axially at the location of that particular thrust bearing (94, 96). The thrust bearings (94, 96) may be positioned at any locations along the length of the drilling shaft (24) permitting the bearings (94, 96) to rotatably support the drilling shaft (24) axially within the housing (46). In addition, the thrust bearings (94, 96) are positioned between the drilling shaft (24) and the housing (46).

However, preferably, at least one distal thrust bearing (94) is contained within the housing (46) for rotatably supporting the drilling shaft (24) axially at a distal thrust bearing location (98) defined thereby. The distal thrust bearing location (98) is preferably located axially between the distal end (50) of the housing (46) and the deflection assembly (92). In the preferred embodiment, the distal thrust bearing (94) is contained within the distal housing section (56), positioned between the inner surface (78) of the distal housing section (56) and the drilling shaft (24), for rotatably supporting the drilling shaft (24) axially. Thus, the distal thrust bearing location (98) is located axially between the distal end (68) of the distal housing section (56) and the deflection assembly (92).

Although the distal thrust bearing (94) may be comprised of any thrust bearing able to rotatably and axially support the drilling shaft (24) within the housing (46) at the distal thrust bearing location (98), the distal thrust bearing (94) is preferably comprised of the fulcrum bearing (88) described above. Thus, the distal thrust bearing location (98) is at the distal radial bearing location (86).

Further, preferably, at least one proximal thrust bearing (96) is contained within the housing (46) for rotatably supporting the drilling shaft (24) axially at a proximal thrust bearing location (100) defined thereby. The proximal thrust bearing location (100) is preferably located axially between the proximal end (48) of the housing (46) and the deflection assembly (92). In addition, more preferably, the proximal thrust bearing location (100) is located axially between the proximal end (48) of the housing (46) and the proximal radial bearing location (90).

Preferably, the proximal thrust bearing (96) is contained within the proximal housing section (52), positioned between the inner surface (70) of the proximal housing section (52) and the drilling shaft (24), for rotatably supporting the drilling shaft (24) axially. More particularly, In the preferred embodiment where the drilling string (25) extends into the proximal end (48) of the housing (46), the proximal thrust bearing (96 ) is located between the inner surface (70) of the proximal housing section (52) and an outer surface of the drilling string (25). The proximal thrust bearing (96) may be comprised of any thrust bearing.

As a result of the thrust bearings (94, 96), most of the weight on the drilling bit (22) may be transferred into and through the housing (46) as compared to through the drilling shaft (24) of the device (20). Thus, the drilling shaft (24) may be permitted to be slimmer and more controllable. As well, most of the drilling weight bypasses the drilling shaft (24) substantially between its proximal and distal ends (48, 50) and thus bypasses the other components of the device (20) including the deflection assembly (92). More particularly, weight applied on the drilling bit (22) through the drill string (25) is transferred, at least in part, from the drilling string (25) to the proximal end (48) of the housing (46) by the proximal thrust bearing (96) at the proximal thrust bearing location (100). The weight is further transferred, at least in part, from the distal end (50) of the housing (46) to the drilling shaft (24), and thus the attached drilling bit (22), by the fulcrum bearing (88) at the distal thrust bearing location (100).

The fulcrum bearing (88) may be comprised of any combination or configuration of radial and thrust bearings able to radially and axially support the rotating drilling shaft (24) within the housing (46). However, preferably the fulcrum bearing (88) is comprised of a fulcrum bearing assembly. The fulcrum bearing assembly is comprised of at least one row of spherical thrust roller bearings (98) positioned at a first axial position (102) and at least one row of spherical thrust roller bearings (98) positioned at a second axial position (104). In addition, the fulcrum bearing assembly is comprised of at least one row of spherical radial bearings (82) positioned at a third axial position (106), wherein the third axial position (106) is located between the first axial position (102) and the second axial position (104). The spherical thrust bearings (98) and the spherical radial roller bearings (82) are arranged substantially about a common center of rotation. As a result, as described above, the fulcrum bearing assembly allows the drilling bit (22) to tilt in any desired direction and to rotate relatively freely while transferring most of the drilling bit (22) weight into the housing (46).

Each of the distal and proximal thrust bearings (94, 96) is preferably preloaded at the desired distal and proximal thrust bearing locations (98, 100) respectively. Any mechanism, structure, device or method capable of preloading the thrust bearings (94, 96) the desired amount may be utilized: Further, preferably, the mechanism, structure, device or method used substantially maintains the desired preloading during the drilling operation. In addition, although preferred, the same mechanism, structure, device or method need not be used for preloading both thrust bearings (94, 96).

Referring first to the distal thrust bearing (94), the distal thrust bearing (94) is axially maintained within the housing (46) at the distal thrust bearing location (98) between a distal thrust bearing shoulder (108) and a distal thrust bearing collar (110). Thus, in the preferred embodiment, the fulcrum bearing assembly (88) comprising the spherical thrust bearings (98) are axially maintained in position at the first and second axial positions (102, 104) between the distal thrust bearing shoulder (108) and the distal thrust bearing collar (110). More particularly, the distal thrust bearing shoulder (108) abuts, directly or indirectly, against the uppermost or uphole end of the fulcrum bearing assembly (88) comprising the spherical thrust bearings (98), while the distal thrust bearing collar (110) abuts, directly or indirectly, against the lowermost or downhole end of the of the fulcrum bearing assembly (88).

Although any structure or component contained within the housing (46) adjacent the fulcrum bearing assembly uphole may provide or define the distal thrust bearing shoulder (108), the distal thrust bearing shoulder (108) is preferably defined by the inner surface of the housing (46). Thus, in the preferred embodiment, the distal thrust bearing shoulder (108) is defined by the inner surface (78) of the distal housing section (56) adjacent or in proximity to the distal end (50) of the housing (46).

The distal thrust bearing collar (110) is contained within the housing (46) and located about the drilling string (24) for abutment against the lowermost or downhole end of the of the fulcrum bearing assembly (88). Further, the distal thrust bearing collar (110) is axially adjustable relative to the distal thrust bearing shoulder (108) in order to preload the distal thrust bearings (94) located therebetween. In the. preferred embodiment, given that the distal thrust bearings (94) are spherical, any radial loads tend to separate the bearings (94), and thus, tend to separate the fulcrum bearing (88). As a result, a sufficient preloading force is applied to the distal thrust bearings (94) such that the radial loads encountered by the thrust bearings (94) will not comprise the thrust bearings (94) within the fulcrum bearing (88).

Further, to facilitate the preloading, one or more springs or washers, preferably Belleville washers (111) are preferably located at, adjacent or in proximity to the opposing ends of the fulcrum bearing assembly (88) such that the Belleville washers (111) are also axially maintained between the distal thrust bearing shoulder (108) and the distal thrust bearing collar (110). Preloading of the distal thrust bearings (94) results in compression of the Belleville washers (111). In other words, in order to preload the bearings (94), the distal thrust bearing collar (110) is axially adjustable relative to the distal thrust bearing shoulder (108) in order to preload the distal thrust bearings (94) located therebetween by compressing the Belleville washers (111).

The distal thrust bearing collar (110) may be adjusted axially in any manner and by any mechanism, structure or device able to axially adjust the distal thrust bearing collar (110) relative to the distal thrust bearing shoulder (108). However, preferably, the distal thrust bearing collar (110) is threaded for adjustment by rotation. More particularly, in the preferred embodiment, the distal thrust bearing collar (110) has a proximal end (114) for abutting against the adjacent fulcrum bearing assembly (88) and a distal end (116) extending from and beyond the distal end (68) of the distal housing section (56). An outer surface (118) of the distal thrust bearing collar (110) at its proximal end (114) is threaded for connection with a complementary threaded inner surface (78) of the distal housing section (56) at its distal end (68). As a result of the threaded connection, rotation of the distal thrust bearing collar (110) axially adjusts the collar (110) either towards or away from the distal thrust bearing shoulder (108) to increase or decrease the preloading respectively on the distal thrust bearings (94).

Further, the device (20) preferably provides for the retention of the distal thrust bearing or bearings (94) at the desired position without causing an increase in the preloading thereon. Any structure, device, mechanism or method able to retain the distal thrust bearing (94) in position without increasing the preloading thereon may be utilized. However, preferably, the device (20) is further comprised of a distal thrust bearing retainer (112) for retaining the spherical distal thrust bearings (94) comprising the fulcrum bearing assembly (88) in position without increasing the preloading on the spherical distal thrust bearings (94).

In the preferred embodiment, the distal thrust bearing retainer (112) is comprised of a locking ring (120) and a locking ring collar (122). The locking ring (120) is slidably mounted on the distal thrust bearing collar (110), about the outer surface (118) of the collar (110). Accordingly, once the distal thrust bearing collar (110) is axially adjusted to preload the bearing (94), the locking ring (120) may be selectively moved longitudinally along the outer surface (118) of the collar (110) to a position abutting the distal end (50) of the housing (46).

Once the locking ring (120) is moved into abutment with the housing (46), the locking ring collar (122) can be tightened against the locking ring (120) to hold the locking ring (120) in position between the housing (46) and the locking ring collar (122). The locking ring (120) acts upon the distal thrust bearing collar (110) to inhibit the rotation of the distal thrust bearing collar (110) away from the distal thrust bearing shoulder (108) and thus maintain the preloading.

Preferably, the locking ring collar (122) is mounted about the drilling string (24) adjacent the distal end (50) of the housing (46) such that the locking ring (120) is located or positioned between the distal end (50) of the housing (46) and a proximal end (124) of the locking ring collar (122). Further, the locking ring collar (122) is axially adjustable relative to the housing (46) such that the locking ring (120) may be held therebetween upon tightening of the locking ring collar (122).

The locking ring collar (122) may be adjusted axially in any manner and by any mechanism, structure or device able to axially adjust the locking ring collar (122) relative to the housing (46). However, preferably, the locking ring collar (122) is threaded for adjustment by rotation. More particularly, in the preferred embodiment, the outer surface (118) of the distal thrust bearing collar (110) at its distal end (116) is threaded for connection with a complementary threaded inner surface (126) of the locking ring collar (122) at its proximal end (124). As a result of the threaded connection, rotation of the locking ring collar (122) axially adjusts the locking ring collar (122) either towards or away from the distal end (50) of the housing (46) to tighten or release the locking ring (120) located therebetween. In the preferred embodiment, the locking ring collar (122) is tightened to between about 8000 to 10,000 ft lbs. The tightening of the locking ring collar (122) holds the locking ring (120) in position without increasing the preloading on the distal thrust bearings (94).

When the locking ring collar (122) is tightened against the locking ring (120), the locking ring (120) acts upon the distal thrust bearing collar (110) to inhibit the rotation of the distal thrust bearing collar (110) away from the distal thrust bearing shoulder (108) and thus to maintain the preloading. In order to enhance or facilitate the action of the distal thrust bearing retainer (112), the locking ring (120) preferably does not rotate, or is inhibited from rotating, relative to the distal thrust bearing collar (110). This relative rotation may be prevented or inhibited in any manner and by any structure, device or mechanism capable of preventing or inhibiting the undesired relative rotation between the locking ring (120) and the distal thrust bearing collar (110). However, preferably, the locking ring (120) is mounted on the distal thrust bearing collar (110) such that the locking ring (120) does not rotate, or is inhibited from rotating, relative to the distal thrust bearing collar (110).

The locking ring (120) may be mounted on the distal thrust bearing collar (110) in any manner and by any structure, device or mechanism capable of preventing or inhibiting the undesired relative rotation between the locking ring (120) and the distal thrust bearing collar (110). For instance, in the preferred embodiment, at least one key and slot configuration is utilized. Specifically, a key (123) extends between a slot or groove defined by each of the adjacent surfaces of the distal thrust bearing collar (110) and the distal locking ring (120).

In addition, in order to further enhance or facilitate the action of the distal thrust bearing retainer (112), the locking ring (120) preferably does not rotate, or is inhibited from rotating, relative to the housing (46). This relative rotation may be prevented or inhibited in any manner and by any structure, device or mechanism capable of preventing or inhibiting the undesired relative rotation between the locking ring (120) and the housing (46). However, preferably, the configurations of the adjacent abutting surfaces of the locking ring (120) and the housing (46) are complementary such that the locking ring (120) does not rotate, or is inhibited from rotating, relative to the housing (46).

In the preferred embodiment, the locking ring is further comprised of a housing abutment surface (128). In addition, the housing (46), and in particular the distal end (68) of the distal housing section (56), is further comprised of a locking ring abutment surface (130). The locking ring abutment surface (130) is complementary to the housing abutment surface (128) such that the engagement of the housing abutment surface (128) and the locking ring abutment surface (130) prevents or inhibits the rotation of the locking ring (120) relative to the housing (46). Although any complementary surface configurations may be used, the locking ring abutment surface (130) and the housing abutment surface (128) each preferably define a plurality of complementary interlocking teeth.

Next, referring to the proximal thrust bearing (96), the proximal thrust bearing (96) is axially maintained within the housing (46) and preloaded in a manner similar to that of the distal thrust bearing (94) and by similar components or structure as described above for the distal thrust bearing (94).

The proximal thrust bearing or bearings (96) are axially maintained within the housing (46) at the proximal thrust bearing location (100) between a proximal thrust bearing shoulder (132) and a proximal thrust bearing collar (134). More particularly, the proximal thrust bearing shoulder (132) abuts, directly or indirectly, against the lowermost or downhole end of the proximal thrust bearing (96), while the proximal thrust bearing collar (134) abuts, directly or indirectly, against the uppermost or uphole end of the proximal thrust bearing (96).

Although any structure or component contained within the housing (46) adjacent the proximal thrust bearing (96) uphole may provide or define the proximal thrust bearing shoulder (132), the proximal thrust bearing shoulder (132) is preferably defined by the inner surface of the housing (46). Thus, in the preferred embodiment, the proximal thrust bearing shoulder (132) is defined by the inner surface (70) of the proximal housing section (52) adjacent or in proximity to the proximal end (48) of the housing (46).

The proximal thrust bearing collar (134) is contained within the housing (46) and located about the drilling string (24) for abutment against the uppermost or uphole end of the proximal thrust bearing (96). Further, the proximal thrust bearing collar (134) is axially adjustable relative to the proximal thrust bearing shoulder (132) in order to preload the proximal thrust bearing or bearings (96) located therebetween. In the preferred embodiment, in contrast with the distal thrust bearings (94), the proximal thrust bearings (96) are not spherical. Thus, radial loads do not tend to separate the proximal thrust bearings (96) and the bearing preloading force applied to the proximal thrust bearings (96) may be significantly less than that applied to the distal thrust bearings (94).

To facilitate the preloading, one or more springs or washers, preferably a washer such as a wave washer, is preferably located or associated with the proximal thrust bearings (96) such that the washer is also axially maintained between the proximal thrust bearing shoulder (132) and the proximal thrust bearing collar (134). Preloading of the proximal thrust bearings (96) results in compression of the washer. In other words, in order to preload the bearings (96), the proximal thrust bearing collar (134) is axially adjustable relative to the proximal thrust bearing shoulder (132) in order to preload the proximal thrust bearings (96) located therebetween by compressing the washer.

The proximal thrust bearing collar (134) may be adjusted axially in any manner and by any mechanism, structure or device able to axially adjust the proximal thrust bearing collar (134) relative to the proximal thrust bearing shoulder (132). However, preferably, the proximal thrust bearing collar (134) is threaded for adjustment by rotation. More particularly, in the preferred embodiment, the proximal thrust bearing collar (134) has a proximal end (138) extending from and beyond the proximal end (58) of the proximal housing section (52) and a distal end (140) for abutting against the adjacent proximal thrust bearing (96). An outer surface (142) of the proximal thrust bearing collar (134) at its distal end (140) is threaded for connection with a complementary threaded inner surface (70) of the proximal housing section (52) at its proximal end (58). As a result of the threaded connection, rotation of the proximal thrust bearing collar (134) axially adjusts the collar (134) either towards or away from the proximal thrust bearing shoulder (132) to increase or decrease the preloading respectively on the proximal thrust bearing (96).

Further, the device (20) preferably similarly provides for the retention of the proximal thrust bearing or bearings (96) at the desired position without causing an increase in the preloading thereon. Any structure, device, mechanism or method able to retain the proximal thrust bearing (96) in position without increasing the preloading thereon may be utilized. However, preferably, the device (20) is further comprised of a proximal thrust bearing retainer (136) for retaining the proximal thrust bearing (96) in position without increasing the preloading on the proximal thrust bearing (96).

In the preferred embodiment, the proximal thrust bearing retainer (136) is comprised of a locking ring (144) and a locking ring collar (146). The locking ring (144) is slidably mounted on the proximal thrust bearing collar (134), about the outer surface (142) of the collar (134). Accordingly, once the proximal thrust bearing collar (134) is axially adjusted to preload the bearing (96), the locking ring (144) may be selectively moved longitudinally along the outer surface (142) of the collar (134) to a position abutting the proximal end (48) of the housing (46).

Once the locking ring (144) is moved into abutment with the housing (46), the locking ring collar (146) can be tightened against the locking ring (144) to hold the locking ring (144) in position between the housing (46) and the locking ring collar (146). The locking ring (144) acts upon the proximal thrust bearing collar (134) to inhibit the rotation of the proximal thrust bearing collar (134) away from the proximal thrust bearing shoulder (132) and thus maintain the preloading.

Preferably, the locking ring collar (146) is mounted about the drilling string (24) adjacent the proximal end (48) of the housing (46) such that the locking ring (144) is located or positioned between the proximal end (48) of the housing (46) and a distal end (148) of the locking ring collar (146). Further, the locking ring collar (146) is axially adjustable relative to the housing (46) such that the locking ring (144) may be held therebetween upon tightening of the locking ring collar (146).

The locking ring collar (146) may be adjusted axially in any manner and by any mechanism, structure or device able to axially adjust the locking ring collar (146) relative to the housing (46). However, preferably, the locking ring collar (146) is threaded for adjustment by rotation. More particularly, in the preferred embodiment, the outer surface (142) of the proximal thrust bearing collar (134) at its proximal end (138) is threaded for connection with a complementary threaded inner surface (150) of the locking ring collar (146) at its distal end (148). As a result of the threaded connection, rotation of the locking ring collar (146) axially adjusts the locking ring collar (146) either towards or away from the proximal end (48) of the housing (46) to tighten or release the locking ring (144) located therebetween. In the preferred embodiment, the locking ring collar (146) is tightened to between about 8000 to 10,000 ft lbs. The tightening of the locking ring collar (146) holds the locking ring (144) in position without increasing the preloading on the proximal thrust bearing (96).

When the locking ring collar (146) is tightened against the locking ring (144), the locking ring (144) acts upon the proximal thrust bearing collar (134) to inhibit the rotation of the proximal thrust bearing collar (134) away from the proximal thrust bearing shoulder (132) and thus to maintain the preloading. In order to enhance or facilitate the action of the proximal thrust bearing retainer (136), the locking ring (144) preferably does not rotate, or is inhibited from rotating, relative to the proximal thrust bearing collar (134). This relative rotation may be prevented or inhibited in any manner and by any structure, device or mechanism capable of preventing or inhibiting the undesired relative rotation between the locking ring (144) and the proximal thrust bearing collar (134). However, preferably, the locking ring (144) is mounted on the proximal thrust bearing collar (134) such that the locking ring (144) does not rotate, or is inhibited from rotating, relative to the proximal thrust bearing collar (134).

The locking ring (144) may be mounted on the proximal thrust bearing collar (134) in any manner and by any structure, device or mechanism capable of preventing or inhibiting the undesired relative rotation between the locking ring (144) and the proximal thrust bearing collar (134). For instance, in the preferred embodiment, at least one key and slot configuration is utilized. Specifically, a key (147) extends between a slot or groove defined by each of the adjacent surfaces of the locking ring (144) and the proximal thrust bearing collar (134).

In addition, in order to further enhance or facilitate the action of the proximal thrust bearing retainer (136), the locking ring (144) preferably does not rotate, or is inhibited from rotating, relative to the housing (46). This relative rotation may be prevented or inhibited in any manner and by any structure, device or mechanism capable of preventing or inhibiting the undesired relative rotation between the locking ring (144) and the housing (46). However, preferably, the configurations of the adjacent abutting surfaces of the locking ring (144) and the housing (46) are complementary such that the locking ring (144) does not rotate, or is inhibited from rotating, relative to the housing (46).

In the preferred embodiment, the locking ring (144) is further comprised of a housing abutment surface (152). In addition, the housing (46), and in particular the proximal end (58) of the proximal housing section (52), is further comprised of a locking ring abutment surface (154). The locking ring abutment surface (154) is complementary to the housing abutment surface (152) such that the engagement of the housing abutment surface (152) and the locking ring abutment surface (154) prevents or inhibits the rotation of the locking ring (144) relative to the housing (46). Although any complementary surface configurations may be used, the locking ring abutment surface (154) and the housing abutment surface (152) each preferably define a plurality of complementary interlocking teeth.

As indicated above, the device (20) includes a drilling shaft deflection assembly (92), contained within the housing (46), for bending the drilling shaft (24) as previously described. The deflection assembly (92) may be comprised of any structure, device, mechanism or method capable of bending the drilling shaft (24) or deflecting the drilling shaft (24) laterally or radially within the housing (46) in the described manner. However, preferably, the deflection assembly (92) is comprised of a double ring eccentric mechanism. Although these eccentric rings may be located a spaced distance apart along the length of the drilling shaft (24), preferably, the deflection assembly (92) is comprised of an eccentric outer ring (156) and an eccentric inner ring (158) provided at a single location or position along the drilling shaft (24). The rotation of the two eccentric rings (156, 158) imparts a controlled deflection of the drilling shaft (24) at the location of the deflection assembly (92).

The preferred deflection assembly (92) of the within invention is similar to the double eccentric harmonic drive mechanism described in U.S. Pat. No. 5,353,884 issued Oct. 11, 1994 to Misawa et. al. and U.S. Pat. No. 5,875,859 issued Mar. 2, 1999 to Ikeda et. al., as discussed above.

Particularly, the outer ring (156) has a circular outer peripheral surface (160) and defines therein a circular inner peripheral surface (162). The outer ring (156), and preferably the circular outer peripheral surface (160) of the outer ring (156), is rotatably supported by or rotatably mounted on, directly or indirectly, the circular inner peripheral surface of the housing (46). Specifically, in the preferred embodiment, the circular outer peripheral surface (160) is rotatably supported by or rotatably mounted on the circular inner peripheral surface (78) of the distal housing section (56). The circular outer peripheral surface (160) may be supported or mounted on the circular inner peripheral surface (78) by any supporting structure, mechanism or device permitting the rotation of the outer ring (156) relative to the housing (46), such as by a roller bearing mechanism or assembly. Further, in the preferred embodiment, the outer ring (156) is rotatably driven by an outer ring drive mechanism (164), as described below.

The circular inner peripheral surface (162) of the outer ring (156) is formed and positioned within the outer ring (156) such that it is eccentric with respect to the housing (46). In other words, the circular inner peripheral surface (162) is deviated from the housing (46) to provide a desired degree or amount of deviation.

More particularly, the circular inner peripheral surface (78) of the distal housing section (56) is centered on the centre of the drilling shaft (24), or the rotational axis A of the drilling shaft (24), when the drilling shaft (24) is in an undeflected condition or the deflection assembly (92) is inoperative. The circular inner peripheral surface (162) of the outer ring (156) is centered on point B which is deviated from the rotational axis of the drilling shaft (24) by a distance "e".

Similarly, the inner ring (158) has a circular outer peripheral surface (166) and defines therein a circular inner peripheral surface (168). The inner ring (158), and preferably the circular outer peripheral surface (166) of the inner ring (158), is rotatably supported by or rotatably mounted on, either directly or indirectly, the circular inner peripheral surface (162) of the outer ring (156). The circular outer peripheral surface (166) may be supported by or mounted on the circular inner peripheral surface (162) by any supporting structure, mechanism or device permitting the rotation of the inner ring (158) relative to the outer ring (156), such as by a roller bearing mechanism or assembly. Further, in the preferred embodiment, the inner ring (158) is rotatably driven by an inner ring drive mechanism (170), as described below.

The circular inner peripheral surface (168) of the inner ring (158) is formed and positioned within the inner ring (158) such that it is eccentric with respect to the circular inner peripheral surface (162) of the outer ring (156). In other words, the circular inner peripheral surface (168) of the inner ring (158) is deviated from the circular inner peripheral surface (162) of the outer ring (156) to provide a desired degree or amount of deviation.

More particularly, the circular inner peripheral surface (168) of the inner ring (158) is centered on point C, which is deviated from the centre B of the circular inner peripheral surface (162) of the outer ring (156) by the same distance "e". As described, preferably, the degree of deviation of the circular inner peripheral surface (162) of the outer ring (156) from the housing (46), defined by distance "e", is substantially equal to the degree of deviation of the circular inner peripheral surface (168) of the inner ring (158) from the circular inner peripheral surface (162) of the outer ring (156), also defined by distance "e". However, if desired, the degrees of deviation may be varied such that they are not substantially equal.

The drilling shaft (24) extends through the circular inner peripheral surface (168) of the inner ring (158) and is rotatably supported thereby. The drilling shaft (24) may be supported by the circular inner peripheral surface (168) by any supporting structure, mechanism or device permitting the rotation of the drilling shaft (24) relative to the inner ring (158), such as by a roller bearing mechanism or assembly.

As a result of the above described configuration, the drilling shaft (24) may be moved, and specifically may be laterally or radially deviated within the housing (46), upon the movement of the centre of the circular inner peripheral surface (168) of the inner ring (158). Specifically, upon the rotation of the inner and outer rings (158, 156), either independently or together, the centre of the drilling shaft (24) may be moved with the centre of the circular inner peripheral surface (168) of the inner ring (158) and positioned at any point within a circle having a radius summed up by the amounts of deviation of the circular inner peripheral surface (168) of the inner ring (158) and the circular inner peripheral surface (162) of the outer ring (156). As a result, the drilling shaft (24) is deflected, bent or caused to curve to produce the desired tool face and amount of deviation of the drilling bit (22).

In other words, by rotating the inner and outer rings (158, 156) relative to each other, the centre of the circular inner peripheral surface (168) of the inner ring (158) can be moved in any position within a circle having the predetermined or predefined radius as described above. Thus, the portion or section of the drilling shaft (24) extending through and supported by the circular inner peripheral surface (168) of the inner ring (158) can be deflected by an amount in any direction perpendicular to the rotational axis of the drilling shaft (24). As a result, the drilling direction may be controlled by varying the tool face and deviation of the drilling bit (22) connected with the drilling shaft (24). In this instance, the device (20) is in a deflection mode or is set at a "Deflection ON" setting.

More particularly, since the circular inner peripheral surface (162) of the outer ring (156) has the centre B, which is deviated from the rotational centre A of the drilling shaft (24) by the distance "e", the locus of the centre B is represented by a circle having a radius "e" around the centre A. Further, since the circular inner peripheral surface (168) of the inner ring (158) has the centre C, which is deviated from the centre B by a distance "e", the locus of the centre "C" is represented by a circle having a radius "e" around the centre B. As a result, the centre C may be moved in any desired position within a circle having a radius of "2e" around the centre A. Accordingly, the portion of the drilling shaft (24) supported by the circular inner peripheral surface (168) of the inner ring (158) can be deflected in any direction on a plane perpendicular to the rotational axis of the drilling shaft (24) by a distance of up to "2e".

In addition, as stated, the deviation distances "e" are preferably substantially similar in order to permit the operation of the device (20) such that the drilling shaft (24) is undeflected within the housing (24) when directional drilling is not required. More particularly, since the degree of deviation of each of the centres B and C of the circular inner peripheral surface (162) of the outer ring (156) and the circular inner peripheral surface (168) of the inner ring (158) respectively is defined by the same or equal distance "e", the centre C of the portion of the drilling shaft (24) extending through the deflection assembly (92) can be positioned on the rotational axis A of the drilling shaft (24). In this instance, the device (20) is in a zero deflection mode or is set at a "Deflection OFF" setting.

The inner and outer ring drive mechanisms (170, 164) of the inner and outer rings (158, 156) respectively may each be comprised of any drive system or mechanism able to rotate the respective inner and outer rings (158, 156). However, preferably, each of the inner and outer ring drive mechanisms (170, 164) rotates the inner and outer rings (158, 156) respectively using the rotation of the drilling shaft (24). In the preferred embodiment, each of the inner and outer ring drive mechanisms (170, 164) is comprised of a harmonic drive mechanism for rotating the inner and outer rings (158, 156) about their respective axes relative to each other.

More preferably, the harmonic drive mechanisms (170, 164) are of the hollow type arranged coaxially relative to each other and spaced apart longitudinally such that the drive mechanisms (170, 164) are located on opposing sides of the deflection assembly (92). In other words, the deflection assembly (92) is located between the harmonic inner and outer ring drive mechanisms (170, 164). For instance, in the preferred embodiment, the outer ring drive mechanism (64) is located or positioned uphole or proximally of the deflection assembly (92), while the inner ring drive mechanism (170) is located or positioned downhole or distally of the deflection assembly (92). Thus, the drilling shaft (24) is arranged such that it extends through the circular inner peripheral surface (168) of the inner ring (158) and through the hollow portions provided by each of the harmonic inner and outer ring drive mechanisms (170, 164).

In the preferred embodiment, the harmonic outer ring drive mechanism (164) is comprised of first and second rigid circular splines (172, 174), a circular flexible spline or flexispline (176) arranged inside of the rigid circular splines (172, 174) and an elliptical-or oval shaped wave generator (178) arranged inside the circular flexispline (176). The wave generator (178) is comprised of a rigid elliptical or oval shaped cam plate (180) enclosed in a bearing mechanism or assembly (182). Thus, the bearing mechanism (182) is inserted between the cam plate (180) and the flexispline (176). The drilling shaft (24) is inserted through the centre of the cam plate (180) such that an amount of clearance is provided therebetween.

The rigid circular splines (172, 174) have internal spline teeth for engaging the external spline teeth of the flexispline (176). The rigid circular splines (172, 174) have slightly different numbers of teeth, which internal spline teeth are simultaneously engaged by the external spline teeth of the flexispline (176).

In the preferred embodiment, the flexispline (176) is provided with less teeth than the first rigid circular spline (172), preferably two less teeth. The first rigid circular spline (172) is fixedly mounted or connected, directly or indirectly, with the inner surface of the housing (64). In the preferred embodiment, the second rigid circular spline (174) has the same number of teeth as the flexispline (176) and is connected with the outer ring (156) so that the second rigid spline (174) and the outer ring (156) rotate integrally or as a unit.

When the wave generator (178) is inserted into the flexispline (176), it imparts its elliptical shape to the flexispline (176), causing the external teeth of the flexispline (176) to engage with the internal teeth of the rigid circular splines (172, 174) at two equally spaced areas 180 degrees apart on their respective circumferences, being the major elliptical axis of the wave generator (178). As a result, a positive gear mesh is formed at the points of engagement. Further, as the wave generator (178) rotates in a first direction, the points of engagement travel with the major elliptical axis of the wave generator (178). Due to the differences in the number of teeth of the flexispline (176) and the first rigid circular spline (172), when the wave generator (178) has turned 180 degrees, the flexispline (176) has regressed relative to the first rigid spline (172), typically by one tooth where the flexispline (176) includes two less teeth. Thus, each turn or rotation of the wave generator (178) in the first direction moves or rotates the flexispline (176) in an opposing second direction on the first rigid circular spline (172), such as by two teeth where the flexispline (176) includes two less teeth. The second rigid circular spline (174), having the same number of teeth as the flexispline (176), also rotates in the opposing second direction relative to the first rigid circular spline (172) at the same rate as the flexispline (176).

The wave generator (178) thus provides a high speed input, the first rigid circular spline (172) is fixed to the housing (46) and thus does not rotate relative to the housing (46), and the second rigid circular spline (174) rotates relative to the first rigid circular spline (172) and the housing (46) to provide a low speed output.

Further, the wave generator (178) is directly linked to the drilling shaft (24) through an outer ring clutch or dutch mechanism (184), preferably being electromagnetic, and a first Oldham coupling (186). Operation of the clutch mechanism (184) causes a transfer of the rotational force of the drilling shaft (24) to the harmonic outer ring drive mechanism (164). As a result, the outer ring (156) will rotate after the reduction of rotation at a certain level of reduction ratio as determined by the harmonic outer ring drive mechanism (164) as described above.

Thus, the outer ring drive mechanism (164) rotates the outer ring (156) using the rotation of the drilling shaft (24). The outer drive mechanism (164) is comprised of the outer ring clutch (184) for selectively engaging and disengaging the drilling shaft (24) from the outer ring (156). The outer ring clutch (184) may be comprised of any dutch or clutch mechanism able to selectively engage and disengage the drilling shaft (24) from the outer ring (156). In addition, preferably the outer ring clutch (184) is comprised of a clutch and brake mechanism such that the outer ring clutch (184) performs a dual function.

Preferably, the outer ring clutch (184) is comprised of a pair of clutch plates (188) which are separated by a clutch gap (190) when the dutch (184) is disengaged. Alternately, the clutch plates (188) are engaged or come together when the clutch (184) is engaged to selectively engage the drilling shaft (24) with the outer ring (156). Thus, the dutch plates (188) are engaged to engage the drilling shaft (24) with the outer ring (156) to permit the rotation of the drilling shaft (24) to rotate the outer ring (156). In addition, when the clutch plates (188) are disengaged, the dutch plate (188) associated with the outer ring (156) acts to inhibit or prevent the rotation of the outer ring (156) and thus performs a braking function.

Preferably, the outer ring clutch (184) is comprised of a clutch adjustment mechanism (192) for adjusting the clutch gap (190). Any mechanism, structure, device or method capable of adjusting or facilitating the adjustment of the clutch gap (190) may be used. However, preferably, the clutch adjustment mechanism (192) is comprised of a clutch adjustment member (194) associated with one of the pair of clutch plates (188) such that movement of the dutch adjustment member (194) will result in corresponding movement of the associated clutch plate (188) to increase or decrease the dutch gap (190). Further, the clutch adjustment mechanism (192) is comprised of a first guide (196) for guiding the clutch adjustment member (192) for movement in a first direction. Finally, the clutch adjustment mechanism (192) is comprised of a movable key (198) associated with the dutch adjustment member (194), wherein the key (198) comprises a second guide (200) for urging the clutch adjustment member (194) in a second direction.

The second direction has a component parallel to the first guide (196) and has a component perpendicular to the first guide (196). One of the parallel component and the perpendicular component is parallel to a direction of movement of the dutch plate (188) necessary to increase or decrease the clutch gap (190).

In the preferred embodiment, the first guide (196) guides the clutch adjustment member (194) for movement in the first direction which is perpendicular to the direction of movement of the clutch plate (188). The second guide (200) urges the clutch adjustment member (194) in the second direction, wherein the second direction has a component parallel to the first guide (196) and has a component perpendicular to the first guide (196). Therefore, in the preferred embodiment, the component parallel to the first guide (196) is perpendicular to the direction of movement of the clutch plate (188). The component perpendicular to the first guide (196) is parallel to the direction of movement of the clutch plate (188).

The clutch adjustment member (194) may be associated with the movable key (198) in any manner and by any mechanism, device or structure such that movement of the key (198) results in a corresponding movement of the clutch adjustment member (194). More particularly, as a result of the second guide (200), movement of the key (198) results in movement of the clutch adjustment member (194) in the second direction.

Preferably, the clutch adjustment member (194) is connected, mounted or integrally formed with the key (198) such that the member (194) extends therefrom. In the preferred embodiment, the clutch adjustment member (194) is integrally formed with the key (198) to provide a single unit or element.

The first guide (196) may be comprised of any mechanism, device or structure able to guide the dutch adjustment member (194) for movement in the first direction. Preferably, the first guide (196) is affixed, connected or otherwise associated with one of the clutch plates (188). In the preferred embodiment, the first guide (196) is comprised of a first slot (197). More particularly, the first slot (197) is defined by the clutch plate (188). The first slot (197) extends circumferentially in the dutch plate (188) and is thus substantially perpendicular to the direction of movement of the clutch plate (188).

As indicated, the clutch adjustment member (194) is associated with one of the clutch plates (188). Specifically, in the preferred embodiment, the dutch adjustment member (194) is associated with the first slot (197) defined by the clutch plate (188). More particularly, the clutch adjustment member (194) extends from the key (198) for receipt within the first slot (197) such that the member (194) engages the first slot (197).

The second guide (200) may be comprised of any mechanism, device or structure able to urge the clutch adjustment member (194) in the second direction. In the preferred embodiment, the key (198) is positioned in a cavity (206) defined by the outer ring drive mechanism (164) such that the clutch adjustment member (194) may extend from the key (198) for engagement with the first slot (197). Further, the key (198) is preferably comprised of a sloped or ramp surface (204) oriented in the second direction. Similarly, the cavity (206) preferably defines a sloped or ramp surface (208) complementary to the key ramp surface (204). In the preferred embodiment, the second guide (200) is comprised of the key ramp surface (204) and the cavity ramp surface (208).

Further, the clutch adjustment mechanism (192) is preferably comprised of a clutch adjustment control mechanism (202) for controlling the movement of the key (198). The clutch adjustment control mechanism (202) may be comprised of any device, structure or mechanism capable of controlling the movement of the key (198). However, preferably, the dutch adjustment control mechanism (202) is comprised of an adjustment screw connected with the key (198) and which can be rotated inside a threaded bore to finely control the movement of the key (198).

Preferably, adjustment of the adjustment screw acts upon the key (198) resulting in the movement of the key (198) in a direction that is substantially perpendicular to the longitudinal axis of the device (20). More particularly, movement of the key (198) results in the engagement of the key ramp surface (204) and the cavity ramp surface (208). As a result, the second guide (200) preferably converts the movement of the key (198) in a direction that is substantially perpendicular to the longitudinal axis of the device (20) to movement of the key (198) in the second direction, which in turn causes the clutch adjustment member (194) to move in the second direction.

The component of movement of the key (198) along the cavity ramp surface (208) which is parallel to the first slot (197) results in the clutch adjustment member (194) moving in the first slot (197) without imparting a significant rotational force to the clutch plate (188). The component of movement of the key (198) along the cavity ramp surface (208) which is perpendicular to the first slot (197) results in an increase or decrease in the clutch gap (190) by engagement of the clutch adjustment member (194) with the clutch plate (188).

Once the desired clutch gap (190) is achieved, it is preferable that the desired setting be capable of being maintained. Thus, preferably, a dutch adjustment locking mechanism (210) is provided for fixing the position of the key (198) so that the dutch gap (190) can be maintained at the desired setting. Any locking mechanism, structure or device capable of fixing or maintaining the position of the key (198) relative to the first guide (196) may be used. However, preferably, the clutch adjustment locking mechanism (210) is comprised of one or more locking or set screws associated with the clutch adjustment member (194) which may be tightened to fix or maintain the key (198) at its desired position within the cavity (206) such that its further movement is prevented or otherwise inhibited.

Next, referring to the harmonic inner ring drive mechanism (170), the preferred harmonic inner ring drive mechanism (170), and its components and structure, are substantially similar to the harmonic outer ring drive mechanism (164) as described above. Thus, the description provided for the harmonic outer ring drive mechanism (164) is equally applicable to the harmonic inner ring drive mechanism (170).

In the preferred embodiment, the harmonic inner ring drive mechanism (170) is comprised of first and second rigid circular splines (212, 214), a circular flexible spline or flexispline (216) arranged inside of the rigid circular splines (212, 214) and an elliptical-or oval shaped wave generator (218) arranged inside the circular flexispline (216). The wave generator (218) is comprised of a rigid elliptical or oval shaped cam plate (220) enclosed in a bearing mechanism or assembly (222). Thus, the bearing mechanism (222) is inserted between the cam plate (220) and the flexispline (216). The drilling shaft (24) is inserted through the centre of the cam plate (220) such that an amount of clearance is provided therebetween.

The rigid circular splines (212, 214) have internal spline teeth for engaging the external spline teeth of the flexispline (216). The rigid circular splines (212, 214) have slightly different numbers of teeth, which internal spline teeth are simultaneously engaged by the external spline teeth of the flexispline (216).

In the preferred embodiment, the flexispline (216) is provided with less teeth than the rigid circular spline (212), preferably two less teeth. The first rigid circular spline (212) is fixedly mounted or connected, directly or indirectly, with the inner surface of the housing (64). In the preferred embodiment, the second rigid circular spline (214) has the same number of teeth as the flexispline (216) and is connected with the inner ring (158) through an Oldham type centering coupling (223) so that the rigid spline (214) and the inner ring (158) rotate through the Oldham type centering coupling (223) integrally or as a unit.

When the wave generator (218) is inserted into the flexispline (216), it imparts its elliptical shape to the flexispline (216), causing the external teeth of the flexispline (216) to engage with the internal teeth of the rigid circular splines (212, 214) at two equally spaced areas 180 degrees apart on their respective circumferences, being the major elliptical axis of the wave generator (218). As a result, a positive gear mesh is formed at the points of engagement. Again, due to the differences in the number of teeth of the flexispline (216) and the first rigid circular spline (212), when the wave generator (218) has turned 180 degrees, the flexispline (216) has regressed relative to the first rigid circular splines (212). Thus, each turn or rotation of the wave generator (218) in the first direction moves or rotates the flexispline (216) in an opposing second direction on the first rigid circular spline (212). The second rigid circular spline (214), having the same number of teeth as the flexispline (216), also rotates in the opposing second direction relative to the first rigid circular spline (212) at the same rate as the flexispline (216).

Thus, again, the wave generator (218) thus provides a high speed input, the first rigid circular spline (212) is fixed to the housing (46) and thus does not rotate relative to the housing (46), and the second rigid circular spline (214) rotates relative to the first rigid circular spline (212) and the housing (46) to provide a low speed output.

The wave generator (218) is directly linked to the drilling shaft (24) through an inner ring clutch or clutch mechanism (224), preferably being electromagnetic, and a second Oldham coupling (226), which are substantially similar to the outer ring clutch (184) and first Oldham coupling (186) respectively. Operation of the inner ring clutch (224) causes a transfer of the rotational force of the drilling shaft (24) to the harmonic inner ring drive mechanism (170). As a result, the inner ring (158) will rotate after the reduction of rotation at a certain level of reduction ratio as determined by the harmonic inner ring drive mechanism (170) as described above.

Thus, the inner ring drive mechanism (170) rotates the inner ring (158) also using the rotation of the drilling shaft (24). The inner ring drive mechanism (170) is comprised of the inner ring clutch (224) for selectively engaging and disengaging the drilling shaft (24) from the inner ring (158). The inner ring clutch (224) may also be comprised of any dutch or clutch mechanism able to selectively engage and disengage the drilling shaft (24) from the inner ring (158). In addition, preferably the inner ring clutch (224) is comprised of a clutch and brake mechanism such that the inner ring clutch (224) also performs a dual function.

Preferably, the inner ring clutch (224) is similarly comprised of a pair of clutch plates (228) which are separated by a clutch gap (230) when the dutch (224) is disengaged. Alternately, the clutch plates (228) are engaged or come together when the clutch (224) is engaged to selectively engage the drilling shaft (24) with the inner ring (158) Thus, the clutch plates (228) are engaged to engage the drilling shaft (24) with the inner ring (158) to permit the rotation of the drilling shaft (24) to rotate the inner ring (158). In addition, when the clutch plates (228) are disengaged, the clutch plate (228) associated with the inner ring (158) acts to inhibit or prevent the rotation of the inner ring (158) and thus performs a braking function.

Preferably, the inner ring clutch (224) is comprised of a dutch adjustment mechanism (232) for adjusting the clutch gap (230). Any mechanism, structure, device or method capable of adjusting or facilitating the adjustment of the clutch gap (230) may be used. However, preferably, the clutch adjustment mechanism (232) is comprised of a clutch adjustment member (234) associated with one of the pair of clutch plates (228) such that movement of the clutch adjustment member (234) will result in corresponding movement of the associated clutch plate (228) to increase or decrease the clutch gap (230). Further, the clutch adjustment mechanism (232) is comprised of a first guide (236) for guiding the clutch adjustment member (232) for movement in a first direction. Finally, the clutch adjustment mechanism (232) is comprised of a movable key (238) associated with the clutch adjustment member (234), wherein the key (238) comprises a second guide (240) for urging the clutch adjustment member (234) in a second direction.

The second direction has a component parallel to the first guide (236) and has a component perpendicular to the first guide (236). One of the parallel component and the perpendicular component is parallel to a direction of movement of the dutch plate (228) necessary to increase or decrease the clutch gap (230).

In the preferred embodiment, the first guide (236) guides the dutch adjustment member (234) for movement in the first direction which is perpendicular to the direction of movement of the dutch plate (228). The second guide (240) urges the clutch adjustment member (234) in the second direction, wherein the second direction has a component parallel to the first guide (236) and has a component perpendicular to the first guide (236). Therefore, in the preferred embodiment, the component parallel to the first guide (236) is perpendicular to the direction of movement of the clutch plate (228). The component perpendicular to the first guide (236) is parallel to the direction of movement of the clutch plate (228).

The clutch adjustment member (234) may be associated with the movable key (238) in any manner and by any mechanism, device or structure such that movement of the key (238) results in a corresponding movement of the clutch adjustment member (234). More particularly, as a result of the second guide (240), movement of the key (238) results in movement of the dutch adjustment member (234) in the second direction.

Preferably, the clutch adjustment member (234) is connected, mounted or integrally formed with the key (238) such that the member (234) extends therefrom. In the preferred embodiment, the clutch adjustment member (234) is integrally formed with the key (238) to provide a single unit or element.

The first guide (236) may be comprised of any mechanism, device or structure able to guide the clutch adjustment member (234) for movement in the first direction. Preferably, the first guide (236) is affixed, connected or otherwise associated with one of the clutch plates (228). In the preferred embodiment, the first guide (236) is comprised of a first slot (237). More particularly, the first slot (237) is defined by the clutch plate (228). The first slot (237) extends circumferentially in the clutch plate (228) and is thus substantially perpendicular to the direction of movement of the clutch plate (228).

As indicated, the clutch adjustment member (234) is associated with one of the clutch plates (228). Specifically, in the preferred embodiment, the clutch adjustment member (234) is associated with the first slot (237) defined by the clutch plate (228). More particularly, the clutch adjustment member (234) extends from the key (238) for receipt within the first slot (237) such that the member (234) engages the first slot (237).

The second guide (240) may be comprised of any mechanism, device or structure able to urge the clutch adjustment member (234) in the second direction. In the preferred embodiment, the key (238) is positioned in a cavity (246) defined by the inner ring drive mechanism (170) such that the clutch adjustment member (234) may extend from the key (238) for engagement with the first slot (237). Further, the key (238) is preferably comprised of a sloped or ramp surface (244) oriented in the second direction. Similarly, the cavity (246) preferably defines a sloped or ramp surface (248) complementary to the key ramp surface (244). In the preferred embodiment, the second guide (240) is comprised of the key ramp surface (244) and the cavity ramp surface (248).

Further, the clutch adjustment mechanism (232) is preferably comprised of a clutch adjustment control mechanism (242) for controlling the movement of the key (238). The clutch adjustment control mechanism (242) may be comprised of any device, structure or mechanism capable of controlling the movement of the key (238). However, preferably, the clutch adjustment control mechanism (242) is comprised of an adjustment screw connected with the key (238) and which can be rotated inside a threaded bore to finely control the movement of the key (238).

Preferably, adjustment of the adjustment screw acts upon the key (238) resulting in the movement of the key (238) in a direction that is substantially perpendicular to the longitudinal axis of the device (20). More particularly, movement of the key (238) results in the engagement of the key ramp surface (244) and the cavity ramp surface (248). As a result, the second guide (240) preferably converts the movement of the key (238) in a direction that is substantially perpendicular to the longitudinal axis of the device (20) to movement of the key (238) in the second direction, which in turn causes the clutch adjustment member (234) to move in the second direction.

The component of movement of the key (238) along the cavity ramp surface (248) which is parallel to the first slot (237) results in the clutch adjustment member (234) moving in the first slot (237) without imparting a significant rotational force to the clutch plate (228). The component of movement of the key (238) along the cavity ramp surface (248) which is perpendicular to the first slot (237) results in an increase or decrease in the clutch gap (230) by engagement of the clutch adjustment member (234) with the clutch plate (228).

Once the desired clutch gap (230) is achieved, it is preferable that the desired setting be capable of being maintained. Thus, preferably, a clutch adjustment locking mechanism (250) is provided for fixing the position of the key (238) so that the clutch gap (230) can be maintained at the desired setting. Any locking mechanism, structure or device capable of fixing or maintaining the position of the key (238) relative to the first guide (236) may be used. However, preferably, the clutch adjustment locking mechanism (250) is comprised of one or more locking or set screws associated with the clutch adjustment member (234) which may be tightened to fix or maintain the key (238) at its desired position within the cavity (246) such that its further movement is prevented or otherwise inhibited.

Further, as a result of the rotation of the drilling shaft (24) during rotary drilling, there will be a tendency for the housing (46) to rotate during the drilling operation. As a result, the device (20) is preferably comprised of an anti-rotation device (252) associated with the housing (46) for restraining rotation of the housing (46) within the wellbore. Any type of anti-rotation device (252) or any mechanism, structure, device or method capable of restraining or inhibiting the tendency of the housing (46) to rotate upon rotary drilling may be used. Further, one or more such devices (252) may be used as necessary to provide the desired result.

As well, the device (252) may be associated with any portion of the housing (46) including its proximal, central and distal housing sections (52, 54, 56). In other words, the anti-rotation device (252) may be located at any location or position along the length of the housing (46) between its proximal and distal ends (48, 50). In the preferred embodiment, the device (52) is associated with the proximal housing section (52). Finally, the device (252) may be associated with the housing (46) in any manner permitting the functioning of the device (252) to inhibit or restrain rotation of the housing (46). However, preferably, the anti-rotation device (252) is associated with an outer surface of the housing (46), preferably being the outer surface (72) of the proximal housing section (52). Specifically, the anti-rotation device (20) is preferably positioned on or connected, affixed or mounted with the outer surface (72).

In a preferred embodiment of the anti-rotation device (252), the device (252) is comprised of at least one roller (254) on or associated with the outer surface (72) of the housing (46). The roller (254) contacts the wall of the wellbore to slow or inhibit the turning of the housing (46) with the drilling shaft (24) while drilling. As well, the roller (254) preferably exerts only a slight load. As a result, the axial motion of the drilling device (20), or the longitudinal motion of the device (20) through the wellbore, is relatively undisturbed such that the housing (46) is permitted to roll through the wellbore.

In the preferred embodiment, where the rotation restraining device or anti-rotation device (20) is comprised of at least one roller (254) on the housing (46), each roller (254) has an axis of rotation substantially perpendicular to a longitudinal axis (256) of the housing (46). Further, each roller (254) is oriented such that it is capable of rolling about its axis of rotation in response to a force exerted on the roller (254) substantially in the direction of the longitudinal axis (256) of the housing (46). For instance, as a longitudinal force is exerted through the drilling string (25) from the surface to the drilling shaft (24) in order to increase or decrease the necessary weight on the drilling bit (22), the roller (254) rolls about its axis to permit the drilling device (20) to move through the wellbore in either a downhole or uphole direction as required.

As indicated, the rotation restraining or anti-rotation device (252) may be comprised of one or more rollers (254). However, preferably, the anti-rotation device (252) is comprised of a plurality of rollers (254) spaced about a circumference of the housing (46), being defined by the outer surface of the housing (46), such that the rollers (254) may engage the wall of the wellbore. Any number of rollers (254) able to effectively restrain the rotation of the housing (46) during drilling to the desired degree may be used.

As indicated, the rollers (254) may be mounted with or positioned about the circumference of the housing (46) in any manner and by any mechanism, structure or device. However, preferably, the rollers (254) are mounted or positioned about the circumference of the housing (46) in one or more sets (257) of rollers (254) such that each set (257) of rollers (254) has a substantially common axis of rotation which is substantially perpendicular to the longitudinal axis (256) of the housing (46). Further, one or more sets (257) of rollers (254) are preferably mounted or positioned axially or longitudinally along the housing (46) within one or more rotation restraining carriage assemblies (258).

In the preferred embodiment, the anti-rotation device (252) is comprised of three rotation restraining carriage assemblies (258) spaced substantially evenly about the circumference of the housing (46). Further, each rotation restraining carriage assembly (258) is comprised of three sets (257) of rollers (254) spaced axially or longitudinally along the housing (46). Finally, each set (257) of rollers (254) is comprised of four coaxial rollers (254) spaced side to side.

Each rotation restraining carriage assembly (258) may be mounted, connected or affixed with the outer surface of the housing (46) in any manner. In the preferred embodiment, the outer surface (72) of the proximal housing section (52) defines a separate cavity (260) therein for fixedly or removably receiving each of the carriage assemblies (258) therein. The carriage assembly (258) may be fixedly or removably received in the cavity (260) and mounted, connected or otherwise affixed therewith in any manner and by any method, mechanism, structure or device able to relatively rigidly maintain the carriage assembly (258) in the cavity (260) during the drilling operation.

Further, in order to facilitate the movement of the rollers (254) through the wellbore and to enhance the rotation restraining action of the rollers (254), each of the rollers (254) is preferably capable of movement between a retracted position and an extended position in which the roller (254) extends radially from the housing (46). Further, the roller (254) is preferably biased towards the extended position to enhance or facilitate the engagement of the roller (254) with the wellbore. Any method, mechanism, structure or device may be used for biasing the roller (254) to the extended position. However, preferably, the anti-rotation device (252) is further comprised of a biasing device (262) for biasing the roller (254) toward the extended position. In the preferred embodiment, the biasing device (262) is comprised of at least one spring which acts, directly or indirectly, between the housing (46) and the carriage assembly (258) or the rollers (254). The outwardly biasing force or spring force may be selected according to the expected drilling conditions.

Each roller (254) may have any shape or configuration permitting it to roll or move longitudinally through the wellbore, while also restraining the rotation of the housing (46) within the wellbore. Specifically, each roller (254) has a peripheral surface (264) about its circumference permitting it to roll or move longitudinally within the wellbore. In addition, the peripheral surface (264) is preferably comprised of an engagement surface (266) for engaging the wall of the wellbore or borehole to restrain rotation of the housing (46). The engagement surface (266) may have any shape or configuration able to restrain the rotation of the housing (46). However, preferably, the engagement surface (266) is comprised of the peripheral surface (264) of the roller (254) being tapered.

In an alternate embodiment of the anti-rotation device (252), the device (252) is comprised of at least one piston (268) on or associated with the housing (46), and specifically the outer surface (72) of the housing (46). In this instance, the piston (268) contacts the wall of the wellbore to slow or inhibit the turning of the housing (46) with the drilling shaft (24) while drilling. More particularly, an outer surface (270) of the piston (268) extends from the housing (46) for engagement with the wall of the wellbore.

In order to facilitate the placement of the drilling device. (20) within the wellbore, the piston (268) is preferably capable of movement between a retracted position and an extended position. In the extended position, the outer surface (270) of the piston (268) extends radially from the housing (46) for engagement with the wellbore. In the retracted position, the outer surface (270) is moved towards the housing (46) and thus, away from or out of contact with the wellbore. Any piston (268) or piston assembly may be used to comprise the anti-rotation device (252).

Any device, structure, mechanism or method may be used for actuating the piston or pistons (268) between the retracted and extended positions. However, preferably, the anti-rotation device (252) is comprised of an actuator device (272) for moving the piston (268) between the retracted and extended positions. The actuator device (272) may be driven or powered in any manner such as hydraulically or pneumatically. However, preferably the actuator device (272) is hydraulically powered. More particularly, in the preferred embodiment, the actuator device (272) is comprised of a hydraulic pump, preferably a miniature co-axial gear type hydraulic pump, operatively connected with each piston (268).

As indicated, the rotation restraining or anti-rotation device (252) may be comprised of one or more pistons (268). However, preferably, the anti-rotation device (252) is comprised of a plurality of pistons (268) spaced about the circumference of the housing (46), being defined by the outer surface of the housing (46), such that the pistons (268) may engage the wall of the wellbore. Any number of pistons (268) able to effectively restrain the rotation of the housing (46) during drilling to the desired degree maybe used.

As indicated, the pistons (268) may be mounted with or positioned about the circumference of the housing (46) in any manner and by any mechanism, structure or device. However, preferably, the pistons (268) are mounted or positioned about the circumference of the housing (46) within one or more rotation restraining piston arrays (274).

In the preferred embodiment, the anti-rotation device (252) is comprised of three rotation restraining piston arrays (274) spaced substantially evenly about the circumference of the housing (46). Further, each rotation restraining piston array (274) is comprised of a plurality of pistons (268) spaced axially or longitudinally along the housing (46).

Each rotation restraining piston array (274) may be mounted, connected or affixed with the outer surface of the housing (46) in any manner. In addition, each piston (268) may be mounted, connected or affixed with the piston array (274) in any manner. In the preferred embodiment, the rotation restraining piston array (274) is preferably integral with the outer surface (72) of the proximal housing section (52). Further, each piston array (274) defines at least one cavity (276) therein for fixedly or removably receiving the pistons (268) of the carriage assembly (274) therein. The pistons (268) comprising each piston array (274) may be fixedly or removably received in the respective cavities (276) and mounted, connected or otherwise affixed therewith in any manner and by any method, mechanism, structure or device able to relatively rigidly maintain the pistons (268) in the cavity or cavities (276) during the drilling operation.

Each piston (268) may have any shape or configuration capable of restraining the rotation of the housing (46) within the wellbore when in the extended position. Specifically, each piston (268) has an outermost engagement surface (278) for engaging the wall of the wellbore or borehole to restrain rotation of the housing (46). The engagement surface (278) may have any shape or configuration able to engage the wall of the wellbore and restrain the rotation of the housing (46) within the wellbore.

In addition, the drilling device (20) is preferably further comprised of one or more seals or sealing assemblies for sealing the distal and proximal ends (50, 48) of the housing (46) such that the components of the device (20) located therebetween are not exposed to various drilling fluids, such as drilling mud. In addition to inhibiting the entrance of drilling fluids into the device (20) from outside, the seals or sealing assemblies also facilitate the maintenance or retention of desirable lubricating fluids within the device (20).

Preferably, the device (20) is comprised of a distal seal or sealing assembly (280) and a proximal seal or sealing assembly (282). The distal seal (280) is radially positioned and provides a rotary seal between the housing (46) and the drilling shaft (24) at, adjacent or in proximity to the distal end (50) of the housing (46). Thus, in the preferred embodiment, the distal seal (280) is radially positioned and provides a seal between the drilling shaft (24) and the distal housing section (56) at, adjacent or in proximity to it distal end (68).

The proximal seal (282) is radially positioned and provides a rotary seal between the housing (46) and the drilling shaft (24) at, adjacent or in proximity to the proximal end (48) of the housing (46). However, where the drilling string (25) extends within the proximal end (48) of the housing (46), the proximal seal (282) is more particularly positioned between the housing (46) and the drilling string (25). Thus, the proximal seal (282) is radially positioned and provides a seal between the drilling shaft (24) and the proximal housing section (52) at, adjacent or in proximity to it distal end (60). However, more particularly, the proximal seal (282) is radially positioned and provides a seal between an outer surface of the drilling string (25) and the proximal housing section (52) at, adjacent or in proximity to it distal end (60).

As well, the interior of the housing (46) preferably defines a fluid chamber (284) between the distal and proximal ends (50, 48) of the housing (46). Thus, the fluid chamber (284) is positioned or defined between the distal and proximal seals (280, 282) associated with the distal and proximal ends (50, 48) of the housing (46) respectively. As indicated above, the fluid chamber (284) is preferably filled with a lubricating fluid for lubricating the components of the device (20) within the housing (46).

In addition, one or both of the distal seal (280) and the proximal seal (282) are also preferably lubricated with the lubricating fluid from the fluid chamber (284) of the housing (46). In other words, each of the rotary distal and proximal seals (280, 282) is lubricated using fluid, typically oil, from the internal lubricating system of the drilling device (20). In addition, as described further below, each of the distal and proximal seals (280, 282) are lubricated or provided with filtered fluid in order to prevent or minimize any damage to the seals (280, 282) from any damaging metallic particles or other damaging contaminants which may be found within the lubricating fluid from the fluid chamber (284) of the housing (46) of the device (20). By filtering the lubricating fluid passing from the fluid chamber (284) of the housing (46) into either or both of the distal and proximal seals (280, 282), a relatively clean fluid environment is provided for the seals (280, 282).

As well, the distal and proximal seals (280, 282) are preferably mounted about the drilling shaft (24) and drilling string (25) respectively such that the drilling shaft (24) and attached drilling string (25) are permitted to rotate therein while maintaining the sealing. Further, the distal and proximal seals (280, 282) preferably provide a flexible sealing arrangement or flexible connection between the housing (46) and the drilling shaft (24) or drilling string (25) in order to maintain the seal provided thereby, while accommodating any movement or deflection of the drilling shaft (24) or drilling string (25) within the housing (46). This flexible connection is particularly important for the distal seal (280) which is exposed to the pivoting of the drilling shaft (24) by the deflection assembly (92).

In the preferred embodiment, the distal seal (280) is comprised of an inner portion (286) fixedly mounted about the drilling shaft (24) at, adjacent or in proximity to the distal end (50) of the housing (46) such that the inner portion (286) of the distal seal (280) rotates integrally with the drilling shaft (24). The distal seal (280) is further comprised of an outer portion (288), a section or part of which is rotatably mounted about the inner portion (286) to permit relative rotation therebetween and such that a channel or space (290) is defined between the inner and outer portions (286, 288). Further, the outer portion (288) is fixedly mounted, directly or indirectly, with the distal end (50) of the housing (46). Thus, upon the rotation of the drilling shaft (24), the inner portion (286) rotates with the drilling shaft (24) relative to the outer portion (288) which remains substantially stationary with the housing (46). Any structure, mechanism or device may be used to permit the relative rotation between the inner and outer portions (286, 288) of the distal seal (280). However, in the preferred embodiment, one or more bearings (292) are located between the inner and outer portions (286, 288) within the channel or space (290). Preferably, the bearings (292) are angular contact thrust bearings which serve a dual function as both radial and thrust bearings.

As indicated, the outer portion (288) of the distal seal (280) is fixedly mounted, directly or indirectly, with the distal end (50) of the housing (46). However, in the preferred embodiment, the outer portion (288) is fixedly connected or mounted with the distal thrust bearing collar (110) which is fixedly connected or mounted with the distal end (50) of the housing (46). Accordingly, the distal seal (280) is located or positioned adjacent the distal end (50) of the housing (46) within the distal thrust bearing retainer (112).

In addition, in the preferred embodiment, the outer portion (288) is comprised of a flexible collar (294) which provides the flexible connection or flexible sealing arrangement to accommodate the deflection or pivoting of the drilling shaft (24) within the housing (46). The flexible collar (294) is particularly located adjacent the point of connection of the outer portion (288) of the distal seal (280) with the distal thrust bearing collar (110). As a result, upon deflection of the drilling shaft (24), the inner portion (286) of the distal seal (280) and the section or part of the outer portion (288) mounted about the inner portion (286) are permitted to pivot about the point of connection of the outer portion (288) with the distal thrust bearing collar (110).

The distal seal (280) is further comprised of at least two rotary seals (298, 300) located within the channel or space (290) between the inner and outer portions (286, 288) of the distal seal (280) such that a chamber (296) is defined therebetween. Fluid is provided within the chamber (296) for lubricating the components of the distal seal (280). Preferably, the distal seal (280) is further comprised of a distal filtering mechanism for filtering the lubricating fluid from the fluid chamber (284) of the housing (46) so that the distal seal (280) is lubricated with filtered lubricating fluid. Any structure, mechanism, device or method may be used which is capable of filtering the lubricating fluid entering the distal seal (280). However, in the preferred embodiment, one or more filters (302) are located within the chamber (296) of the distal seal (280).

More particularly, an upper internal wiper seal (298) defines the uppermost or proximal end of the chamber (296). In addition, at least one filter (302) is preferably provided adjacent the internal wiper seal (298). As indicated, the distal seal (280) is preferably lubricated with the lubricating fluid from the fluid chamber (284) of the housing (46). In addition, the fluid is preferably filtered in order to prevent or minimize any damage to the distal seal (280) from any damaging metallic particles or other contaminants which may be found within the lubricating fluid from the fluid chamber (284) of the housing (46). Thus, the internal wiper seal (298) and the filter (302) assist in providing a relatively clean fluid environment for the distal seal (280).

In addition, a lower external barrier seal (300) defines the lowermost or distal end of the chamber (296). The external barrier seal (300) prevents or inhibits the passage of external contaminants and abrasive wellbore material into the distal seal (280). Thus, the external barrier seal (300) also assists in providing a relatively clean fluid environment for the distal seal (280).

Finally, in the preferred embodiment, a rotary face seal (304) is provided adjacent of the external barrier seal (300) outside of the chamber (296) for further preventing or inhibiting the passage of contaminants and abrasive material from the wellbore into the distal seal (280). The rotary face seal (304) provides a seal between the adjacent lowermost faces or distal ends of the inner and outer portions (286, 288) of the distal seal (280). Although any rotary face seal may be used, the rotary face seal (304) is preferably biased or spring loaded to maintain the sealing action.

The proximal seal (282) is also comprised of an inner portion (306) fixedly mounted about the drilling string (25) at, adjacent or in proximity to the proximal end (48) of the housing (46) such that the inner portion (306) of the proximal seal (282) rotates integrally with the drilling string (25) and the drilling shaft (24). The proximal seal (282) is further comprised of an outer portion (308), a section or part of which is rotatably mounted about the inner portion (306) to permit relative rotation therebetween and such that a channel or space (310) is defined between the inner and outer portions (306, 308). Further, the outer portion (308) is fixedly mounted, directly or indirectly, with the proximal end (48) of the housing (46). Thus, upon the rotation of the drilling string (25), the inner portion (306) rotates with the drilling string (25) relative to the outer portion (308) which remains substantially stationary with the housing (46). Any structure, mechanism or device may be used to permit the relative rotation between the inner and outer portions (306, 308) of the proximal seal (282). However, in the preferred embodiment, one or more bearings (312) are located between the inner and outer portions (306, 308) within the channel or space (310). Preferably, the bearings (312) are angular contact thrust bearings which serve a dual function as both radial and thrust bearings.

As indicated, the outer portion (308) of the proximal seal (282) is fixedly mounted, directly or indirectly, with the proximal end (48) of the housing (46). However, in the preferred embodiment, the outer portion (308) is fixedly connected or mounted with the proximal thrust bearing collar (134) which is fixedly connected or mounted with the proximal end (48) of the housing (46). Accordingly, the proximal seal (282) is located or positioned adjacent the proximal end (48) of the housing (46) within the proximal thrust bearing retainer (136).

In addition, in the preferred embodiment, the outer portion (308) is comprised of a flexible collar (314) which provides the flexible connection or flexible sealing arrangement to accommodate any movement or deflection of the drilling string (25) within the housing (46). The flexible collar (314) is particularly located adjacent the point of connection of the outer portion (308) of the proximal seal (282) with the proximal thrust bearing collar (134). As a result, upon deflection of the drilling string (25), the inner portion (306) of the proximal seal (282) and the section or part of the outer portion (308) mounted about the inner portion (306) are permitted to pivot about the point of connection of the outer portion (308) with the proximal thrust bearing collar (134).

The proximal seal (282) is further comprised of at least two rotary seals (318, 320) located within the channel or space (310) between the inner and outer portions (306, 308) of the proximal seal (282) such that a chamber (316) is defined therebetween. Fluid is provided within the chamber (316) for lubricating the components of the proximal seal (282). Preferably, the proximal seal (282) is further comprised of a proximal filtering mechanism for filtering the lubricating fluid from the fluid chamber (284) of the housing (46) so that the proximal seal (282) is lubricated with filtered lubricating fluid. Any structure, mechanism, device or method may be used which is capable of filtering the lubricating fluid entering the proximal seal (282). However, in the preferred embodiment, one or more filters (322) are located within the chamber (316) of the proximal seal (282).

More particularly, a lower internal wiper seal (318) defines the lowermost or distal end of the chamber (316). In addition, at least one filter (322) is preferably provided adjacent the internal wiper seal (318). As indicated, the proximal seal (282) is preferably lubricated with the lubricating fluid from the fluid chamber (284) of the housing (46). In addition, the fluid is preferably filtered in order to prevent or minimize any damage to the proximal seal (282) from any damaging metallic particles or other contaminants which may be found within the lubricating fluid from the fluid chamber (284) of the housing (46). Thus, the internal wiper seal (318) and the filter (322) assist in providing a relatively clean fluid environment for the proximal seal (282).

In addition, an upper external barrier seal (320) defines the uppermost or proximal end of the chamber (316). The external barrier seal (320) prevents or inhibits the passage of external contaminants and abrasive wellbore material into the proximal seal (282). Thus, the external barrier seal (320) also assists in providing a relatively clean fluid environment for the proximal seal (282).

Finally, in the preferred embodiment, a rotary face seal (324) is provided adjacent of the external barrier seal (320) outside of the chamber (316) for further preventing or inhibiting the passage of contaminants and abrasive material from the wellbore into the proximal seal (282). The rotary face seal (324) provides a seal between the adjacent uppermost faces or proximal ends of the inner and outer portions (306, 308) of the proximal seal (282). Although any rotary face seal may be used, the rotary face seal (324) is preferably biased or spring loaded to maintain the sealing action.

Further, the lubricating fluid contained within the fluid chamber (284) of the housing (46) between the proximal and distal seals (282, 280) has a pressure. Preferably, the device (20) is further comprised of a pressure compensation system (326) for balancing the pressure of the lubricating fluid contained in the fluid chamber (284) within the housing (46) with the ambient pressure outside of the housing (46). The pressure compensation system (326) may be located at any position or location along the length of the housing (46) between the distal and proximal seals (280, 282). In addition, the pressure compensation system (326) may be connected, mounted or otherwise associated with one or more of the distal, central and proximal housing sections (52, 54, 56). However, preferably, the pressure compensation system (326) is connected, mounted or otherwise associated with the central housing section (54). More preferably, the pressure compensation system (326) is connected, mounted or otherwise associated with the central housing section (54) proximal to or uphole of the proximal radial bearing (84).

The pressure compensation system (326) may be comprised of any mechanism, device or structure capable of providing for or permitting the balancing of the pressure of the lubricating fluid contained in the fluid chamber (284) with the ambient pressure outside of the housing (46). Preferably, the pressure compensation system (326) is comprised of at least one pressure port (328) in the housing (46) so that the ambient pressure outside of the housing (46) can be communicated to the fluid chamber (284). In the preferred embodiment, a pressure port (328) is located and mounted within the central housing section (54) to permit the communication of the ambient pressure of the wellbore fluids outside of the central housing section (54) to the lubricating fluid within the fluid chamber (284), which is contained or defined at least in part by the central housing section (54). Thus, in the wellbore, the pressure of the lubricating fluid within the housing (46) is determined at least in part by the ambient pressure outside of the housing (46) within the annulus of the wellbore.

Further, the pressure compensation system (326) is preferably comprised of a lubricating fluid regulating system (331) which facilitates charging of the fluid chamber (284) with lubricating fluid and provides adjustment of the amount of lubricating fluid in the fluid chamber (284) during drilling in response to increased temperatures and pressures downhole experienced by the lubricating fluid.

Preferably, the lubricating fluid regulating system (331) is comprised of a charging valve (332) and a relief valve (334). Both valves (332, 334) are located or mounted within the housing (46), preferably in the central housing section (54). The charging valve (332) permits or provides for the entry or charging of a sufficient amount of the lubricating fluid into the fluid chamber (284). The relief valve (334) is set to permit the passage of fluid out of the fluid chamber (284) through the relief valve (334) at a predetermined or preselected pressure.

More particularly, the drilling device (20) is charged with lubricating oil at the surface through the charging valve (332) until the fluid pressure in the fluid chamber (284) exceeds the pressure value of the relief valve (334). In addition, as the device (20) is moved downhole in the wellbore and the temperature increases, the fluid expands and the excess fluid is ejected or expelled from the fluid chamber (284) through the relief valve (334).

Preferably, the pressure of the lubricating fluid contained in the fluid chamber (284) of the housing (46) is maintained higher than the ambient pressure outside of the housing (46) or the annulus pressure in the wellbore. Specifically, the pressure compensation system (326) preferably internally maintains a positive pressure across the distal and proximal seals (280, 282). As a result, in the event there is any tendency for the distal and proximal seals (280, 282) to leak and permit the passage of fluid across the seals (280, 282), the passage of any such fluid will tend to be lubricating fluid from within the fluid chamber (284) to outside of the device (20). Accordingly, the higher internal pressure will facilitate the maintenance of a clean fluid environment within the fluid chamber (284), as described above, by inhibiting or preventing the passage of wellbore annulus fluids into the fluid chamber (284).

In order to provide a pressure within the fluid chamber (284) of the housing (46) higher than the outside annulus pressure, the pressure compensation system (326) is further preferably comprised of a supplementary pressure source (330). The supplementary pressure source (330) exerts pressure on the lubricating fluid contained in the fluid chamber (284) so that the pressure of the lubricating fluid contained in the fluid chamber (284) is maintained higher than the ambient pressure outside of the housing (46). The pressure differential between the fluid chamber (284) and outside the housing (46) may be selected according to the expected drilling conditions. However, preferably, only a slightly positive pressure is provided in the fluid chamber (284) by the supplementary pressure source (330).

The supplementary pressure may be provided in any manner or by any method, and the supplementary pressure source (330) may be comprised of any structure, device or mechanism, capable of providing the desired supplementary pressure within the fluid chamber (284) to generate the desired pressure differential between the fluid chamber (284) and outside the housing (46). However, preferably, the pressure compensation system (326) is further comprised of a balancing piston assembly (336).

The balancing piston assembly (336) is comprised of a piston chamber (338) defined by the interior of the housing (46), preferably the inner surface (74) of the central housing section (54). The balancing piston assembly (336) is further comprised of a movable piston (340) contained within the piston chamber (338). The piston (340) separates the piston chamber (338) into a fluid chamber side (342) and a balancing side (344). The fluid chamber side (342) is connected with the fluid chamber (284) and is preferably located distally or downhole of the piston (340). The pressure port (328) communicates with the balancing side (344) of the piston chamber (338), which is preferably located proximally or uphole of the piston (340). Further, the supplementary pressure source (330) acts on the balancing side (344) of the piston chamber (338). Specifically, the supplementary pressure source (330) acts on the balancing side (344) by exerting the supplementary pressure on the piston (340).

In the preferred embodiment, the supplementary pressure source (330) is comprised of a biasing device located within the balancing side (344) of the piston chamber (338) and which exerts the supplementary pressure on the piston (340). More particularly, the biasing device biases the piston (340) distally or downhole to generate or exert the supplementary pressure within the fluid chamber side (342) of the piston chamber (338), which supplementary pressure is communicated to the lubricating fluid within the fluid chamber (284) of the housing (46).

Thus, the supplementary pressure source (330) may be comprised of any device, structure or mechanism capable of biasing the piston (340) in the manner described above. However, in the preferred embodiment, the biasing device is comprised of a spring (346). As indicated, the spring (346) is contained in the balancing side (344) of the piston chamber (338). When charging the device (20) with lubricating oil, the spring (346) is preferably fully compressed. As lubricating oil leaks or otherwise passes out of the fluid chamber (284), the spring (346) continues to exert the supplementary pressure on the piston (340) and the piston (340) is moved distally or in a downhole direction.

As a safety provision, an indicator is preferably provided with the device (20) for indicating the level of the lubricating oil in the fluid chamber (284) and communicating this information to the surface. Preferably, a two position switch is provided which indicates a "low" oil level and "no" oil level. This allows the device (20) to be pulled from the wellbore in the case of an oil leak, while avoiding or minimizing any damage to the device (20).

In the preferred embodiment, the pressure compensation system (326) is further comprised of an oil level limit switch (348). The oil level limit switch (348) is preferably positioned within the fluid chamber side (342) of the piston chamber (338). Specifically, as the oil is depleted and the level thus decreases within the fluid chamber (284), the spring (346) exerts the supplementary pressure on the piston (340) and the piston (340) is moved distally or in a downhole direction within the piston chamber (338) towards the oil level limit switch (348). Once the oil is depleted to a preselected level, or the oil is fully depleted, the piston (340) is moved within the piston chamber (338) for contact with and depression or movement of the oil level limit switch (348) distally in a downhole direction. Depression of the oil level limit switch (348) actuates the oil level limit switch (348) to indicate either a "low oil level" or "no oil level" in the fluid chamber (284) depending upon the amount or extent to which the switch (348) is depressed.

In the preferred embodiment of the device (20), there is a need to communicate electrical signals between two members which rotate relative to each other without having any contact therebetween. For example, this communication is required when downloading operating parameters for the device (20) or communicating downhole information from the device (20) either further uphole along the drilling string (25) or to the surface. Specifically, the electrical signals must be communicated between the drilling shaft (24) and the housing (46), which rotate relative to each other during the rotary drilling operation.

The communication link between the drilling shaft (24) and the housing (46) may be provided by any direct or indirect coupling or communication method or any mechanism, structure or device for directly or indirectly coupling the drilling shaft (24) with the housing (46). For instance, the communication between the housing (46) and the drilling shaft (24) may be provided by a slip ring or a gamma-at-bit communication toroid coupler. However, in the preferred embodiment, the communication between the drilling shaft (24) and the housing (46) is provided by an electromagnetic coupling device.

In the preferred embodiment, the communication between the drilling shaft (24) and the housing (46) is provided by an electromagnetic coupling device (350). More particularly, the electromagnetic coupling device (350) is comprised of a housing conductor or coupler (352) positioned on the housing (46) and fixedly mounted or connected with the housing (46) such that it remains substantially stationary relative to the drilling shaft (24) during drilling. Further, the electromagnetic coupling device (350) is comprised of a drilling shaft conductor or coupler (354) positioned on the drilling shaft (24) and fixedly mounted or connected with the drilling shaft (24) such that the drilling shaft conductor (354) rotates with the drilling shaft (24). The housing conductor (352) and the drilling shaft conductor (354) are positioned on the housing (46) and drilling shaft (24) respectively sufficiently close to each other so that electrical signals may be induced between them.

The housing conductor (352) and the drilling shaft conductor (354) may be comprised of a single wire or a coil and may be either wrapped or not wrapped around a magnetically permeable core.

Further, in the preferred embodiment, proximal electrical conductors, such as proximal electrical wires (356), run or extend along or through the drilling string (25) to the drilling shaft (24) within the device (20) to the drilling shaft conductor (354). Similarly, distal electrical conductors, such as distal electrical wires (358), run or extend from the housing conductor (352) along or through the housing (46) to a controller (360) of the device (20) and to the various sensors as outlined below.

The electromagnetic coupling device (350) may be positioned at any location along the length of the device (20). However, in the preferred embodiment, the electromagnetic coupling device (350) is positioned or located within the central housing section (54). More particularly, the electromagnetic coupling device (350) is positioned or located within the central housing section (54) at, adjacent or in proximity to its proximal end (62), proximal to or uphole of the proximal radial bearing (84) and the pressure compensation system (326).

The deflection assembly (92) may be actuated manually. However, as indicated, the device (20) is preferably further comprised of a controller (360) for controlling the actuation of the drilling shaft deflection assembly (92) to provide directional drilling control. The controller (360) of the device (20) is associated with the housing (46) and is preferably comprised of an electronics insert positioned within the central housing section (54). More preferably, the controller (360), and particularly the electronics insert, is positioned within the central housing section (54) distal to or downhole of the proximal radial bearing (84). Information or data provided by the various downhole sensors of the device (20) is communicated to the controller (360) in order that the deflection assembly (92) may be actuated with reference to and in accordance with the information or data provided by the sensors.

More particularly, the deflection assembly (92) is preferably actuated to orient the inner and outer rings (158, 156)

relative to a reference orientation in order to provide directional control over the drilling bit (22) during drilling operations. In the preferred embodiment, the deflection assembly (92) is actuated with reference to the orientation of the housing (46) in the wellbore.

Thus, the drilling device (20) is preferably comprised of a housing orientation sensor apparatus (362) which is associated with the housing (46) for sensing the orientation of the housing (46) within the wellbore. Given that the housing (46) is substantially restrained from rotating during drilling, the orientation of the housing (46) which is sensed by the housing orientation sensor apparatus (362) provides the reference orientation for the device (20). The housing orientation sensor apparatus (362) may be comprised of any sensor or sensors, such as one or a combination of magnetometers and accelerometers, capable of sensing the position of the housing at a location at, adjacent or in proximity to the distal end (60) of the housing (46). More particularly, the housing orientation sensor apparatus (362) is preferably located as close as possible to the distal end (50) of the housing (46). In addition, the housing orientation sensor apparatus (362) preferably senses the orientation of the housing (46) in three dimensions in space.

In the preferred embodiment, the housing orientation sensor apparatus (362) is contained within or comprised of an ABI or At-Bit-Inclination insert (364) associated with the housing (46). Preferably, the ABI insert (364) is connected or mounted with the distal housing section (56) at, adjacent or in dose proximity with its distal end (68). In the preferred embodiment, the ABI insert (364) is positioned or located within the distal housing section (56) axially between the deflection assembly (92) and the fulcrum bearing (88).

As well, the drilling device (20) is preferably further comprised of a deflection assembly orientation sensor apparatus (366) which is associated with the deflection assembly (92) for sensing the orientation of the deflection assembly (92). More particularly, the deflection assembly orientation sensor apparatus (366) senses the particular orientation of the inner and outer rings (158, 156) of the deflection assembly (92) relative to the housing (46).

The deflection assembly orientation sensor apparatus (366) may be comprised of any sensor or sensors, such as one or a combination of magnetometers and accelerometers, capable of sensing the position of the deflection assembly (92) relative to the housing (46). In addition, the deflection assembly orientation sensor apparatus (366) preferably senses the orientation of the deflection assembly (92) in three dimensions in space. Where one sensor is provided, the sensor must be capable of sensing the orientation of the inner peripheral surface (168) of the inner ring (158) relative to the housing (46). However, preferably, the deflection assembly orientation sensor apparatus (366) is comprised of a separate sensor for sensing the orientation of each of the inner ring (158) and the outer ring (156) relative to the housing (46).

In the preferred embodiment, the deflection assembly orientation sensor apparatus (366) is comprised of an inner ring home reference sensor (368) for sensing the orientation of the inner ring (158) relative to the housing (46) and an outer ring home reference sensor (370) for sensing the orientation of the outer ring (156) relative to the housing (46). The inner and outer ring home reference sensors (368, 370) may be associated with the respective inner and outer rings (158, 156) in any manner and by any structure, mechanism or device permitting or capable of providing for the sensing of the orientation of the associated ring (158, 156) by the respective sensor (368, 370). However, preferably, the inner and outer ring home reference sensors (368, 370) are mounted or connected with the inner ring drive mechanism (170) and the outer ring drive mechanism (164) respectively. In addition, each of the inner and outer ring home reference sensors (368, 370) provides information or data to the controller (360) with respect to the orientation of the respective rings (158, 156) as compared to a home or reference position relative to the housing (46).

In the preferred embodiment, each of the inner and outer ring home reference sensors (368, 370) is comprised of a plurality of magnets associated with a rotating or rotatable component of the inner ring drive mechanism (170) and the outer ring drive mechanism (164) respectively such that the magnets rotate therewith. The magnetic fields generated by the magnets of each of the inner and outer ring home reference sensors (368, 370) are sensed by a stationary counter associated with a non-rotating or non-rotatable component of the inner ring drive mechanism (170) and the outer ring drive mechanism (164) respectively. The stationary counter is provided to sense how far the inner and outer rings (158, 156) have rotated from each of their reference or home positions.

In addition, the deflection assembly orientation sensor apparatus (366) may also be comprised of one or more position sensors, such as high speed position sensors, associated with each of the inner and outer ring drive mechanisms (170, 164). In the preferred embodiment, the deflection assembly orientation sensor apparatus (366) is comprised of an inner ring high speed position sensor (372) associated with the inner ring drive mechanism (170) and an outer ring high speed position sensor (374) associated with the outer ring drive mechanism (164). Each of the high speed sensors (372, 374) is provided for sensing the rotation which is actually transmitted from the drilling shaft (24) through the inner ring clutch (224) and outer ring clutch (184) respectively to the inner and outer ring drive mechanisms (170, 164) respectively.

The inner and outer ring high speed position sensors (372, 374) may be associated with the respective inner and outer ring drive mechanisms (170, 164) in any manner and by any structure, mechanism or device permitting the sensing of the rotation actually transmitted from the drilling shaft (24) through the clutch (224, 184) to the drive mechanisms (170, 164). However, preferably, the inner and outer ring high speed position sensors (372, 374) are mounted or connected with the inner ring drive mechanism (170) and the outer ring drive mechanism (164) respectively.

In addition, one and preferably both of the high speed position sensors (372, 374) may be associated with an rpm sensor (375). The rpm sensor (375) is connected, mounted or associated with the drilling shaft (24) for sensing the rotation of the drilling shaft (24). In the preferred embodiment, the rpm sensor (375) is positioned within the central housing section (54) adjacent the electromagnetic coupling device (350). Further, the rpm sensor (375) is associated with the high speed position sensors (372, 374) such that a comparison may be made between the rotation sensed by the high speed position sensors (372, 374) and the rotation sensed by the rpm sensor (375). The comparison of the rotation sensed by the high speed position sensors (372, 374) and the rotation sensed by the rpm sensor (375) may be used to determine slippage through one or both clutches (224, 184) and to detect possible malfunctioning of the clutch (224, 184).

Each of the inner and outer ring high speed position sensors (372, 374) may similarly be comprised of any sensor or sensors capable of sensing rotation as described above.

As indicated, the controller (360) is operatively connected with both the housing orientation sensor apparatus (362) and the deflection assembly orientation sensor apparatus (366) so that the deflection assembly (92) may be actuated with reference to the orientation of both the housing (46) and the deflection assembly (92). The deflection assembly (92) is preferably actuated with reference to the orientation of both the housing (46) and the deflection assembly (92) since the housing orientation sensor apparatus (362) preferably senses the orientation of the housing (46) in three-dimensional space, while the deflection assembly orientation sensor apparatus (366) preferably senses the orientation of the inner and outer rings (158, 156) of the deflection assembly (92) relative to the housing (46).

Although the controller (360) may be operatively connected with both the housing orientation sensor apparatus (362) and the deflection assembly orientation sensor apparatus (366) in any manner and by any mechanism, structure, device or method permitting or providing for the communication of information or data therebetween, the operative connection is preferably provided by an electrical conductor, such as electrical wiring.

The controller (360) may also be operatively connected with a drilling string orientation sensor apparatus (376) so that the deflection assembly (92) may further be actuated with reference to the orientation of the drilling string (25). The drilling string orientation sensor apparatus (376) is connected, mounted or otherwise associated with the drilling string (25). The controller (360) may be operatively connected with the drilling string orientation sensor apparatus (376) in any manner and by any mechanism, structure, device or method permitting or providing for the communication of information or data therebetween.

However, preferably, the operative connection between the controller (360) and the drilling string orientation sensor apparatus (376) is provided by the electromagnetic coupling device (350). Specifically, as discussed above, the distal wires (358) extend from the controller (360) to the housing conductor (352) of the electromagnetic coupling device (350). The proximal wires (356) preferably extend along the drilling string (25) from the drilling string orientation sensor apparatus (376) to the drilling shaft (24) and the drilling shaft conductor (354). Electrical signals are induced between the housing conductor (3520 and the drilling shaft conductor (354).

The drilling string orientation sensor apparatus (376) may be comprised of any sensor or sensors, such as one or a combination of magnetometers and accelerometers, capable of sensing the orientation of the drilling string (25)). In addition, the drilling string orientation sensor apparatus (376) preferably senses the orientation of the drilling string (25) in three dimensions in space.

Thus, in the preferred embodiment, the deflection assembly (92) may be actuated to reflect a desired orientation of the drilling string (25) by taking into consideration the orientation of the drilling string (25), the orientation of the housing (46) and the orientation of the deflection assembly (92) relative to the housing (46).

As well, while drilling, the housing (46) may tend to slowly rotate in the same direction of rotation of the drilling shaft (24) due to the small amount of torque that is transmitted from the drilling shaft (24) to the housing (46). This motion causes the toolface of the drilling bit (22) to move out of the desired position. The various sensor apparatuses (362, 366, 376) sense this change and communicate the information to the controller (360). The controller (360) preferably keeps the toolface of the drilling bit (22) on target by automatically rotating the inner and outer rings (158, 156) of the deflection assembly (92) to compensate for the rotation of the housing (46).

Further, in order that information or data may be communicated along the drilling string (25) from or to downhole locations, such as from or to the controller (360) of the device (20), the device (20) may be comprised of a drilling string communication system (378). More particularly, the drilling string orientation sensor apparatus (376) is also preferably operatively connected with the drilling string communication system (378) so that the orientation of the drilling string (25) may be communicated to an operator of the device (20). The operator of the device (20) may be either a person at the surface in charge or control of the drilling operations or may be comprised of a computer or other operating system for the device (20).

The drilling string communication system (378) may be comprised of any system able to communicate or transmit data or information from or to downhole locations. However, preferably, the drilling string communication system (378) is comprised of an MWD or Measurement-While-Drilling system or device.

The device (20) may be comprised of any further number of sensors as required or desired for any particular drilling operation, such as sensors for monitoring other internal parameters of the device (20).

Finally, the device (20) may be further comprised of a device memory (380) for storing data generated by one or more of the housing orientation sensor apparatus (362), the deflection assembly orientation sensor apparatus (366), the drilling string orientation sensor apparatus (376) or data obtained from some other source such as, for example an operator of the device (20). The device memory (380) is preferably associated with the controller (20), but may be positioned anywhere between the proximal and distal ends (48, 50) of the housing (46), along the drilling string (25), or may even be located outside of the borehole. During operation of the device (20), data may be retrieved from the device memory (380) as needed in order to control the operation of the device (20), including the actuation of the deflection assembly (92).

The invention is also comprised of methods for orienting a drilling system, which methods are particularly suited for orienting a rotary drilling system and are preferably used for directional drilling using a rotary drilling system. The methods of the within invention may be used for rotary drilling with any rotary drilling system comprised of a rotatable drilling string (25) and a drilling direction control device.

Further, the methods may be used for rotary drilling with any drilling direction control device which includes a rotatable and deflectable drilling shaft (24) connected with the drilling string (25). The deflection of the drilling shaft (24) may be achieved by bending the drilling shaft (24) or by pivoting the drilling shaft (24) or by a combination thereof.

However, preferably, the methods of the within invention are used and performed in conjunction with the drilling direction control device (20) described herein, and more preferably, with the preferred embodiment of the drilling direction control device (20). The methods may be performed manually or on a fully automated or semi-automated basis.

Where the methods are performed manually, an operator of the device provides instructions to the drilling direction control device (20) for actuation of the device (20), which instructions may be communicated to the device (20) via a drilling string communication system (378). In other words, where the methods are performed manually, there is a communication link between the operator and the device (20).

Where the methods are performed on either a fully automated basis or a semi-automated basis, the operator does not communicate with or provide instructions to the device (20). Instead, the drilling string communication system (378) communicates with the device (20) and provides instructions to the device (20) for actuation of the device (20). In other words, where the methods are performed on an automated basis, there is no communication link between the operator and the device (20), although there may be a communication link between the operator and the drilling string communication system (378).

Where the method is fully automated, the operator of the device typically provides no instructions to either the device (20) or the drilling string communication system (378) other than to provide the initial programming of the device (20) or any subsequent reprogramming (20), and the device (20) and the drilling string communication system (378) communicate with each other to control the direction of drilling.

Where the method is semi-automated, the operator of the device (20) communicates with the drilling string communication system (378), which then provides instructions to the device (20) to control the direction of drilling. The communication between the operator and the drilling string communication system (378) may be conducted in any manner. In the preferred embodiment, the operator communicates with the drilling string communication system (378) by manipulating the drilling string (25). The drilling string communication system (378) then provides instructions to the device (20) based upon the communication between the operator and the drilling string communication system (378).

Regardless of whether the method is being performed on a manual, fully automated or semi-automated basis, instructions must somehow be provided to the device (20) to actuate the device (20) to deflect the drilling shaft (24).

If the operator or the drilling string communication system (378) provide instructions to the device (20) relating specifically to a required actuation of the device (20), then the instructions are being provided directly to the device (20). Conversely, if the operator or the drilling string communication system (378) provide instructions to the device (20) relating only to the desired orientation of the drilling string (25) or to some other parameter, then the instructions are being provided indirectly to the device (20), since the instructions pertaining to the orientation of the drilling string (25) or other parameter must be processed by the device (20) and converted to instructions relating specifically to the required actuation of the device (20) to reflect the desired orientation of the drilling string.

For instance, the methods may be performed manually and directly by the operator providing instructions to the drilling direction control device (20) relating specifically to a required actuation of the device (20). Specifically, the operator of the device (20) may receive data from various sensors pertaining to the orientation of the drilling string (25) or the device (20). The operator may then process this data and provide specific instructions to the device (20) relating to the actuation of the device (20) required to achieve a desired orientation of the drilling shaft.

Alternatively, the methods may be performed manually and indirectly by the operator providing instructions to the device (20) relating only to the desired orientation of the drilling string (25). Specifically, the operator of the device (20) may receive data from a sensor or sensors pertaining to the orientation of the drilling string (25). The operator may then provide to the device (20) instructions in the form of the data pertaining to the desired orientation of the drilling string (25), which the device (20) may then process and convert to specific instructions for actuation of the device to reflect the desired orientation of the drilling string (25).

The methods may be performed semi-automatically and directly by the operator communicating with the drilling string communication system (378), such as for example by manipulation of the drilling string (25). The drilling string communication system (378) then gathers data, processes the data and generates instructions to provide to the device (20) relating specifically to a required actuation of the device (20), which instructions are communicated from the drilling string communication system (378) to the device (20).

Alternatively, the methods may be performed semi-automatically and indirectly by the operator communicating with the drilling string communication system (378), such as for example by manipulation of the drilling string (25). The drilling string communication system (378) gathers data and then generates instructions to provide to the device (20) in the form of data relating to a parameter such as the orientation of the drilling string (25), which instructions are communicated from the drilling string communication system (378) to the device (20). The device (20) then processes the instructions to actuate the device (20) to reflect the instructions received from the drilling string communication system (378).

The methods may be performed fully automatically and directly by the drilling string communication system (378) gathering data, processing the data and generating instructions to the device (20) relating specifically to a required actuation of the device (20), which instructions are communicated from the drilling string communication system (378) to the device (20).

Alternatively, the methods may be performed fully automatically and indirectly by the drilling string communication system (378) gathering data and generating instructions to provide to the device (20) in the form of data relating to a parameter such as the orientation of the drilling string (25), which instructions are communicated from the drilling string communication system (378) to the device (20). The device (20) then processes the instructions to actuate the device (20) to reflect the instructions received from the drilling string communication system (378).

However, as noted above, where the method is fully automated, the method involves pre-programming one or both of the drilling string communication system (378) and the device (20) prior to commencing the drilling operation. Further or alternatively, the method may involve programming or reprogramming one or both of the drilling string communication system (378) and the device (20) during or after commencement of the drilling operation.

For instance, when the methods are performed fully automatically and indirectly, the methods preferably involve preprogramming the device (20) with a desired orientation of the drilling string (25) or a series of desired orientations of the drilling string (25). The device (20) then communicates with the drilling string communication system (378) to effect drilling for a pre-programmed duration at one desired orientation of the drilling string (25), followed by drilling for a pre-programmed duration at a second desired orientation of the drilling string (25), and so on. In addition, the methods may further or alternatively involve programming or reprogramming the device (20) with a new or further desired orientation of the drilling string (25) or a new or further series of desired orientations of the drilling string (25) during the drilling operation. In this case, the new or further desired orientations may be sent to the device memory (380) and stored for subsequent retrieval.

The device (20) may also be operated using a combination of fully automated methods, semi-automated methods and manual methods, and may be assisted by expert systems and artificial intelligence (AI) to address actual drilling conditions that are different from the expected drilling conditions.

In the preferred embodiment, the methods are performed semi-automatically and indirectly. Thus, as described above, the device (20) is preferably used in conjunction with the drilling string communication system (378). Furthermore, the device is preferably capable of interfacing with the system (378) such that it can communicate with the drilling string communication system (378) and process data generated by the drilling string communication system (378) in order to control the actuation of the device (20). The drilling string communication system (378) may thus be used to communicate data provided by one or more of the sensor apparatuses (362, 366, 376) or other downhole sensors to the surface and may further be used to communicate data or information downhole to the drilling direction control device (20).

As indicated, where the method is performed semi-automatically and indirectly, the operator communicates with the drilling string communication system (378) only and not with the device (20). The operator preferably communicates with the drilling string communication system (378) by manipulating the drilling string (25) to a desired orientation. Thus, the preferred embodiment of the method allows the operator of the drilling system to be concerned primarily with the orientation of the drilling string (25) during drilling operations, since the device (20) will interface with the drilling string communication system (378) and adjust the deflection assembly (92) with reference to the orientation of the drilling string (25). This is made possible by establishing a relationship amongst the orientation of the drilling string (25), the orientation of the housing (46) and the orientation of the deflection assembly (92), thus simplifying drilling operations.

Further, operation of the drilling direction control device (20) on an indirect, semi-automated basis preferably involves establishing or determining a desired orientation of the drilling string (25) before the commencement of drilling operations and actuating the drilling direction control device (20), and particularly the deflection assembly (92), to deflect the drilling shaft (24) to reflect the desired orientation. This desired orientation is then preferably maintained until a new desired orientation is established and will typically require temporary cessation of drilling to permit the deflection assembly (92) to be actuated to reflect the new desired orientation of the drilling string (25).

In addition, operation of the drilling direction control device (20) also preferably involves maintaining the deflection of the drilling shaft (24) during drilling operations so that the deflection of the drilling shaft (24) continues to reflect the desired orientation of the drilling string. Maintaining the deflection of the drilling shaft (24) results in the maintenance of both the tool face and the magnitude of deflection of the drilling bit (22) attached thereto.

In the preferred embodiment, the maintaining step may be necessary where some rotation of the housing (46) of the device (20) is experienced during drilling operations and may involve adjusting deflection of the drilling shaft (25) to account for the rotation of the housing (46) during drilling operations or to adjust the actuation of the deflection assembly (92) to account for rotational displacement of the housing (46), since the deflection assembly (92) in the preferred embodiment is actuated relative to the housing (46). In addition, the actuation of the deflection assembly (92) may also require adjusting to account for undesired slippage of one or both of the inner and outer ring clutches (224, 184) comprising the inner and outer ring drive mechanisms (170, 164) of the deflection assembly (92).

More particularly, in the preferred embodiment, the method is comprised of the steps of orienting the drilling string (25) at a desired orientation, sensing the desired orientation of the drilling string (25) with the drilling string communication system (378), communicating the desired orientation of the drilling string (25) to the drilling direction control device (20) and actuating the drilling direction control device (20) to deflect the drilling shaft (24) to reflect the desired orientation. The deflection of the drilling shaft (24) provides the necessary or required tool face and magnitude of deflection of the drilling bit (22) attached to the drilling shaft (24) such that the drilling operation may proceed in the desired direction and the drilling direction may be controlled.

The drilling string (25) may be oriented at the desired orientation, and specifically the orienting step may be performed, in any manner and by any method able achieve the desired orientation of the drilling string (25). However, preferably, the drilling string (25) is manipulated from the surface to achieve the desired orientation. Further, in the preferred embodiment, the orienting step is comprised of comparing a current orientation of the drilling string (25) with the desired orientation of the drilling string (25) and rotating the drilling string (25) to eliminate any discrepancy between the current orientation and the desired orientation.

Once the desired orientation of the drilling string (25) is achieved by manipulation of the drilling string (25), the desired orientation is then communicated to the device (20). The desired orientation may be communicated to the device (20) either from the surface of the wellbore or from a drilling string orientation sensor apparatus (376) located somewhere on the drilling string (25).

More particularly, the drilling string orientation sensor apparatus (376) is preferably associated with the drilling string communication system (378) and the communicating step is performed by communicating the desired orientation from the drilling string communication system (378) to the device (20). In other words, the operator manipulates the drilling string (25) to communicate the desired orientation to the drilling string communication system (378). The drilling string communication system (378) then generates instructions to provide to the device (20) in the form of data relating to the desired orientation of the drilling string (25), which instructions are communicated from the drilling string communication system (378) to the device (20) to perform the communicating step.

The drilling direction control device (20) is then actuated to deflect the drilling shaft (24) to reflect the desired orientation. In the preferred embodiment, the device (20) receives the instructions communicated from the drilling string communication system (378) and processes the instructions to actuate the device (20). More particularly, the device (20) processes the instructions provided in the form of data relating to the desired orientation of the drilling string (25) and converts those instructions into instructions relating specifically to the required actuation of the device (20), and particularly the deflection assembly (92), to reflect the desired orientation.

Thus, the device (20) is actuated to reflect the desired orientation by actuating the device (20) to account for the relative positions of the drilling string (25) and the device (20). Preferably, the device (20) is actuated to reflect the desired orientation by accounting for the relative positions of the drilling string (25) and the housing (46) and the deflection assembly (92) comprising the device (20).

The drilling direction control device (20) may be actuated in any manner and may be powered separately from the rotary drilling system. However, in the preferred embodiment, the device (20), and in particular the deflection assembly (92), is actuated by rotation of the drilling string (25) as described n detail above. Thus, in the preferred embodiment, the actuating step is comprised of rotating the drilling string (25).

Further, the method is preferably comprised of the further step of periodically communicating the current orientation of the drilling string (25) to the drilling direction control device (20). The current orientation may be periodically communicated in any manner and at any spaced intervals. However, the current orientation of the drilling string (25) is preferably periodically communicated to the drilling direction control device (20) after a predetermined delay. In addition, the step of periodically communicating the current orientation of the drilling string (25) to the device (20) is preferably comprised of periodically communicating the current orientation of the drilling string (25) from the drilling string communication system (378) to the device (20).

Thus, the actuating step is preferably comprised of waiting for a period of time equal to or greater than the predetermined delay once the drilling string (25) is oriented at the desired orientation so that the desired orientation of the drilling string (25) is communicated to the device (20) and then rotating the drilling string (25) to actuate the device (20) to reflect the desired orientation of the drilling string (25).

Finally, as described previously, the device (20) is further preferably comprised of the device memory (380). In this instance, the method is preferably further comprised of the step of storing the current orientation of the drilling string (25) in the device memory (380) when it is communicated to the device (20).

Further, in this instance where the device (20) includes a device memory (380), the actuating step is preferably further comprised of the steps of retrieving from the device memory (380) the current orientation of the drilling string (25) most recently stored in the device memory (380) and then rotating the drilling string (25) to actuate the device (20) to reflect the most recent current orientation of the drilling string (25) stored in the device memory (380).

Finally, in the preferred embodiment, the method comprises the step of maintaining the deflection of the drilling shaft (24) to reflect the desired orientation of the drilling string (25) during operation of the rotary drilling system. Preferably, the orientation maintaining step is comprised of communicating the current orientation of the drilling string (25) from the drilling string communication system (378) to the device (20) and actuating the device (20) to adjust the deflection of the drilling shaft (24) to reflect the desired orientation of the drilling string (25) and the current orientation of the drilling shaft (24).

In a first applied example relating to the above preferred method, the steps set out below are performed.

First, the circulation or flow rate of drilling fluid through the drilling string (25) and the rotation speed or rpm of the drilling string (25) are both permitted to fall or drop below a predetermined threshold value for a discrete period of time. For instance, preferably, the circulation and rotation are both simultaneously at zero for a discrete period of time.

Second, with the drilling string (25) rotation speed held below the threshold value, and preferably held at zero, the pumping of drilling fluid down the drilling string (25) is commenced and subsequently increased to a rate at which the MWD apparatus (378) registers, via a pressure sensor, that circulation is occurring. This information then passes from the MWD apparatus (378) to the device (20). The device (20) recognizes that the drilling shaft (24) running through it is not rotating and selects a 'Deflection ON' setting.

Third, shortly after it first senses circulation, the MWD apparatus (378) begins to acquire current MWD toolface values or current drilling string (25) orientation values, which it pulses to surface. After a predetermined period of time, preferably one minute, has elapsed, the MWD apparatus (378) also begins to send MWD toolface values or current drilling string (25) orientation values to the device (20). However, these values are only sent after they have reached a predetermined age, preferably 30 seconds.

Fourth, the operator at surface monitors the current MWD toolface or drilling string (25) orientation. If the displayed value or orientation is not either equal to or sufficiently close to the required value or desired drilling string (25) orientation, then the operator rotates the drilling string (25) through an appropriate angle and awaits an update of the orientation from the MWD apparatus (378).

Fifth, when the operator is satisfied that the current MWD toolface value or the current orientation of the drilling string (25) is in accordance with the desired orientation, the predetermined period of time, being 1 minute, is allowed to elapse before continuous drilling string (25) rotation is commenced. This ensures that the 30 second old toolface or orientation of the drilling string (25) stored in the device memory (380) of the device (20) is identical to the MWD toolface or orientation of the drilling string (25) displayed at surface.

Sixth, commencement of continuous drilling string (25) rotation instructs the device (20) to accept the toolface or current orientation of the drilling string (25), currently stored in its memory (380), as the toolface or desired orientation required during drilling.

Alternately, the method may be comprised of the steps of communicating a desired orientation of the drilling string (25) to the drilling direction control device (20) and actuating the device (20) to deflect the drilling shaft (24) to reflect the desired orientation. The desired orientation may be communicated to the device (20) either from the surface of the wellbore or from a drilling string orientation sensor apparatus (376) located somewhere on the drilling string (25).

More particularly, in the alternate embodiment, the drilling string orientation sensor apparatus (376) is preferably associated with the drilling string communication system (378) and the communicating step is performed by communicating the desired orientation from the drilling string communication system (378) to the device (20). In other words, the operator manipulates the drilling string (25) to communicate the desired orientation to the drilling string communication system (378). The drilling string communication system (378) then generates instructions to provide to the device (20) in the form of data relating to the desired orientation of the drilling string (25), which instructions are communicated from the drilling string communication system (378) to the device (20) to perform the communicating step.

The drilling direction control device (20) is then actuated to deflect the drilling shaft (24) to reflect the desired orientation. The device (20) receives the instructions communicated from the drilling string communication system (378) and processes the instructions to actuate the device (20). More particularly, the device (20) processes the instructions provided in the form of data relating to the desired orientation of the drilling string (25) and converts those instructions into instructions relating specifically to the required actuation of the device (20), and particularly the deflection assembly (92), to reflect the desired orientation.

Thus, the device (20) is actuated to reflect the desired orientation by actuating the device (20) to account for the relative positions of the drilling string (25) and the device (20). Preferably, the device (20) is actuated to reflect the desired orientation by accounting for the relative positions of the drilling string (25) and the housing (46) and the deflection assembly (92) comprising the device (20).

The drilling direction control device (20) may be actuated in any manner and may be powered separately from the rotary drilling system. However, preferably, the device (20), and in particular the deflection assembly (92), is actuated by rotation of the drilling string (25) as described n detail above. Thus, the actuating step is comprised of rotating the drilling string (25).

Further, the alternate method is preferably comprised of the further step of periodically communicating the current orientation of the drilling string (25) to the drilling direction control device (20). The current orientation may be periodically communicated in any manner and at any spaced intervals. However, the current orientation of the drilling string (25) is preferably periodically communicated to the drilling direction control device (20) after a predetermined delay. In addition, the step of periodically communicating the current orientation of the drilling string (25) to the device (20) is preferably comprised of periodically communicating the current orientation of the drilling string (25) from the drilling string communication system (378) to the device (20).

In the alternate embodiment, the actuating step is preferably comprised of waiting for a period of time less than the predetermined delay so that the current orientation of the drilling string (25) is not communicated to the device (20) and then rotating the drilling string (25) to actuate the device (20) to reflect the desired orientation.

Finally, the alternate method is preferably further comprised of the step of storing the desired orientation of the drilling string (25) in the device memory (380) when it is communicated to the device (20).

In this instance, the actuating step is preferably comprised of the steps of retrieving from the device memory (380) the desired orientation of the drilling string (25) and then rotating the drilling string (25) to actuate the device (20) to reflect the desired orientation of the drilling string (25) stored in the device memory (380).

Finally, the alternate method also preferably comprises the step of maintaining the deflection of the drilling shaft (24) to reflect the desired orientation of the drilling string (25) during operation of the rotary drilling system. Preferably, the orientation maintaining step is comprised of communicating the current orientation of the drilling string (25) from the drilling string communication system (378) to the device (20) and actuating the device (20) to adjust the deflection of the drilling shaft (24) to reflect the desired orientation of the drilling string (25) and the current orientation of the drilling shaft (24).

In a second applied example relating to the above alternate method, the steps set out below are performed.

First, the circulation or flow rate of the drilling fluid through the drilling string (25) and the rotation speed or rpm of the drilling string (25) are both permitted to fall or drop below a predetermined threshold value for a discrete period of time. For instance, preferably, the circulation and rotation are both simultaneously at zero for a discrete period of time.

Second, with the drilling string (25) rotation speed held below the threshold value, preferably at zero, the pumping of drilling fluid down the drilling string (25) is commenced and subsequently increased to a rate at which the MWD apparatus (378) registers, via a pressure sensor, that circulation is occurring. This information then passes from the MWD apparatus (378) to the device (20). The device (20) recognizes that the drilling shaft (24) running through it is not rotating and selects the 'Deflection ON' setting.

Third, continuous drilling string (25) rotation is then commenced before the predetermined period of time (preferably one minute) following the commencement of circulation, has elapsed. This instructs the device (20) to accept the toolface or drilling string (25) orientation currently stored in the device memory (380) as the desired toolface or drilling string (25) orientation required during drilling. In the event no updated MWD toolface data or updated desired drilling string (25) orientation has been written or provided to the device memory (380), the toolface or orientation stored prior to the cessation of rotation and circulation is maintained as the desired toolface or desired drilling string (25) orientation required during drilling.

As well, in the event that it is desired that the deflection assembly (92) not deflect the drilling shaft (24), thus allowing or providing for the drilling of a straight wellbore, in a third specific applied example of the method of the invention, the steps set out below are performed.

First, the circulation or flow rate of the drilling fluid within the drilling string (25) and the rotation speed or rpm of the drilling string (25) are both permitted to fall or drop below a predetermined threshold value for a discrete period of time. Again, preferably, the circulation and rotation are both simultaneously at zero for a discrete period of time.

Second, rotation of the drilling string (25) is commenced and continued for a discrete period prior to the start of circulation of drilling fluid through the drilling string (25). The device (20) recognizes that rotation of the drilling string (25) is occurring and, in the absence of prior information from the MWD apparatus (378) that circulation has begun, the device (20) selects the 'Deflection OFF' setting.

From the above three applied examples of the methods of the within invention, it can be seen that the device (20) is preferably activated by the sequence and timing of the commencement of the rotation of the drill string (25) and the commencement of the circulation or flow of drilling fluid within the drill string (25). Further, the device (20) may be activated by or configured to respond to any or all of the various permutations or combinations relating to the sequence and timing of the commencement of rotation and circulation.

Further, the device (20) preferably makes enquiries of the drilling string communication system (378) upon sensing a change in one or both of the rotation of the drilling string

(25) and the circulation of drilling fluid. For instance, the device (20) may make enquiries upon sensing a change in the state of rotation of the drilling string (25) above or below a predetermined threshold value. Further, the device (20) may make enquiries upon sensing a change in the state of the circulation of drilling fluid within the drilling string (25) above or below a predetermined threshold value.

A further example of a preferred embodiment illustrating from a software design perspective how the sequencing and timing of commencing rotation of the drilling string (25) and circulating drilling fluid through the drilling string (25) may be used to effect the actuation of the device (20) is as follows.

First, the device (20) may sense that the rotation of the drilling string (25) has fallen below a threshold level such as for example ten revolutions per minute. The device then sets a request for circulation status bit which indicates to the drilling string communication system (378) that the device (20) wishes to know if circulation of drilling fluid through the drilling string (25) is occurring above a threshold level.

The drilling string communication system (378) preferably reads this status message from the device (20) about every 1 second and determines that the device (20) wishes to know if the threshold level of circulation is occurring. The drilling string communication system (378) is also constantly polling all systems linked to the drilling string communication system (378) on the communications bus for data and requests for data and moves this data around for the various systems including the device (20).

In response to the enquiry from the device (20), the drilling string communication system (378) interrogates the pressure sensor which senses circulation of drilling fluid and determines whether circulation is in fact occurring at a level above the threshold level.

The drilling string communication system (378) sends a message to the device (20) indicating the status of circulation. If the pressure sensed by the pressure sensor is above the threshold value then circulation is considered to be "on". If the status of circulation is "on" then the device (20) remains actuated at its current orientation if rotation of the drilling string (25) begins again at a speed above the threshold rotation speed.

If the circulation is considered to be "off" then the device (20) is set in a state to receive a possible command causing it to change the actuation position of the device (20). The device (20) therefore continues to keep the request for circulation status bit set so that the device (20) receives continual periodic updates from the drilling string communication system (378) as to the status of circulation.

If rotation of the drilling string (25) above the threshold speed commences before circulation of drilling fluid above the threshold level commences then the device (20) waits and monitors the circulation status. If circulation commences before a preset time-out period (preferably about 10 minutes) expires, then the device (20) actuates to "Deflection OFF" mode. If the circulation commences after the time-out period has expired then the device (20) remains actuated at its present orientation.

If the request for circulation status bit is set true from false by the drilling string communication system (378) (thus indicating that circulation above the threshold level has commenced) then the device (20) immediately checks the rotation status to see if the drilling string (25) is rotating at a speed higher than the threshold speed.

If the drilling string (25) is rotating at a speed above the threshold level, then the device (20) will remain actuated at its current orientation.

If the drilling string (25) is not rotating at a speed above the threshold level then the device waits for one of a possible four events to occur. In addition, once the drilling string communication system (378) detects that circulation of drilling fluid is occurring it begins logging data pertaining to the orientation of the drilling string (25) and storing them in the system memory.

In event 1, the rotation of the drilling string (25) commences by going above the threshold speed before a preset "RESUME" time-out period has expired. This RESUME time-out period is preferably about 1 minute. If event 1 occurs the device (20) recalls from the device memory what the previous orientation setting was and actuates to that setting by engaging the deflection assembly (92).

In event 2, the rotation of the drilling string (25) commences by going above the threshold speed after the RESUME time out but before a "CANCEL" time out expires. As previously indicated, during intervals when the rotation is not occurring above the threshold speed but circulation of drilling fluid is occurring above the threshold level the drilling string communication system (378) constantly logs and stores data pertaining to the orientation of the drilling string (25).

At the same time the drilling string communication system (378) transmits data pertaining to the orientation of the drilling string (25) to the surface where the data is displayed in virtual real-time for the operator to see.

The operator then orients the drilling string (25) to the desired orientation and holds the desired orientation steady for a period of time sufficient to ensure that the desired orientation of the drilling string (25) has been communicated both to the surface and to the device (20) and then preferably for an additional thirty seconds to ensure that the data pertaining to the desired orientation of the drilling string (25) is stable. For example, if the time required to ensure proper communication of the data is thirty seconds then the drilling string (25) is preferably held stationary for at least sixty seconds.

Once the drilling string (25) has been oriented to the desired orientation and the proper wait period has expired, then rotation of the drilling string (25) at a speed above the threshold speed will result in the device (20) sensing the rotation internally with its rpm sensor (375). The device (20) then sets a request for desired orientation flag asking for a value for the desired orientation of the drilling string (25). The drilling string communication system (378) reads the request message within about 1 second and sends the device (20) data pertaining to the desired orientation of the drilling string (25). The drilling string communication system (378) then recalls from its system memory the desired orientation of the drilling string (25) and transmits data pertaining to the desired orientation to the device (20) on the communications bus.

The device (20) receives the data, dears the request flag and begins actuating the deflection assembly of the device (20) to actuate the device (20) to reflect the desired orientation of the drilling string (25). In the mean time the drilling string communication system (378) now requests orientation data only from the device (20) instead of the drilling string orientation sensor apparatus (376) and transmits this orientation data to the surface. The drilling string communication system (378) will transmit drilling string orientation sensor (376) data when the speed of rotation is below the threshold speed and device orientation data when the speed of rotation is above the set threshold speed.

In event 3, the CANCEL time-out expires. If rotation of the drilling string (25) does not commence before the CANCEL command is expired then the device (20) ceases to recognize any commands again until the circulation flag goes to false (thus indicating that circulation above the threshold level has ceased). In this instance the device (20) remains actuated at its current actuation orientation if rotation later commences. If the Deflection OFF mode is this current actuation then the device (20) will continue in Deflection OFF mode. If the Deflection ON mode was engaged then device will continue at its previous actuation orientation.

In event 4, the circulation status goes back to false (thus indicating that circulation above the threshold value has ceased). In this case the device (20) returns to waiting for a mode command state and is essentially reset back to initial conditions and is waiting for a command to tell it what to do next.

The embodiments of the invention in which an exclusive property or privilege is claimed are defined as follows:

1. A drilling direction control device comprising:
  (a) a rotatable drilling shaft;
  (b) a housing for rotatably supporting a length of the drilling shaft for rotation therein; and
  (c) a drilling shaft deflection assembly contained within the housing and axially located between a first support location and a second support location, for bending the drilling shaft between the first support location and the second support location, wherein the deflection assembly is comprised of:
    (i) an outer ring which is rotatably supported on a circular inner peripheral surface of the housing and which has a circular inner peripheral surface that is eccentric with respect to the housing; and
    (ii) an inner ring which is rotatably supported on the circular inner peripheral surface of the outer ring and which has a circular inner peripheral surface which engages the drilling shaft and which is eccentric with respect to the circular inner peripheral surface of the outer ring.

2. The device as claimed in claim 1 further comprising a first radial bearing located at the first support location and further comprising a second radial bearing located at the second support location.

3. The device as claimed in claim 2 wherein the first radial bearing is comprised of a distal radial bearing, wherein the first support location is comprised of a distal radial bearing location, wherein the second radial bearing is comprised of a proximal radial bearing, and wherein the second support location is comprised of a proximal radial bearing location.

4. The device as claimed in claim 3 wherein the distal radial bearing is comprised of a fulcrum bearing which facilitates pivoting of the drilling shaft at the distal radial bearing location.

5. The device as claimed in claim 1 further comprising a device associated with the housing for restraining rotation of the housing.

6. The device as claimed in claim 4 further comprising a distal seal radially positioned between the housing and the drilling shaft at a distal end of the housing, further comprising a proximal seal radially positioned between the housing and the drilling shaft at a proximal end of the housing, wherein the deflection assembly is axially located between the distal end of the housing and the proximal end of the housing, wherein the distal radial bearing location is axially located between the distal end of the housing and the deflection assembly, and wherein the proximal radial bearing location is axially located between the proximal end of the housing and the deflection assembly.

7. The device as claimed in claim 6 further comprising a distal thrust bearing contained within the housing for rotatably supporting the drilling shaft axially at a distal thrust bearing location and further comprising a proximal thrust bearing contained within the housing for rotatably supporting the drilling shaft axially at a proximal thrust bearing location, wherein the distal thrust bearing location is located axially between the distal end of the housing and the deflection assembly, and wherein the proximal thrust bearing location is located axially between the proximal end of the housing and the deflection assembly.

8. The device as claimed in claim 7 wherein the distal thrust bearing is comprised of the fulcrum bearing so that the distal thrust bearing location is at the distal radial bearing location.

9. The device as claimed in claim 8 wherein the fulcrum bearing is comprised of a fulcrum bearing assembly, wherein the fulcrum bearing assembly is comprised of at least one row of spherical thrust bearings positioned at a first axial position, at least one row of spherical thrust bearings positioned at a second axial position and at least one row of spherical radial bearings positioned at a third axial position, and wherein the third axial position is located between the first axial position and the second axial position.

10. The device as claimed in claim 9 wherein the spherical thrust bearings and the spherical radial bearings are arranged substantially about a common center of rotation.

11. The device as claimed in claim 7 wherein the proximal thrust bearing location is located axially between the proximal end of the housing and the proximal radial bearing location.

12. The device as claimed in claim 6 wherein the interior of the housing defines a fluid chamber between the distal end of the housing and the proximal end of the housing and wherein the fluid chamber is filled with a lubricating fluid.

13. The device as claimed in claim 12 wherein the lubricating fluid contained in the fluid chamber has a pressure and wherein the device is further comprised of a pressure compensation system for balancing the pressure of the lubricating fluid contained in the fluid chamber with the ambient pressure outside of the housing.

14. The device as claimed in claim 13 wherein the pressure compensation system is comprised of a pressure port in the housing so that the ambient pressure outside of the housing can be communicated to the fluid chamber.

15. The device as claimed in claim 14 wherein the pressure compensation system is further comprised of a supplementary pressure source for exerting pressure on the lubricating fluid contained in the fluid chamber so that the pressure of the lubricating fluid contained in the fluid chamber is maintained higher than the ambient pressure outside of the housing.

16. The device as claimed in claim 15 wherein the pressure compensation system is further comprised of a balancing piston assembly, wherein the balancing piston assembly is comprised of a piston chamber defined by the interior of the housing and a movable piston contained within the piston chamber which separates the piston chamber into a fluid chamber side and a balancing side, wherein the fluid chamber side is connected with the fluid chamber, wherein the pressure port communicates with the balancing side of the piston chamber, and wherein the supplementary pressure source acts on the balancing side of the piston chamber.

17. The device as claimed in claim 16 wherein the supplementary pressure source is comprised of a biasing device which exerts a supplementary pressure on the piston.

18. The device as claimed in claim 17 wherein the biasing device is comprised of a spring which is contained in the balancing side of the piston chamber.

19. The device as claimed in claim 5 wherein the rotation restraining device is comprised of at least one roller on the housing, the roller having an axis of rotation substantially perpendicular to a longitudinal axis of the housing and being oriented such that it is capable of rolling about its axis of rotation in response to a force exerted on the roller substantially in the direction of the longitudinal axis of the housing.

20. The device as claimed in claim 19 wherein the roller is comprised of a peripheral surface about its circumference and wherein the peripheral surface is comprised of an engagement surface for engaging a borehole wall to restrain rotation of the housing.

21. The device as claimed in claim 20 wherein the engagement surface is comprised of the peripheral surface of the roller being tapered.

22. The device as claimed in claim 21 wherein the roller is capable of movement between a retracted position and an extended position in which it extends radially from the housing.

23. The device as claimed in claim 22 further comprising a biasing device for biasing the roller toward the extended position.

24. The device as claimed in claim 23 wherein the biasing device is comprised of at least one spring which acts between the housing and the roller.

25. The device as claimed in claim 24 wherein the rotation restraining device is comprised of a plurality of rollers spaced about a circumference of the housing.

26. The device as claimed in claim 25 wherein the rotation restraining device is comprised of three rotation restraining carriage assemblies spaced substantially evenly about the circumference of the housing, wherein each rotation restraining carriage assembly is comprised of three sets of rollers spaced axially along the housing, and wherein each set of rollers is comprised of four coaxial rollers spaced side to side.

27. The device as claimed in claim 5 wherein the rotation restraining device is comprised of at least one piston on the housing.

28. The device as claimed in claim 27 wherein the piston is capable of movement between a retracted position and an extended position in which it extends radially from the housing.

29. The device as claimed in claim 28 further comprising an actuator device for moving the piston between the retracted position and the extended position.

30. The device as claimed in claim 29 wherein the actuator device is comprised of a hydraulic pump.

31. The device as claimed in claim 30 wherein the rotation restraining device is comprised of a plurality of pistons spaced about a circumference of the housing.

32. The device as claimed in claim 31 wherein the rotation restraining device is comprised of three rotation restraining carriage assemblies spaced substantially evenly about the circumference of the housing, wherein each rotation restraining carriage assembly is comprised of a plurality of pistons spaced axially along the housing.

33. The device as claimed in claim 12 wherein the distal seal is lubricated with lubricating fluid from the fluid chamber.

34. The device as claimed in claim 33 wherein the distal seal is comprised of a distal filtering mechanism for filtering the lubricating fluid from the fluid chamber so that the distal seal is lubricated with filtered lubricating fluid.

35. The device as claimed in claim 12 wherein the proximal seal is lubricated with lubricating fluid from the fluid chamber.

36. The device as claimed in claim 35 wherein the proximal seal is comprised of a proximal filtering mechanism for filter the lubricating fluid from the fluid chamber so that the proximal seal is lubricated with filtered lubricating fluid.

37. The device as claimed in claim 1 further comprising a deflection assembly orientation sensor apparatus associated with the deflection assembly for sensing the orientation of the deflection assembly.

38. The device as claimed in claim 37 further comprising a housing orientation sensor apparatus associated with the using for sensing the orientation of the housing.

39. The device as claimed in claim 38 further comprising a controller for controlling the actuation of the deflection assembly.

40. The device as claimed in claim 39 wherein the controller is operatively connected with both the housing orientation sensor apparatus and the deflection assembly orientation sensor apparatus so that the deflection assembly may be actuated with reference to the orientation of both the housing and the deflection assembly.

41. The device as claimed in claim 40 wherein the drilling shaft is connectable with a drilling string and wherein the controller is operatively connectable with a drilling string orientation sensor apparatus so that the deflection assembly may be actuated with reference to the orientation of the drilling string.

42. The device as claimed in claim 41 further comprising a drilling string communication system operatively connected with the drilling string orientation sensor apparatus, for communicating the orientation of the drilling string to an operator of the device.

43. The device as claimed in claim 42 further comprising an electromagnetic coupling device associated with the housing and the drilling shaft for electrically connecting the drilling shaft and the housing.

44. The device as claimed in claim 43 wherein the electromagnetic coupling device is comprised of a housing conductor positioned on the housing and a drilling shaft conductor positioned on the drilling shaft, and wherein the housing conductor and the drilling shaft conductor are positioned sufficiently close to each other so that electrical signals may be induced between them.

45. The device as claimed in claim 1 further comprising a drive connection for connecting the drilling shaft with a drilling string, wherein the drive connection is comprised of a tolerance assimilation sleeve interspersed between the drilling shaft and the drilling string.

46. The device as claimed in claim 45 wherein the drive connection is further comprised of a first drive profile on the drilling shaft and a complementary second drive profile on the drilling string and wherein the tolerance assimilation sleeve is positioned between the first drive profile and the second drive profile in order to reduce the tolerance between the first drive profile and the second drive profile.

47. The device as claimed in claim 46 wherein the tolerance assimilation sleeve is comprised of a material having a thermal expansion rate higher than the thermal expansion rate of the drilling string.

48. The device as claimed in claim 7 wherein the distal thrust bearing is axially maintained between a distal thrust bearing shoulder and a distal thrust bearing collar and wherein the distal thrust bearing collar is axially adjustable to preload the distal thrust bearing.

49. The device as claimed in claim 48 wherein the device is further comprised of a distal thrust bearing retainer for retaining the distal thrust bearing in position without increasing the preloading on the distal thrust bearing.

50. The device as claimed in claim 49 wherein the distal thrust bearing retainer is comprised of a locking ring slidably mounted on the distal thrust bearing collar to a position in which it abuts the housing and wherein the distal thrust bearing retainer is further comprised of a locking ring collar which can be tightened against the locking ring to hold the locking ring in position between the housing and the locking ring collar.

51. The device as claimed in claim 50 wherein the distal thrust bearing collar is threaded for adjustment by rotation and wherein the locking ring is mounted on the distal thrust bearing collar such that the locking ring does not rotate relative to the distal thrust bearing collar.

52. The device as claimed in claim 51 wherein the locking ring is further comprised of a housing abutment surface, wherein the housing is further comprised of a locking ring abutment surface which is complementary to the housing abutment surface, and wherein engagement of the housing abutment surface and the locking ring abutment surface prevents rotation of the locking ring relative to the housing.

53. The device as claimed in claim 7 wherein the proximal thrust bearing is axially maintained between a proximal thrust bearing shoulder and a proximal thrust bearing collar and wherein the proximal thrust bearing collar is axially adjustable to preload the proximal thrust bearing.

54. The device as claimed in claim 53 wherein the device is further comprised of a proximal thrust bearing retainer for retaining the proximal thrust bearing in position without increasing the preloading on the proximal thrust bearing.

55. The device as claimed in claim 54 wherein the proximal thrust bearing retainer is comprised of a locking ring slidably mounted on the proximal thrust bearing collar to a position in which it abuts the housing and wherein the proximal thrust bearing retainer is further comprised of a locking ring collar which can be tightened against the locking ring to hold the locking ring in position between the housing and the locking ring collar.

56. The device as claimed in claim 55 wherein the proximal thrust bearing collar is threaded for adjustment by rotation and wherein the locking ring is mounted on the proximal thrust bearing collar such that the locking ring does not rotate relative to the proximal thrust bearing collar.

57. The device as claimed in claim 56 wherein the locking ring is further comprised of a housing abutment surface, wherein the housing is further comprised of a locking ring abutment surface which is complementary to the housing abutment surface, and wherein engagement of the housing abutment surface and the locking ring abutment surface prevents rotation of the locking ring relative to the housing.

58. The device as claimed in claim 1 wherein the deflection assembly is further comprised of an outer ring drive mechanism for rotating the outer ring using rotation of the drilling shaft, wherein the outer ring drive mechanism is comprised of a clutch for selectively engaging and disengaging the drilling shaft from the outer ring, wherein the dutch is comprised of a pair of clutch plates which are separated by a clutch gap when the clutch is disengaged, and wherein the dutch is further comprised of a clutch adjustment mechanism for adjusting the clutch gap, the clutch adjustment mechanism comprising:

(a) a clutch adjustment member associated with one of the pair of clutch plates such that movement of the clutch adjustment member will result in corresponding movement of the clutch plate to increase or decrease the clutch gap;

(b) a first guide for guiding the clutch adjustment member for movement in a first direction; and (c) a movable key associated with the clutch adjustment member, the key comprising a second guide for urging the clutch adjustment member in a second direction, which second direction has a component parallel to the first guide and has a component perpendicular to the first guide, wherein one of the parallel component and the perpendicular component is parallel to a direction of movement of the clutch plate necessary to increase or decrease the clutch gap.

59. The device as claimed in claim 58, further comprising a clutch adjustment control mechanism for controlling the movement of the key.

60. The device as claimed in claim 59, further comprising a clutch adjustment locking mechanism for fixing the position of the key so that the clutch gap can be maintained at a desired setting.

61. The device as claimed in claim 60 wherein the first guide is comprised of a first slot.

62. The device as claimed in claim 61 wherein the key is positioned in a cavity defined by the outer ring drive mechanism.

63. The device as claimed in claim 62 wherein the key is comprised of a key ramp surface oriented in the second direction, wherein the cavity defines a complementary cavity ramp surface, and wherein the second guide is comprised of the key ramp surface and the cavity ramp surface.

64. The device as claimed in claim 1 wherein the deflection assembly is further comprised of an inner ring drive mechanism for rotating the inner ring using rotation of the drilling shaft, wherein the inner ring drive mechanism is comprised of a clutch for selectively engaging and disengaging the drilling shaft from the inner ring, wherein the clutch is comprised of a pair of clutch plates which are separated by a clutch gap when the dutch is disengaged, and wherein the clutch is further comprised of a clutch adjustment mechanism for adjusting the clutch gap, the clutch adjustment mechanism comprising:

(a) a clutch adjustment member associated with one of the pair of clutch plates such that movement of the dutch adjustment member will result in corresponding movement of the clutch plate to increase or decrease the clutch gap;

(b) a first guide for guiding the clutch adjustment member for movement in a first direction; and (c) a movable key associated with the clutch adjustment member, the key comprising a second guide for urging the clutch adjustment member in a second direction, which second direction has a component parallel to the first guide and has a component perpendicular to the first guide, wherein one of the parallel component and the perpendicular component is parallel to a direction of movement of the clutch plate necessary to increase or decrease the clutch gap.

65. The device as claimed in claim 64, further comprising a clutch adjustment control mechanism for controlling the movement of the key.

66. The device as claimed in claim 65, further comprising a clutch adjustment locking mechanism for fixing the position of the key so that the clutch gap can be maintained at a desired setting.

67. The device as claimed in claim 66 wherein the first guide is comprised of a first slot.

68. The device as claimed in claim 67 wherein the key is positioned in a cavity defined by the inner ring drive mechanism.

69. The device as claimed in claim 62 wherein the key is comprised of a key ramp surface oriented in the second direction, wherein the cavity defines a complementary cavity ramp surface, and wherein the second guide is comprised of the key ramp surface and the cavity ramp surface.

70. The device as claimed in claim 4 wherein the proximal radial bearing is comprised of a cantilever bearing which restrains pivoting of the drilling shaft at the proximal radial bearing location.

* * * * *

UNITED STATES PATENT AND TRADEMARK OFFICE
CERTIFICATE OF CORRECTION

PATENT NO. : 6,244,361 B1
DATED : June 12, 2001
INVENTOR(S) : Laurier E. Comeau et al.

It is certified that error appears in the above-identified patent and that said Letters Patent is hereby corrected as shown below:

Column 11,
Lines 24, 28 and 31, change each occurrence of "dutch" to -- clutch --.

Column 14,
Line 2, change "dose" to -- close --.

Column 16,
Line 43, change "dose" to -- close --.

Column 38,
Lines 24, 38, 46, 49, 53 and 64, change each occurrence of "dutch" to -- clutch --.

Column 39,
Lines 1, 5, 13, 43, 50 and 55, change each occurrence of "dutch" to -- clutch --.

Column 40,
Lines 15, 43 and 45, change each occurrence of "dutch" to -- clutch --.

Column 42,
Lines 5, 12, 24, 45, 48, 50 and 66, change each occurrence of "dutch" to -- clutch --.

Column 43,
Lines 1, 15 and 40, change each occurrence of "dutch" to -- clutch --.

Column 55,
Line 29, change "dose" to -- close --.

Column 60,
Line 59, change "preprogramming" to -- pre-programming --.

Column 64,
Line 28, change "dose" to -- close --.

Column 68,
Line 54, change "dears" to -- clears --.

Column 72, claim 36,
Line 6, change "filter" to -- filtering --.

UNITED STATES PATENT AND TRADEMARK OFFICE
CERTIFICATE OF CORRECTION

PATENT NO. : 6,244,361 B1
DATED : June 12, 2001
INVENTOR(S) : Laurier E. Comeau et al.

It is certified that error appears in the above-identified patent and that said Letters Patent is hereby corrected as shown below:

Column 72, claim 38,
Line 15, change "using" to -- housing --.

Column 72, claim 47,
Line 59, insert -- claim -- before "46".

Column 73, claim 58,
Lines 60 and 62, change each occurrence of "dutch" to -- clutch --.

Column 74, claim 64,
Lines 36 and 41, change each occurrence of "dutch" to -- clutch --.

Signed and Sealed this

Nineteenth Day of March, 2002

Attest:

JAMES E. ROGAN
*Director of the United States Patent and Trademark Office*

*Attesting Officer*